US012347268B2

(12) United States Patent
Nguyen et al.

(10) Patent No.: US 12,347,268 B2
(45) Date of Patent: Jul. 1, 2025

(54) ADAPTIVE MOBILE DEVICE GAMING SYSTEM

(71) Applicant: Aristocrat Technologies, Inc. (ATI), Las Vegas, NV (US)

(72) Inventors: Binh T. Nguyen, Reno, NV (US); C. Douglass Thomas, Saratoga, CA (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 0 days.

(21) Appl. No.: 17/160,343

(22) Filed: Jan. 27, 2021

(65) Prior Publication Data

US 2021/0150854 A1 May 20, 2021

Related U.S. Application Data

(60) Continuation-in-part of application No. 16/590,347, filed on Oct. 1, 2019, now Pat. No. 11,004,304, and (Continued)

(51) Int. Cl.
*G07F 17/32* (2006.01)

(52) U.S. Cl.
CPC ...... *G07F 17/3237* (2013.01); *G07F 17/3211* (2013.01); *G07F 17/3218* (2013.01); (Continued)

(58) Field of Classification Search
CPC ............. G07F 17/3237; G07F 17/3211; G07F 17/3218; G07F 17/3225; G07F 17/3241; G07F 17/3288
See application file for complete search history.

(56) References Cited

U.S. PATENT DOCUMENTS 2,033,638 A 3/1936 Koppl
2,062,923 A 12/1936 Nagy
(Continued)

FOREIGN PATENT DOCUMENTS

GB 2033638 5/1980
GB 2062923 5/1981
(Continued)

OTHER PUBLICATIONS

Final Office Action for U.S. Appl. No. 13/801,171, dated May 21, 2014.
(Continued)

*Primary Examiner* — Dmitry Suhol
*Assistant Examiner* — Jason Pinheiro
(74) *Attorney, Agent, or Firm* — Weaver Austin Villeneuve & Sampson LLP

(57) ABSTRACT

Embodiments disclosed herein concern mobile gaming environments. Portable electronic devices can be supported by the mobile gaming environments. The locations of the portable electronic device can influence how the portable electronic devices operate or what services or features are available to the portable electronic device or their users. According to one embodiment, a mobile gaming system can concern gaming/betting opportunities that can be secured using a portable electronic device even when an individual is located in a location where betting or games of chance are not permitted. According to another embodiment, wagers are advantageously configured, managed or otherwise processed such that they can be deferred, conditional and/or proxy assisted. Electronic gaming kiosks, personal mobile electronic devices, and/or gaming devices can be provided, and used individually or in combination, to facilitate entry, receipt and/or management of wagers.

20 Claims, 22 Drawing Sheets

Related U.S. Application Data a division of application No. 16/248,759, filed on Jan. 15, 2019, said application No. 16/590,347 is a continuation of application No. 16/143,428, filed on Sep. 26, 2018, now Pat. No. 10,445,978, which is a continuation of application No. 15/427,291, filed on Feb. 8, 2017, now Pat. No. 10,115,263, which is a continuation of application No. 14/211,536, filed on Mar. 14, 2014, now Pat. No. 9,600,976.

(60) Provisional application No. 62/617,579, filed on Jan. 15, 2018, provisional application No. 61/873,300, filed on Sep. 3, 2013, provisional application No. 61/799,862, filed on Mar. 15, 2013.

(52) U.S. Cl.
CPC ...... *G07F 17/3225* (2013.01); *G07F 17/3241* (2013.01); *G07F 17/3288* (2013.01)

(56) References Cited

U.S. PATENT DOCUMENTS

| | | | |
|---|---|---|---|
| 4,741,539 | A | 5/1988 | Sutton et al. |
| 4,948,138 | A | 8/1990 | Pease et al. |
| 4,969,183 | A | 11/1990 | Reese |
| 5,067,712 | A | 11/1991 | Georgilas |
| 5,275,400 | A | 1/1994 | Weingardt |
| 5,429,361 | A | 7/1995 | Raven et al. |
| 5,489,103 | A | 2/1996 | Okamoto |
| 5,618,232 | A | 4/1997 | Martin |
| 5,630,757 | A | 5/1997 | Gagin |
| 5,655,961 | A | 8/1997 | Acres et al. |
| 5,704,835 | A | 1/1998 | Dietz, II |
| 5,727,786 | A | 3/1998 | Weingardt |
| 5,833,537 | A | 11/1998 | Barrie |
| 5,842,921 | A | 12/1998 | Mindes |
| 5,919,091 | A | 7/1999 | Bell et al. |
| 5,947,820 | A | 9/1999 | Morro et al. |
| 5,997,401 | A | 12/1999 | Crawford |
| 6,001,016 | A | 12/1999 | Walker et al. |
| 6,039,648 | A | 3/2000 | Guinn et al. |
| 6,059,289 | A | 5/2000 | Vancura |
| 6,089,977 | A | 7/2000 | Bennett |
| 6,095,920 | A | 8/2000 | Sudahiro |
| 6,110,041 | A | 8/2000 | Walker et al. |
| 6,142,872 | A | 11/2000 | Walker et al. |
| 6,146,271 | A | 11/2000 | Kadici |
| 6,146,273 | A | 11/2000 | Olsen |
| 6,165,071 | A | 12/2000 | Weiss |
| 6,231,445 | B1 | 5/2001 | Acres |
| 6,244,958 | B1 | 6/2001 | Acres |
| 6,270,412 | B1 | 8/2001 | Crawford et al. |
| 6,290,600 | B1 | 9/2001 | Glasson |
| 6,293,866 | B1 | 9/2001 | Walker et al. |
| 6,353,390 | B1 | 3/2002 | Beri et al. |
| 6,364,768 | B1 | 4/2002 | Acres et al. |
| 6,404,884 | B1 | 6/2002 | Marwell et al. |
| 6,416,406 | B1 | 7/2002 | Duhamel |
| 6,416,409 | B1 | 7/2002 | Jordan |
| 6,443,452 | B1 | 9/2002 | Brune |
| 6,491,584 | B2 | 12/2002 | Graham et al. |
| 6,500,067 | B1 | 12/2002 | Luciano |
| 6,505,095 | B1 | 1/2003 | Kolls |
| 6,508,710 | B1 | 1/2003 | Paravia et al. |
| 6,561,900 | B1 | 5/2003 | Baerlocker et al. |
| 6,592,457 | B1 | 7/2003 | Frohm et al. |
| 6,612,574 | B1 | 9/2003 | Cole et al. |
| 6,620,046 | B2 | 9/2003 | Rowe |
| 6,641,477 | B1 | 11/2003 | Dietz, II |
| 6,645,078 | B1 | 11/2003 | Mattice |
| 6,675,152 | B1 | 1/2004 | Prasad |
| 6,699,128 | B1 | 3/2004 | Beadell |
| 6,719,630 | B1 | 4/2004 | Seelig et al. |
| 6,749,510 | B2 | 6/2004 | Globbi |
| 6,758,757 | B2 | 7/2004 | Luciano, Jr. et al. |
| 6,773,345 | B2 | 8/2004 | Walker et al. |
| 6,778,820 | B2 | 8/2004 | Tendler |
| 6,780,111 | B2 | 8/2004 | Cannon et al. |
| 6,799,032 | B2 | 9/2004 | McDonnell et al. |
| 6,800,027 | B2 | 10/2004 | Giobbi et al. |
| 6,804,763 | B1 | 10/2004 | Stockdale et al. |
| 6,811,486 | B1 | 11/2004 | Luciano, Jr. |
| 6,843,725 | B2 | 1/2005 | Nelson |
| 6,846,238 | B2 | 1/2005 | Wells |
| 6,848,995 | B1 | 2/2005 | Walker et al. |
| 6,852,029 | B2 | 2/2005 | Baltz et al. |
| 6,869,361 | B2 | 3/2005 | Sharpless et al. |
| 6,875,106 | B2 | 4/2005 | Weiss et al. |
| 6,884,170 | B2 | 4/2005 | Rowe |
| 6,884,172 | B1 | 4/2005 | Lloyd et al. |
| 6,902,484 | B2 | 6/2005 | Idaka |
| 6,908,390 | B2 | 6/2005 | Nguyen et al. |
| 6,913,532 | B2 | 7/2005 | Bearlocher et al. |
| 6,923,721 | B2 | 8/2005 | Luciano et al. |
| 6,935,958 | B2 | 8/2005 | Nelson |
| 6,949,022 | B1 | 9/2005 | Showers et al. |
| 6,955,600 | B2 | 10/2005 | Glavich et al. |
| 6,971,956 | B2 | 12/2005 | Rowe et al. |
| 6,984,174 | B2 | 1/2006 | Cannon et al. |
| 6,997,803 | B2 | 2/2006 | LeMay et al. |
| 7,018,292 | B2 | 3/2006 | Tracy et al. |
| 7,032,115 | B2 | 4/2006 | Kashani |
| 7,033,276 | B2 | 4/2006 | Walker et al. |
| 7,035,626 | B1 | 4/2006 | Luciano |
| 7,037,195 | B2 | 5/2006 | Schneider et al. |
| 7,048,628 | B2 | 5/2006 | Schneider |
| 7,048,630 | B2 | 5/2006 | Berg et al. |
| 7,063,617 | B2 | 6/2006 | Brosnan et al. |
| 7,076,329 | B1 | 7/2006 | Kolls |
| 7,089,264 | B1 | 8/2006 | Guido et al. |
| 7,094,148 | B2 | 8/2006 | Bearlocher et al. |
| 7,105,736 | B2 | 9/2006 | Laakso |
| 7,111,141 | B2 | 9/2006 | Nelson |
| 7,144,321 | B2 | 12/2006 | Mayeroff |
| 7,152,783 | B2 | 12/2006 | Charrin |
| 7,169,041 | B2 | 1/2007 | Tessmer et al. |
| 7,169,052 | B2 | 1/2007 | Beaulieu et al. |
| 7,175,523 | B2 | 2/2007 | Gilmore et al. |
| 7,181,228 | B2 | 2/2007 | Boesch |
| 7,182,690 | B2 | 2/2007 | Giobbi et al. |
| 7,198,571 | B2 | 4/2007 | LeMay |
| RE39,644 | E | 5/2007 | Alcorn et al. |
| 7,217,191 | B2 | 5/2007 | Allen et al. |
| 7,243,104 | B2 | 7/2007 | Bill |
| 7,247,098 | B1 | 7/2007 | Bradford et al. |
| 7,259,718 | B2 | 8/2007 | Patterson et al. |
| 7,275,989 | B2 | 10/2007 | Moody |
| 7,285,047 | B2 | 10/2007 | Gielb et al. |
| 7,311,608 | B1 | 12/2007 | Danieli |
| 7,314,408 | B2 | 1/2008 | Cannon et al. |
| 7,316,615 | B2 | 1/2008 | Soltys et al. |
| 7,316,619 | B2 | 1/2008 | Nelson |
| 7,318,775 | B2 | 1/2008 | Brosnan et al. |
| 7,326,116 | B2 | 2/2008 | O'Donovan et al. |
| 7,330,108 | B2 | 2/2008 | Thomas |
| 7,346,358 | B2 | 3/2008 | Wood et al. |
| 7,355,112 | B2 | 4/2008 | Laakso |
| 7,384,338 | B2 | 6/2008 | Rothschild et al. |
| 7,387,571 | B2 | 6/2008 | Walker et al. |
| 7,393,278 | B2 | 7/2008 | Gerson et al. |
| 7,396,990 | B2 | 7/2008 | Lu et al. |
| 7,415,426 | B2 | 8/2008 | Williams et al. |
| 7,425,177 | B2 | 9/2008 | Rodgers et al. |
| 7,427,234 | B2 | 9/2008 | Soltys et al. |
| 7,427,236 | B2 | 9/2008 | Kaminkow et al. |
| 7,427,708 | B2 | 9/2008 | Ohmura |
| 7,431,650 | B2 | 10/2008 | Kessman |
| 7,448,949 | B2 | 11/2008 | Kaminkow et al. |
| 7,500,913 | B2 | 3/2009 | Baerlocher |
| 7,510,474 | B2 | 3/2009 | Carter |
| 7,513,828 | B2 | 4/2009 | Nguyen et al. |
| 7,519,838 | B1 | 4/2009 | Suurballe |
| 7,559,838 | B2 | 7/2009 | Walker et al. |

(56) References Cited

U.S. PATENT DOCUMENTS

| | | | | |
|---|---|---|---|---|
| 7,563,167 | B2 | 7/2009 | Walker et al. | |
| 7,572,183 | B2 | 8/2009 | Olivas et al. | |
| 7,585,222 | B2 | 9/2009 | Muir | |
| 7,602,298 | B2 | 10/2009 | Thomas | |
| 7,607,174 | B1 | 10/2009 | Kashchenko et al. | |
| 7,611,409 | B2 | 11/2009 | Muir et al. | |
| 7,637,810 | B2 | 12/2009 | Amaitis et al. | |
| 7,644,861 | B2 | 1/2010 | Alderucci et al. | |
| 7,653,757 | B1 | 1/2010 | Fernald et al. | |
| 7,693,306 | B2 | 4/2010 | Huber | |
| 7,699,703 | B2 | 4/2010 | Muir et al. | |
| 7,722,453 | B2 | 5/2010 | Lark et al. | |
| 7,742,996 | B1 | 6/2010 | Kwan | |
| 7,758,423 | B2 | 7/2010 | Foster et al. | |
| 7,771,271 | B2 | 8/2010 | Walker et al. | |
| 7,780,529 | B2 | 8/2010 | Rowe et al. | |
| 7,780,531 | B2 | 8/2010 | Englman et al. | |
| 7,785,192 | B2 | 8/2010 | Canterbury et al. | |
| 7,811,172 | B2 | 10/2010 | Asher et al. | |
| 7,819,749 | B1 | 10/2010 | Fish | |
| 7,822,688 | B2 | 10/2010 | Labron | |
| 7,828,652 | B2 | 11/2010 | Nguyen et al. | |
| 7,828,654 | B2 | 11/2010 | Carter | |
| 7,828,661 | B1 | 11/2010 | Fish | |
| 7,850,528 | B2 | 12/2010 | Wells | |
| 7,874,919 | B2 | 1/2011 | Paulsen et al. | |
| 7,877,798 | B2 | 1/2011 | Saunders et al. | |
| 7,883,413 | B2 | 2/2011 | Paulsen | |
| 7,892,097 | B2 | 2/2011 | Muir et al. | |
| 7,909,692 | B2 | 3/2011 | Nguyen et al. | |
| 7,909,699 | B2 | 3/2011 | Parrott et al. | |
| 7,918,728 | B2 | 4/2011 | Nguyen et al. | |
| 7,927,211 | B2 | 4/2011 | Rowe et al. | |
| 7,927,212 | B2 | 4/2011 | Hedrick et al. | |
| 7,951,008 | B2 | 5/2011 | Wolf et al. | |
| 8,057,298 | B2 | 11/2011 | Nguyen et al. | |
| 8,057,303 | B2 | 11/2011 | Rasmussen | |
| 8,087,988 | B2 | 1/2012 | Nguyen et al. | |
| 8,117,608 | B1 | 2/2012 | Slettehaugh et al. | |
| 8,133,113 | B2 | 3/2012 | Nguyen | |
| 8,182,326 | B2 | 5/2012 | Speers et al. | |
| 8,210,927 | B2 | 7/2012 | Hedrick | |
| 8,221,245 | B2 | 7/2012 | Walker | |
| 8,226,459 | B2 | 7/2012 | Barrett | |
| 8,226,474 | B2 | 7/2012 | Nguyen et al. | |
| 8,231,456 | B2 | 7/2012 | Zielinski | |
| 8,235,803 | B2 | 8/2012 | Loose et al. | |
| 8,276,010 | B2 | 9/2012 | Vavilala | |
| 8,282,475 | B2 | 10/2012 | Nguyen et al. | |
| 8,323,099 | B2 | 12/2012 | Durham et al. | |
| 8,337,290 | B2 | 12/2012 | Nguyen et al. | |
| 8,342,946 | B2 | 1/2013 | Amaitis | |
| 8,393,948 | B2 | 3/2013 | Allen et al. | |
| 8,403,758 | B2 | 3/2013 | Hornik et al. | |
| 8,430,745 | B2 | 4/2013 | Agarwal et al. | |
| 8,461,958 | B2 | 6/2013 | Saenz | |
| 8,465,368 | B2 | 6/2013 | Hardy et al. | |
| 8,469,813 | B2 | 6/2013 | Joshi | |
| 8,529,345 | B2 | 9/2013 | Nguyen | |
| 8,597,108 | B2 | 12/2013 | Nguyen | |
| 8,602,875 | B2 | 12/2013 | Nguyen | |
| 8,613,655 | B2 | 12/2013 | Kisenwether et al. | |
| 8,613,659 | B2 | 12/2013 | Nelson et al. | |
| 8,678,901 | B1 | 3/2014 | Kelly | |
| 8,696,470 | B2 | 4/2014 | Nguyen | |
| 8,745,417 | B2 | 6/2014 | Huang et al. | |
| 8,821,255 | B1 | 9/2014 | Friedman | |
| 8,834,254 | B2 | 9/2014 | Buchholz et al. | |
| 8,858,323 | B2 | 10/2014 | Nguyen et al. | |
| 8,864,586 | B2 | 10/2014 | Nguyen | |
| 8,942,995 | B1 | 1/2015 | Kerr | |
| 9,039,507 | B2 | 5/2015 | Allen et al. | |
| 9,165,422 | B2 * | 10/2015 | Barclay | G07F 17/3274 |
| 9,235,952 | B2 | 1/2016 | Nguyen | |
| 9,292,996 | B2 | 3/2016 | Davis et al. | |
| 9,325,203 | B2 | 4/2016 | Nguyen | |
| 9,466,171 | B2 | 10/2016 | Hornik | |
| 9,483,901 | B2 | 11/2016 | Nguyen | |
| 9,486,697 | B2 | 11/2016 | Nguyen | |
| 9,486,704 | B2 | 11/2016 | Nguyen | |
| 9,530,277 | B2 | 12/2016 | Nelson et al. | |
| 9,576,425 | B2 | 2/2017 | Nguyen | |
| 9,626,826 | B2 | 4/2017 | Nguyen | |
| 9,666,015 | B2 | 5/2017 | Acres | |
| 9,666,021 | B2 | 5/2017 | Nguyen | |
| 9,672,686 | B2 | 6/2017 | Nguyen | |
| 9,741,205 | B2 | 8/2017 | Nguyen | |
| 9,811,973 | B2 | 11/2017 | Nguyen | |
| 9,814,970 | B2 | 11/2017 | Nguyen | |
| 9,842,462 | B2 | 12/2017 | Nguyen | |
| 9,875,606 | B2 | 1/2018 | Nguyen | |
| 9,875,609 | B2 | 1/2018 | Nguyen | |
| 9,981,180 | B2 | 5/2018 | Koyanagi et al. | |
| 10,068,429 | B2 | 9/2018 | Gagner et al. | |
| 10,115,270 | B2 | 10/2018 | Gagner et al. | |
| 10,140,816 | B2 | 11/2018 | Nguyen | |
| 10,325,447 | B2 | 6/2019 | Malek | |
| 10,421,010 | B2 | 9/2019 | Nguyen | |
| 10,438,446 | B2 | 10/2019 | Nguyen | |
| 10,445,978 | B2 | 10/2019 | Nguyen | |
| 10,796,679 | B1 | 10/2020 | Powell | |
| 10,818,133 | B2 | 10/2020 | Nguyen | |
| 2001/0004607 | A1 | 6/2001 | Olsen | |
| 2001/0016516 | A1 | 8/2001 | Takatsuka | |
| 2001/0024971 | A1 | 9/2001 | Brossard | |
| 2001/0025272 | A1 | 9/2001 | Mori | |
| 2001/0031659 | A1 | 10/2001 | Perrie | |
| 2001/0037211 | A1 * | 11/2001 | McNutt | H04N 21/4781 348/E7.071 |
| 2001/0047291 | A1 | 11/2001 | Garahi | |
| 2002/0006822 | A1 | 1/2002 | Krintzman | |
| 2002/0042295 | A1 | 4/2002 | Walker et al. | |
| 2002/0043759 | A1 | 4/2002 | Vancura | |
| 2002/0045474 | A1 | 4/2002 | Singer | |
| 2002/0107065 | A1 | 8/2002 | Rowe | |
| 2002/0107799 | A1 | 8/2002 | Hoshino | |
| 2002/0111210 | A1 | 8/2002 | Luciano, Jr. et al. | |
| 2002/0111213 | A1 | 8/2002 | McEntee et al. | |
| 2002/0113369 | A1 | 8/2002 | Weingardt | |
| 2002/0116615 | A1 | 8/2002 | Nguyen et al. | |
| 2002/0133418 | A1 | 9/2002 | Hammond et al. | |
| 2002/0137217 | A1 | 9/2002 | Rowe et al. | |
| 2002/0142825 | A1 | 10/2002 | Lark et al. | |
| 2002/0145051 | A1 | 10/2002 | Charrin | |
| 2002/0147047 | A1 | 10/2002 | Letovsky et al. | |
| 2002/0147049 | A1 | 10/2002 | Carter, Sr. | |
| 2002/0151366 | A1 | 10/2002 | Walker et al. | |
| 2002/0152120 | A1 | 10/2002 | Howington | |
| 2002/0167536 | A1 | 11/2002 | Valdes et al. | |
| 2002/0177483 | A1 | 11/2002 | Cannon | |
| 2002/0183105 | A1 | 12/2002 | Cannon et al. | |
| 2003/0001338 | A1 | 1/2003 | Bennett et al. | |
| 2003/0003988 | A1 | 1/2003 | Walker | |
| 2003/0003996 | A1 | 1/2003 | Nguyen | |
| 2003/0004871 | A1 | 1/2003 | Rowe et al. | |
| 2003/0008696 | A1 | 1/2003 | Abecassis et al. | |
| 2003/0013531 | A1 | 1/2003 | Rowe | |
| 2003/0027635 | A1 | 2/2003 | Walker et al. | |
| 2003/0064805 | A1 | 4/2003 | Wells | |
| 2003/0064807 | A1 | 4/2003 | Walker et al. | |
| 2003/0078094 | A1 | 4/2003 | Gatto | |
| 2003/0092480 | A1 | 5/2003 | White et al. | |
| 2003/0100361 | A1 | 5/2003 | Sharpless et al. | |
| 2003/0103965 | A1 | 6/2003 | Jung | |
| 2003/0104860 | A1 | 6/2003 | Cannon et al. | |
| 2003/0104865 | A1 | 6/2003 | Itkis et al. | |
| 2003/0148809 | A1 | 8/2003 | Nelson | |
| 2003/0162588 | A1 | 8/2003 | Brosnan et al. | |
| 2003/0176218 | A1 | 9/2003 | Lemay | |
| 2003/0195024 | A1 | 10/2003 | Slattery | |
| 2003/0195043 | A1 * | 10/2003 | Shinners | G07F 17/3276 463/42 |
| 2003/0199295 | A1 | 10/2003 | Vancura | |
| 2003/0224852 | A1 | 12/2003 | Walker et al. | |

(56) References Cited

U.S. PATENT DOCUMENTS

2003/0224854 A1 12/2003 Joao
2004/0002386 A1 1/2004 Wolfe et al.
2004/0005919 A1 1/2004 Walker et al.
2004/0015619 A1 1/2004 Brown
2004/0023709 A1 2/2004 Beaulieu et al.
2004/0023716 A1 2/2004 Gauselmann
2004/0038736 A1 2/2004 Bryant
2004/0048650 A1 3/2004 Mierau et al.
2004/0068460 A1 4/2004 Feeley
2004/0082384 A1 4/2004 Walker
2004/0082385 A1 4/2004 Silva et al.
2004/0094624 A1 5/2004 Fernandes
2004/0106449 A1 6/2004 Walker et al.
2004/0127277 A1 7/2004 Walker
2004/0127290 A1 7/2004 Walker et al.
2004/0137987 A1 7/2004 Nguyen et al.
2004/0142744 A1 7/2004 Atkinson
2004/0147308 A1 7/2004 Walker et al.
2004/0152508 A1 8/2004 Lind
2004/0199631 A1 10/2004 Natsume
2004/0214622 A1 10/2004 Atkinson
2004/0224753 A1 11/2004 Odonovan et al.
2004/0229671 A1 11/2004 Stronach
2004/0256803 A1 12/2004 Ko
2004/0259633 A1 12/2004 Gentles et al.
2005/0003890 A1 1/2005 Hedrick et al.
2005/0004980 A1 1/2005 Vadjinia
2005/0026696 A1 2/2005 Hashimoto et al.
2005/0033651 A1 2/2005 Kogan
2005/0043996 A1 2/2005 Silver
2005/0054446 A1 3/2005 Kammler
2005/0101376 A1 5/2005 Walker et al.
2005/0101383 A1 5/2005 Wells
2005/0130728 A1 6/2005 Nguyen et al.
2005/0130731 A1 6/2005 Englman
2005/0137014 A1 6/2005 Vetelaninen
2005/0143169 A1 6/2005 Nguyen
2005/0167921 A1 8/2005 Finocchio
2005/0170883 A1 8/2005 Muskin et al.
2005/0181865 A1 8/2005 Luciano
2005/0181870 A1 8/2005 Nguyen et al.
2005/0181875 A1 8/2005 Hoehne
2005/0187020 A1 8/2005 Amaitis et al.
2005/0202865 A1 9/2005 Kim
2005/0202875 A1 9/2005 Murphy et al.
2005/0208993 A1 9/2005 Yoshizawa
2005/0209002 A1 9/2005 Blythe et al.
2005/0221881 A1 10/2005 Lannert
2005/0223219 A1 10/2005 Gatto et al.
2005/0239546 A1 10/2005 Hedrick
2005/0255919 A1 11/2005 Nelson
2005/0273635 A1 12/2005 Wilcox et al.
2005/0277471 A1 12/2005 Russell et al.
2005/0282637 A1 12/2005 Gatto et al.
2006/0009283 A1 1/2006 Englman et al.
2006/0035707 A1 2/2006 Nguyen
2006/0036874 A1 2/2006 Cockerille
2006/0046822 A1 3/2006 Kaminkow et al.
2006/0046830 A1 3/2006 Webb
2006/0046849 A1 3/2006 Kovacs
2006/0068893 A1 3/2006 Jaffe et al.
2006/0068897 A1 3/2006 Sanford
2006/0073869 A1 4/2006 LeMay et al.
2006/0073888 A1 4/2006 Nguyen
2006/0073897 A1 4/2006 Englman et al.
2006/0079317 A1 4/2006 Flemming et al.
2006/0121972 A1 6/2006 Walker
2006/0126529 A1 6/2006 Hardy et al.
2006/0148551 A1 7/2006 Walker et al.
2006/0189382 A1 8/2006 Muir et al.
2006/0217170 A1 9/2006 Roireau
2006/0217193 A1 9/2006 Walker et al.
2006/0247028 A1 11/2006 Brosnan et al.
2006/0247035 A1 11/2006 Rowe et al.
2006/0252530 A1 11/2006 Oberberger et al.
2006/0253481 A1 11/2006 Guido et al.
2006/0256135 A1 11/2006 Aoyama
2006/0281525 A1 12/2006 Borissov
2006/0281541 A1 12/2006 Nguyen et al.
2006/0287106 A1 12/2006 Jensen
2007/0004510 A1 1/2007 Underdahl et al.
2007/0026935 A1 2/2007 Wolf et al.
2007/0026942 A1 2/2007 Kinsley
2007/0054739 A1 3/2007 Amaitis et al.
2007/0060254 A1 3/2007 Muir
2007/0060306 A1 3/2007 Amaitis et al.
2007/0060319 A1 3/2007 Block et al.
2007/0060358 A1 3/2007 Amaitas et al.
2007/0077981 A1 4/2007 Hungate et al.
2007/0087833 A1 4/2007 Feeney et al.
2007/0087834 A1 4/2007 Moser et al.
2007/0093299 A1 4/2007 Bergeron
2007/0111777 A1 * 5/2007 Amaitis .................. G07F 17/32
463/16
2007/0129123 A1 6/2007 Eryou et al.
2007/0129148 A1 6/2007 Van Luchene
2007/0149279 A1 6/2007 Norden et al.
2007/0149286 A1 6/2007 Bemmel
2007/0159301 A1 7/2007 Hirt et al.
2007/0161402 A1 7/2007 Ng et al.
2007/0184896 A1 8/2007 Dickerson
2007/0184904 A1 8/2007 Lee
2007/0191109 A1 8/2007 Crowder et al.
2007/0207852 A1 9/2007 Nelson et al.
2007/0207854 A1 9/2007 Wolf et al.
2007/0235521 A1 10/2007 Mateen
2007/0238505 A1 10/2007 Okada
2007/0241187 A1 10/2007 Alderucci et al.
2007/0248036 A1 10/2007 Nevalainen
2007/0257430 A1 11/2007 Hardy et al.
2007/0259713 A1 11/2007 Fiden et al.
2007/0259716 A1 11/2007 Mattice
2007/0259717 A1 11/2007 Mattice et al.
2007/0265984 A1 11/2007 Santhana
2007/0270213 A1 11/2007 Nguyen et al.
2007/0275777 A1 11/2007 Walker et al.
2007/0275779 A1 11/2007 Amaitis et al.
2007/0281782 A1 12/2007 Amaitis et al.
2007/0281785 A1 12/2007 Amaitas et al.
2007/0298858 A1 12/2007 Toneguzzo
2007/0298873 A1 12/2007 Nguyen et al.
2008/0015032 A1 1/2008 Bradford et al.
2008/0020824 A1 1/2008 Cuddy et al.
2008/0020845 A1 1/2008 Low
2008/0032787 A1 2/2008 Low et al.
2008/0070652 A1 3/2008 Nguyen et al.
2008/0070681 A1 3/2008 Marks et al.
2008/0076505 A1 3/2008 Nguyen
2008/0076506 A1 3/2008 Nguyen et al.
2008/0076527 A1 * 3/2008 Low .................... G07F 17/3237
463/25
2008/0076548 A1 3/2008 Paulsen
2008/0076572 A1 3/2008 Nguyen et al.
2008/0096650 A1 4/2008 Baerlocher
2008/0102916 A1 5/2008 Kovacs
2008/0102935 A1 5/2008 Finnimore
2008/0102956 A1 5/2008 Burman et al.
2008/0102957 A1 5/2008 Burnman et al.
2008/0108401 A1 5/2008 Baerlocker et al.
2008/0113772 A1 5/2008 Burrill et al.
2008/0119267 A1 5/2008 Denlay
2008/0126529 A1 5/2008 Kim
2008/0013906 A1 6/2008 Lutnick
2008/0139274 A1 6/2008 Baerlocher
2008/0139306 A1 6/2008 Lutnick
2008/0146321 A1 6/2008 Parente
2008/0146344 A1 6/2008 Rowe et al.
2008/0150902 A1 6/2008 Edpalm et al.
2008/0153583 A1 6/2008 Huntley et al.
2008/0161110 A1 7/2008 Campbell
2008/0167106 A1 7/2008 Lutnick et al.
2008/0167118 A1 7/2008 Kroeckel
2008/0182667 A1 7/2008 Davis et al.
2008/0200251 A1 8/2008 Alderucci

(56) References Cited

U.S. PATENT DOCUMENTS

| | | | |
|---|---|---|---|
| 2008/0207307 | A1 | 8/2008 | Cunningham, II et al. |
| 2008/0167130 | A1 | 9/2008 | Koreckel |
| 2008/0214258 | A1 | 9/2008 | Brosnan et al. |
| 2008/0214310 | A1 | 9/2008 | Brunet de Courssou |
| 2008/0215319 | A1 | 9/2008 | Lu |
| 2008/0234047 | A1 | 9/2008 | Nguyen |
| 2008/0238610 | A1 | 10/2008 | Rosenbereg |
| 2008/0248849 | A1 | 10/2008 | Lutnick |
| 2008/0248865 | A1 | 10/2008 | Cole |
| 2008/0252419 | A1 | 10/2008 | Batchelor |
| 2008/0254878 | A1 | 10/2008 | Sauders et al. |
| 2008/0254881 | A1 | 10/2008 | Lutnick et al. |
| 2008/0254883 | A1 | 10/2008 | Patel et al. |
| 2008/0254891 | A1 | 10/2008 | Sauders et al. |
| 2008/0254892 | A1 | 10/2008 | Sauders et al. |
| 2008/0254897 | A1 | 10/2008 | Sauders et al. |
| 2008/0263173 | A1 | 10/2008 | Weber et al. |
| 2008/0268959 | A1 | 10/2008 | Bryson |
| 2008/0274783 | A1 | 11/2008 | Walker |
| 2008/0300058 | A1 | 12/2008 | Sum et al. |
| 2008/0305864 | A1 | 12/2008 | Kelly et al. |
| 2008/0305865 | A1 | 12/2008 | Kelly et al. |
| 2008/0305866 | A1 | 12/2008 | Kelly et al. |
| 2008/0311994 | A1 | 12/2008 | Amaitas et al. |
| 2008/0318669 | A1 | 12/2008 | Buchholz |
| 2008/0318686 | A1 | 12/2008 | Crowder et al. |
| 2009/0005165 | A1 | 1/2009 | Arezina et al. |
| 2009/0011822 | A1 | 1/2009 | Englman |
| 2009/0017906 | A1 | 1/2009 | Jackson |
| 2009/0021381 | A1 | 1/2009 | Higuchi |
| 2009/0029766 | A1 | 1/2009 | Lutnick et al. |
| 2009/0054149 | A1 | 2/2009 | Brosnan et al. |
| 2009/0061990 | A1 | 3/2009 | Schwartz |
| 2009/0069063 | A1 | 3/2009 | Thomas |
| 2009/0077396 | A1 | 3/2009 | Tsai et al. |
| 2009/0088258 | A1 | 4/2009 | Saunders et al. |
| 2009/0098925 | A1 | 4/2009 | Gagner et al. |
| 2009/0104977 | A1 | 4/2009 | Zielinski |
| 2009/0104983 | A1 | 4/2009 | Okada |
| 2009/0118002 | A1 | 5/2009 | Lyons |
| 2009/0118013 | A1 | 5/2009 | Finnimore et al. |
| 2009/0118022 | A1 | 5/2009 | Lyons et al. |
| 2009/0124366 | A1 | 5/2009 | Aoki et al. |
| 2009/0124390 | A1 | 5/2009 | Seelig et al. |
| 2009/0131146 | A1 | 5/2009 | Arezina et al. |
| 2009/0131151 | A1 | 5/2009 | Harris et al. |
| 2009/0131155 | A1 | 5/2009 | Hollibaugh |
| 2009/0132163 | A1 | 5/2009 | Ashley et al. |
| 2009/0137255 | A1 | 5/2009 | Ashley et al. |
| 2009/0138133 | A1 | 5/2009 | Buchholz et al. |
| 2009/0143141 | A1 | 6/2009 | Wells |
| 2009/0149245 | A1 | 6/2009 | Fabbri |
| 2009/0149261 | A1 | 6/2009 | Chen et al. |
| 2009/0153342 | A1 | 6/2009 | Thorn |
| 2009/0156303 | A1 | 6/2009 | Kiely et al. |
| 2009/0163272 | A1 | 6/2009 | Baker |
| 2009/0176578 | A1 | 7/2009 | Herrmann et al. |
| 2009/0191962 | A1 | 7/2009 | Hardy et al. |
| 2009/0197684 | A1 | 8/2009 | Arezina et al. |
| 2009/0216547 | A1 | 8/2009 | Canora et al. |
| 2009/0219901 | A1 | 9/2009 | Bull et al. |
| 2009/0221342 | A1 | 9/2009 | Katz et al. |
| 2009/0227302 | A1 | 9/2009 | Abe |
| 2009/0239666 | A1 | 9/2009 | Hall et al. |
| 2009/0264190 | A1 | 10/2009 | Davis et al. |
| 2009/0270166 | A1 | 10/2009 | Thukral |
| 2009/0270170 | A1 | 10/2009 | Patton |
| 2009/0271287 | A1 | 10/2009 | Halpern |
| 2009/0275402 | A1 | 11/2009 | Backover |
| 2009/0275410 | A1 | 11/2009 | Kisenwether et al. |
| 2009/0275411 | A1 | 11/2009 | Kisenwether et al. |
| 2009/0280910 | A1 | 11/2009 | Gagner et al. |
| 2009/0282469 | A1 | 11/2009 | Lynch |
| 2009/0298468 | A1 | 12/2009 | Hsu |
| 2009/0318219 | A1 | 12/2009 | Koustas |
| 2010/0002897 | A1 | 1/2010 | Keady |
| 2010/0004058 | A1 | 1/2010 | Acres |
| 2010/0016069 | A1 | 1/2010 | Herrmann |
| 2010/0049738 | A1 | 2/2010 | Mathur et al. |
| 2010/0056248 | A1 | 3/2010 | Acres |
| 2010/0062833 | A1 | 3/2010 | Mattice et al. |
| 2010/0062840 | A1 | 3/2010 | Herrmann et al. |
| 2010/0069160 | A1 | 3/2010 | Barrett |
| 2010/0079237 | A1 | 4/2010 | Falk |
| 2010/0081501 | A1 | 4/2010 | Carpenter et al. |
| 2010/0081509 | A1 | 4/2010 | Burke |
| 2010/0099499 | A1 | 4/2010 | Amaitis et al. |
| 2010/0105454 | A1 | 4/2010 | Weber et al. |
| 2010/0106612 | A1 | 4/2010 | Gupta |
| 2010/0115591 | A1 | 5/2010 | Kane-Esrig |
| 2010/0120486 | A1 | 5/2010 | DeWaal |
| 2010/0124967 | A1 | 5/2010 | Lutnick et al. |
| 2010/0130276 | A1 | 5/2010 | Fiden |
| 2010/0160035 | A1 | 6/2010 | Herrmann |
| 2010/0160043 | A1 | 6/2010 | Fujimoto et al. |
| 2010/0178977 | A1 | 7/2010 | Kim et al. |
| 2010/0184509 | A1 | 7/2010 | Sylla |
| 2010/0197383 | A1 | 8/2010 | Rader et al. |
| 2010/0197385 | A1 | 8/2010 | Aoki et al. |
| 2010/0203955 | A1 | 8/2010 | Sylla |
| 2010/0203957 | A1 | 8/2010 | Enzminger |
| 2010/0203963 | A1 | 8/2010 | Allen |
| 2010/0224681 | A1 | 9/2010 | Triplett |
| 2010/0227662 | A1 | 9/2010 | Speers et al. |
| 2010/0227670 | A1 | 9/2010 | Arezine et al. |
| 2010/0227671 | A1 | 9/2010 | Laaroussi |
| 2010/0227687 | A1 | 9/2010 | Speers et al. |
| 2010/0234091 | A1 | 9/2010 | Baerlocher et al. |
| 2010/0279764 | A1 | 11/2010 | Allen et al. |
| 2010/0323780 | A1 | 12/2010 | Acres |
| 2010/0325703 | A1 | 12/2010 | Etchegoyen |
| 2011/0009181 | A1 | 1/2011 | Speers et al. |
| 2011/0034252 | A1 | 2/2011 | Morrison |
| 2011/0039615 | A1 | 2/2011 | Acres |
| 2011/0053679 | A1 | 3/2011 | Canterbury et al. |
| 2011/0065492 | A1 | 3/2011 | Acres |
| 2011/0076941 | A1 | 3/2011 | Taveau |
| 2011/0086696 | A1 | 4/2011 | MacEwan |
| 2011/0105216 | A1 | 5/2011 | Cohen |
| 2011/0111827 | A1 | 5/2011 | Nicely et al. |
| 2011/0111843 | A1 | 5/2011 | Nicely et al. |
| 2011/0111860 | A1 | 5/2011 | Nguyen |
| 2011/0118010 | A1 | 5/2011 | Brune |
| 2011/0159966 | A1 | 6/2011 | Gura et al. |
| 2011/0183732 | A1 | 7/2011 | Block |
| 2011/0183749 | A1 | 7/2011 | Allen |
| 2011/0207525 | A1 | 8/2011 | Allen |
| 2011/0212711 | A1 | 9/2011 | Scott |
| 2011/0212767 | A1 | 9/2011 | Barclay et al. |
| 2011/0223993 | A1 | 9/2011 | Allen et al. |
| 2011/0244952 | A1 | 10/2011 | Schueller |
| 2011/0263318 | A1 | 10/2011 | Agarwal et al. |
| 2011/0269548 | A1 | 11/2011 | Barclay et al. |
| 2011/0306400 | A1 | 12/2011 | Nguyen |
| 2011/0306426 | A1 | 12/2011 | Novak et al. |
| 2012/0015709 | A1 | 1/2012 | Bennett et al. |
| 2012/0028703 | A1 | 2/2012 | Anderson et al. |
| 2012/0028718 | A1 | 2/2012 | Barclay et al. |
| 2012/0034968 | A1 | 2/2012 | Watkins et al. |
| 2012/0046096 | A1 | 2/2012 | Morrison |
| 2012/0046110 | A1 | 2/2012 | Amaitis |
| 2012/0094769 | A1 | 4/2012 | Nguyen et al. |
| 2012/0100908 | A1 | 4/2012 | Wells |
| 2012/0108319 | A1 | 5/2012 | Caputo et al. |
| 2012/0115591 | A1 | 5/2012 | Palermo |
| 2012/0122561 | A1 | 5/2012 | Hedrick |
| 2012/0122567 | A1 | 5/2012 | Gangadharan et al. |
| 2012/0122584 | A1 | 5/2012 | Nguyen |
| 2012/0122590 | A1 | 5/2012 | Nguyen |
| 2012/0172130 | A1 | 7/2012 | Acres |
| 2012/0184362 | A1 | 7/2012 | Barclay et al. |
| 2012/0184363 | A1 | 7/2012 | Barclay et al. |
| 2012/0185398 | A1 | 7/2012 | Weis |
| 2012/0190426 | A1 | 7/2012 | Acres |

(56) References Cited

U.S. PATENT DOCUMENTS

| | | | |
|---|---|---|---|
| 2012/0194448 A1 | 8/2012 | Rothkopf | |
| 2012/0208618 A1 | 8/2012 | Frerking | |
| 2012/0231885 A1 | 9/2012 | Speer, II | |
| 2012/0239566 A1 | 9/2012 | Everett | |
| 2012/0322563 A1 | 12/2012 | Nguyen et al. | |
| 2012/0330740 A1 | 12/2012 | Pennington et al. | |
| 2013/0005433 A1 | 1/2013 | Holch | |
| 2013/0005443 A1 | 1/2013 | Kosta | |
| 2013/0005453 A1 | 1/2013 | Nguyen et al. | |
| 2013/0059650 A1 | 3/2013 | Sylla et al. | |
| 2013/0065668 A1 | 3/2013 | LeMay | |
| 2013/0281188 A1 | 3/2013 | Guinn | |
| 2013/0103965 A1 | 4/2013 | Golembeski | |
| 2013/0104193 A1 | 4/2013 | Gatto et al. | |
| 2013/0130766 A1* | 5/2013 | Harris | G07F 17/3223 463/19 |
| 2013/0132745 A1 | 5/2013 | Schoening et al. | |
| 2013/0165210 A1 | 6/2013 | Nelson | |
| 2013/0185559 A1 | 7/2013 | Morel | |
| 2013/0196756 A1 | 8/2013 | Nguyen | |
| 2013/0196776 A1 | 8/2013 | Nguyen | |
| 2013/0210513 A1 | 8/2013 | Nguyen | |
| 2013/0210514 A1 | 8/2013 | Nguyen | |
| 2013/0210530 A1 | 8/2013 | Nguyen | |
| 2013/0225279 A1 | 8/2013 | Patceg | |
| 2013/0225282 A1 | 8/2013 | Williams et al. | |
| 2013/0252730 A1 | 9/2013 | Joshi | |
| 2013/0281187 A1 | 10/2013 | Skelton | |
| 2013/0316808 A1 | 11/2013 | Nelson | |
| 2013/0337878 A1 | 12/2013 | Shepherd | |
| 2013/0337889 A1 | 12/2013 | Gagner | |
| 2014/0006129 A1 | 1/2014 | Heath | |
| 2014/0057716 A1 | 2/2014 | Massing et al. | |
| 2014/0087862 A1 | 3/2014 | Burke | |
| 2014/0094295 A1 | 4/2014 | Nguyen | |
| 2014/0094316 A1 | 4/2014 | Nguyen | |
| 2014/0120999 A1* | 5/2014 | Graves | G07F 17/3223 463/19 |
| 2014/0121005 A1 | 5/2014 | Nelson | |
| 2014/0179431 A1 | 6/2014 | Nguyen | |
| 2014/0221071 A1* | 8/2014 | Calio | G07F 17/3225 463/31 |
| 2014/0274306 A1 | 9/2014 | Crawford | |
| 2014/0274309 A1 | 9/2014 | Nguyen | |
| 2014/0274319 A1 | 9/2014 | Nguyen | |
| 2014/0274320 A1 | 9/2014 | Nguyen | |
| 2014/0274342 A1 | 9/2014 | Nguyen | |
| 2014/0274357 A1 | 9/2014 | Nguyen | |
| 2014/0274360 A1 | 9/2014 | Nguyen | |
| 2014/0274367 A1 | 9/2014 | Nguyen | |
| 2014/0274388 A1 | 9/2014 | Nguyen | |
| 2015/0089595 A1 | 3/2015 | Telles | |
| 2015/0133223 A1 | 5/2015 | Carter | |
| 2015/0143543 A1 | 8/2015 | Phegade | |
| 2015/0287283 A1* | 10/2015 | Yarbrough | G07F 17/329 463/19 |
| 2016/0093154 A1* | 3/2016 | Bytnar | G07F 17/3237 463/25 |
| 2016/0125695 A1 | 5/2016 | Nguyen | |
| 2017/0016819 A1 | 4/2017 | Nguyen | |
| 2017/0116819 A1 | 4/2017 | Nguyen | |
| 2017/0116823 A1 | 4/2017 | Nguyen | |
| 2017/0144071 A1 | 5/2017 | Nguyen | |
| 2017/0148259 A1 | 5/2017 | Nguyen | |
| 2017/0148261 A1 | 5/2017 | Nguyen | |
| 2017/0148263 A1 | 5/2017 | Nguyen | |
| 2017/0206734 A1 | 7/2017 | Nguyen | |
| 2017/0228979 A1 | 8/2017 | Nguyen | |
| 2017/0243440 A1 | 8/2017 | Nguyen | |
| 2017/0337770 A1 | 11/2017 | Nguyen | |
| 2018/0144581 A1 | 5/2018 | Nguyen | |
| 2019/0005773 A1 | 1/2019 | Nguyen | |
| 2019/0122490 A1 | 4/2019 | Nguyen | |
| 2019/0122492 A1 | 4/2019 | Nguyen | |
| 2019/0213829 A1 | 7/2019 | Nguyen | |
| 2020/0372753 A1 | 11/2020 | Nguyen | |

FOREIGN PATENT DOCUMENTS

| | | |
|---|---|---|
| GB | 2096376 | 10/1982 |
| GB | 2097570 | 11/1982 |
| GB | 2335524 | 9/1999 |
| PH | 12005000454 | 5/2007 |
| WO | WO 05073933 | 8/2005 |
| WO | WO 2008/027621 | 3/2008 |
| WO | WO 2009/026309 | 2/2009 |
| WO | WO 2009/062148 | 5/2009 |
| WO | WO 2010/017252 A1 | 2/2010 |

OTHER PUBLICATIONS

Final Office Action for U.S. Appl. No. 13/801,234, dated May 22, 2014.

Advisory Action for U.S. Appl. No. 13/296,182, dated May 8, 2014.

Notice of Allowance for U.S. Appl. No. 13/843,192, dated Aug. 10, 2016.

Office Action for U.S. Appl. No. 16/190,050, dated Jun. 1, 2020.

Final Office Action for U.S. Appl. No. 16/449,717, dated Jan. 29, 2021.

Notice of Allowance for U.S. Appl. No. 15/811,654, dated Feb. 3, 2021.

Notice of Allowance for U.S. Appl. No. 14/017,150, dated Feb. 5, 2021.

Final Office Action for U.S. Appl. No. 16/794,212, dated Feb. 17, 2021.

Office Action for U.S. Appl. No. 16/351,416, dated Feb. 23, 2021.

Office Action for U.S. Appl. No. 15/674,480, dated Mar. 25, 2021.

Final Office Action for U.S. Appl. No. 16/219,940, dated Mar. 26, 2021.

Office Action for U.S. Appl. No. 13/296,182, mailed Feb. 25, 2016.

Office Action for U.S. Appl. No. 16/183,632, dated May 4, 2021.

Office Action for U.S. Appl. No. 16/559,553, mailed Jun. 1, 2021.

Notice of Allowance for U.S. Appl. No. 16/579,754, mailed Jul. 16, 2021.

Office Action for U.S. Appl. No. 13/622,702, mailed Jul. 19, 2021.

Office Action for U.S. Appl. No. 16/357,316, mailed Jul. 20, 2021.

Office Action for U.S. Appl. No. 16/993,154, mailed Jul. 28, 2021.

Final Office Action for U.S. Appl. No. 16/351,416, mailed Sep. 1, 2021.

Office Action for U.S. Appl. No. 15/671,133, mailed Sep. 2, 2021.

Notice of Allowance for U.S. Appl. No. 16/794,212, mailed Sep. 3, 2021.

Office Action for U.S. Appl. No. 17/020,761, mailed Sep. 9, 2021.

Office Action for U.S. Appl. No. 16/916,001, mailed Sep. 17, 2021.

Advisory Action for U.S. Appl. No. 13/632,828, dated Feb. 25, 2016.

Office Action for U.S. Appl. No. 13/622,702, dated Sep. 19, 2012.

Office Action for U.S. Appl. No. 13/801,719, dated Jun. 6, 2016.

Office Action (Notice of Allowance and Fees Due (PTOL-85) dated Mar. 22, 2022 for U.S. Appl. No. 16/248,759 (pp. 1-9).

Office Action (Notice of Allowance and Fees Due (PTOL-85)) dated Apr. 11, 2022 for U.S. Appl. No. 16/248,759 (pp. 1-6).

Office Action (Notice of Allowance and Fees Due (PTOL-85)) dated Apr. 7, 2022 for U.S. Appl. No. 14/017,159 (pp. 1-8).

Office Action (Non-Final Rejection) dated Apr. 20, 2022 for U.S. Appl. No. 17/306,946 (pp. 1-6).

Office Action (Non-Final Rejection) dated Jun. 6, 2022 for U.S. Appl. No. 16/248,759 (pp. 1-10).

Office Action (Non-Final Rejection) dated Sep. 8, 2022 for U.S. Appl. No. 17/485,289 (pp. 1-5).

Office Action (Notice of Allowance and Fees Due (PTOL-85)) dated Sep. 29, 2022 for U.S. Appl. No. 17/306,946 (pp. 1-8).

Office Action (Notice of Allowance and Fees Due (PTOL-85)) dated Nov. 7, 2022 for U.S. Appl. No. 16/248,759 (pp. 1-9).

Office Action (Notice of Allowance and Fees Due (PTOL-85)) dated Dec. 27, 2022 for U.S. Appl. No. 17/485,289 (pp. 1-8).

(56) References Cited

OTHER PUBLICATIONS

Office Action (Non-Final Rejection) dated Jan. 13, 2023 for U.S. Appl. No. 17/337,393 (pp. 1-5).
Office Action (Notice of Allowance and Fees Due (PTOL-85)) dated Feb. 2, 2023 for U.S. Appl. No. 17/306,946 (pp. 1-7).
Office Action (Non-Final Rejection) dated Mar. 22, 2023 for U.S. Appl. No. 16/248,759 (pp. 1-18).
Office Action (Notice of Allowance and Fees Due (PTOL-85)) dated May 25, 2023 for U.S. Appl. No. 17/337,393 (pp. 1-7).
Office Action (Non-Final Rejection) dated Mar. 5, 2024 for U.S. Appl. No. 18/328,259 (pp. 1-8).
Office Action dated Mar. 28, 2024 for U.S. Appl. No. 18/234,503 (pp. 1-10).
Benston, Liz, "Harrahs Launches iPhone App; Caesars Bypasses Check-in," Las Vegas Sun, Las Vegas, NV. Jan. 8, 2010.
Finnegan, Amanda, "Casinos Connecting with Customers via iphone Apps", May 27, 2010, Las Vegas Sun, Las Vegas, NV.
Gaming Today Staff, "Slots showcased at 2009 National Indian Gaming Assoc.", GamingToday.com, Apr. 14, 2009.
Green, Marian, "Testing Texting Casino Journal", Mar. 2, 2009.
Hasan, Ragib, et al., "A Survey of Peer-to-Peer Storage Techniques for Distributed File Systems", National Center for Supercomputing Applications, Department of Computer Science, University of Illinois at Urbana Champaign, Jun. 27, 2005.
Jones, Trahern, "Telecon-equipped drones could revolutionize wireless market", azcentral.com, http://www.azcentral.com/business/news/articles/20130424telecom-equipped-drones-could-revolutionize-wireless-market.html, downloaded Jul. 2, 2013, 2 pages.
Yancey, Kitty Bean, "Navigate Around Vegas with New iPhone Apps", USA Today, Jun. 3, 2010.
IAPS, Daily Systems LLC, 2010.
U.S. Appl. No. 12/945,888, filed Nov. 14, 2010.
U.S. Appl. No. 12/945,889, filed Nov. 14, 2010.
U.S. Appl. No. 13/622,702, filed Sep. 19, 2012.
U.S. Appl. No. 13/800,917, filed Mar. 13, 2013.
U.S. Appl. No. 13/296,182, filed Nov. 15, 2011.
U.S. Appl. No. 13/801,234, filed Mar. 13, 2013.
U.S. Appl. No. 13/801,171, filed Mar. 13, 2013.
U.S. Appl. No. 13/843,192, filed Mar. 15, 2013.
U.S. Appl. No. 13/843,087, filed Mar. 15, 2013.
U.S. Appl. No. 13/632,743, filed Oct. 1, 2012.
U.S. Appl. No. 13/632,828, filed Oct. 1, 2012.
U.S. Appl. No. 13/833,953, filed Mar. 15, 2013.
U.S. Appl. No. 12/619,672, filed Nov. 16, 2009.
U.S. Appl. No. 13/801,121, filed Mar. 13, 2013.
U.S. Appl. No. 12/581,115, filed Oct. 17, 2009.
U.S. Appl. No. 13/801,076, filed Mar. 13, 2013.
U.S. Appl. No. 13/617,717, filed Nov. 12, 2009.
U.S. Appl. No. 13/633,118, filed Oct. 1, 2012.
U.S. Appl. No. 12/797,610, filed Jun. 10, 2010.
U.S. Appl. No. 13/801,256, filed Mar. 13, 2013.
U.S. Appl. No. 12/757,968, filed Apr. 9, 2010.
U.S. Appl. No. 12/797,616, filed Jun. 10, 2010.
U.S. Appl. No. 13/557,063, filed Jul. 24, 2012.
U.S. Appl. No. 13/833,116, filed Mar. 15, 2013.
U.S. Appl. No. 13/801,271, filed Mar. 13, 2011.
Office Action for U.S. Appl. No. 12/945,888 dated Apr. 10, 2012.
Final Office Action for U.S. Appl. No. 12/945,888 dated Sep. 21, 2012.
Advisory Action for U.S. Appl. No. 12/945,888 dated Jan. 30, 2013.
Office Action for U.S. Appl. No. 12/581,115 dated Dec. 20, 2011.
Final Office Action for U.S. Appl. No. 12/581,115 dated Sep. 13, 2012.
Notice of Allowance for U.S. Appl. No. 12/581,115 dated May 24, 2013.
Office Action for U.S. Appl. No. 12/619,672 dated Dec. 20, 2011.
Final Office Action for U.S. Appl. No. 12/619,672 dated Nov. 6, 2012.
Office Action for U.S. Appl. No. 12/619,672 dated March, 7, 2013.
Office Action for U.S. Appl. No. 12/617,717 dated Oct. 4, 2011.
Office Action for U.S. Appl. No. 12/617,717 dated Apr. 4, 2012.
Advisory Action for U.S. Appl. No. 12/617,717 dated Jun. 12, 2011.
Office Action for U.S. Appl. No. 12/617,717 dated Jun. 17, 2013.
Office Action for U.S. Appl. No. 12/797,610 dated Dec. 8, 2011.
Final Office Action for U.S. Appl. No. 12/797,610 dated Jun. 6, 2012.
Office Action for U.S. Appl. No. 12/797,610 dated Feb. 26, 2013.
Office Action for U.S. Appl. No. 12/757,968, dated May 9, 2012.
Final Office Action for U.S. Appl. No. 12/757,968, dated Nov. 29, 2012.
Office Action for U.S. Appl. No. 12/757,968, dated Apr. 25, 2013.
Office Action for U.S. Appl. No. 12/797,616 dated Mar. 15, 2012.
Final Office Action for U.S. Appl. No. 12/797,616 dated Oct. 13, 2012.
Office Action for U.S. Appl. No. 12/797,616 dated Feb. 13, 2013.
Final Office Action for U.S. Appl. No. 12/797,616 dated May 8, 2013.
Office Action for U.S. Appl. No. 13/296,182 dated Dec. 5, 2012.
Brochure, 5000 Ft. Inc., 1 page, Nov. 2010.
Frontier Fortune game, email notification, MGM Resorts Intl., Aug. 9, 2013.
"Getting Back in the Game: Geolocation Can Ensure Compliance with New iGaming Regulations", White Paper, Quova, Inc., 2010.
Notice of Allowance of U.S. Appl. No. 12/619,672, mailed Aug. 23, 2013.
Office Action for U.S. Appl. No. 13/633,118, mailed Sep. 20, 2013.
Office Action for U.S. Appl. No. 13/801,256, mailed Jul. 2, 2013.
Notice of Allowance for U.S. Appl. No. 12/619,672, mailed Oct. 3, 2013.
Notice of Allowance for U.S. Appl. No. 12/757,968, mailed Oct. 11, 2013.
Final Office Action for U.S. Appl. No. 12/797,610, mailed Jul. 10, 2013.
Office Action for U.S. Appl. No. 12/617,717, mailed Jun. 17, 2013.
Notice of Allowance for U.S. Appl. No. 12/757,968, mailed Dec. 18, 2013.
Office Action for U.S. Appl. No. 12/945,889, mailed Dec. 18, 2013.
Office Action for U.S. Appl. No. 13/632,828, mailed Jul. 30, 2013.
Restriction Requirement for U.S. Appl. No. 13/801,256, mailed Dec. 30, 2013.
Office Action for U.S. Appl. No. 13/801,171, mailed Dec. 26, 2013.
Office Action for U.S. Appl. No. 13/801,234, mailed Jan. 10, 2014.
Final Office Action for U.S. Appl. No. 13/296,182, mailed Feb. 12, 2014.
Office Action for U.S. Appl. No. 12/617,717, mailed Feb. 25, 2014.
Office Action for U.S. Appl. No. 13/801,076, mailed Mar. 28, 2014.
Final Office Action for U.S. Appl. No. 13/633,118, mailed Apr. 3, 2014.
Office Action for U.S. Appl. No. 13/843,192, mailed Apr. 3, 2014.
Office Action for U.S. Appl. No. 13/632,743, mailed Apr. 10, 2014.
Office Action for U.S. Appl. No. 13/801,121, mailed Apr. 11, 2014.
Final Office Action for U.S. Appl. No. 12/945,889, mailed Jun. 30, 2014.
Notice of Allowance for U.S. Appl. No. 12/617,717, mailed Jul. 14, 2014.
Office Action for U.S. Appl. No. 13/801,121, mailed Sep. 24, 2014.
Office Action for U.S. Appl. No. 13/801,171, mailed Sep. 22, 2014.
Office Action for U.S. Appl. No. 13/801,234, mailed Oct. 1, 2014.
Office Action for U.S. Appl. No. 13/801,271, mailed Oct. 31, 2014.
Final Office Action for U.S. Appl. No. 13/843,192, mailed Oct. 21, 2014.
Office Action for U.S. Appl. No. 13/632,743, mailed Oct. 23, 2014.
Office Action for U.S. Appl. No. 12/945,889, mailed Oct. 23, 2014.
Office Action for U.S. Appl. No. 13/632,828, mailed Nov. 7, 2014.
Office Action for U.S. Appl. No. 12/797,610, mailed Dec. 15, 2014.
Final Office Action for U.S. Appl. No. 12/945,889, mailed Feb. 12, 2015.
Final Office Action for U.S. Appl. No. 13/801,171, mailed Mar. 16, 2015.
Office Action for U.S. Appl. No. 13/833,116, mailed Mar. 27, 2015.
Office Action for U.S. Appl. No. 13/632,828, mailed Apr. 10, 2015.
Final Office Action for U.S. Appl. No. 13/801,121, mailed Apr. 21, 2015.

(56) References Cited

OTHER PUBLICATIONS

Final Office Action for U.S. Appl. No. 13/557,063, mailed Apr. 28, 2015.
Office Action for U.S. Appl. No. 13/296,182, mailed Jun. 5, 2015.
Office Action for U.S. Appl. No. 13/843,192, mailed Jun. 19, 2015.
Office Action for U.S. Appl. No. 12/797,610, mailed Jul. 14, 2015.
Final Office Action for U.S. Appl. No. 13/833,953, mailed Jul. 17, 2015.
Notice of Allowance for U.S. Appl. No. 12/945,889, mailed Jul. 22, 2015.
Office Action for U.S. Appl. No. 12/797,616, mailed Aug. 10, 2015.
Final Office Action for U.S. Appl. No. 13/801,234, mailed Aug. 14, 2015.
Final Office Action for U.S. Appl. No. 13/833,116, mailed Sep. 24, 2015.
Office Action for U.S. Appl. No. 13/801,121, mailed Oct. 2, 2015.
Office Action for U.S. Appl. No. 14/017,150, mailed Oct. 7, 2015.
Office Action for U.S. Appl. No. 14/017,159, mailed Oct. 7, 2015.
Office Action for U.S. Appl. No. 13/801,271 mailed Oct. 19, 2015.
Office Action for U.S. Appl. No. 14/211,536 mailed Oct. 19, 2015.
Final Office Action for U.S. Appl. No. 13/632,828, mailed Oct. 22, 2015.
Office Action for U.S. Appl. No. 14/217,066, mailed Dec. 17, 2015.
Notice of Allowance for U.S. Appl. No. 13/557,063, mailed Dec. 23, 2015.
Office Action for U.S. Appl. No. 13/296,182, mailed Dec. 23, 2015.
Final Office Action for U.S. Appl. No. 13/843,192, mailed Dec. 30, 2015.
Office Action for U.S. Appl. No. 13/801,076, mailed Jan. 11, 2016.
Office Action for U.S. Appl. No. 12/945,888, mailed Jan. 22, 2016.
Final Office Action for U.S. Appl. No. 12/797,616, mailed Jun. 12, 2016.
Office Action for U.S. Appl. No. 13/843,087, mailed Feb. 25, 2016.
Office Action for U.S. Appl. No. 13/800,917, mailed Feb. 25, 2016.
Advisory Action for U.S. Appl. No. 13/632,828, mailed Feb. 25, 2016.
Office Action for U.S. Appl. No. 13/801,234, mailed Mar. 8, 2016.
Office Action for U.S. Appl. No. 14/216,986, mailed Mar. 9, 2016.
Final Office Action for U.S. Appl. No. 13/801,271, mailed Mar. 11, 2016.
Office Action for U.S. Appl. No. 13/622,702, mailed Mar. 22, 2016.
Final Office Action for U.S. Appl. No. 13/633,118, mailed Mar. 24, 2016.
Final Office Action for U.S. Appl. No. 14/189,948, mailed Apr. 6, 2016.
Final Office Action for U.S. Appl. No. 12/797,610, mailed Apr. 21, 2016.
Final Office Action for U.S. Appl. No. 14/017,150, mailed Apr. 26, 2016.
Final Office Action for U.S. Appl. No. 13/801,121, mailed May 11, 2016.
Final Office Action for U.S. Appl. No. 14/017,159, mailed Jun. 6, 2016.
Office Action for U.S. Appl. No. 13/801,171, mailed Jun. 6, 2016.
Office Action for U.S. Appl. No. 13/843,192, mailed Jun. 9, 2016.
Final OA for U.S. Appl. No. 12/945,888, mailed Jun. 28, 2016.
Notice of Allowance for U.S. Appl. No. 13/833,953, mailed Jul. 6, 2016.
Final Office Action for U.S. Appl. No. 13/801,171, mailed May 21, 2014.
Final Office Action for U.S. Appl. No. 13/801,234, mailed May 22, 2014.
Office Action for U.S. Appl. No. 14/211,536, mailed Jul. 13, 2016.
Notice of Allowance for U.S. Appl. No. 13/801,076, mailed Jul. 11, 2016.
Office Action for U.S. Appl. No. 13/296,182, mailed Jul. 20, 2016.
Restriction Requirement for U.S. Appl. No. 13/296,182, mailed Oct. 12, 2012.
Advisory Action for U.S. Appl. No. 13/296,182, mailed May 8, 2014.
Advisory Action for U.S. Appl. No. 13/843,192, mailed May 8, 2014.
Notice of Allowance for U.S. Appl. No. 13/843,192, mailed Aug. 10, 2016.
Office Action for U.S. Appl. No. 14/217,066, mailed Dec. 22, 2016.
Final Office Action for U.S. Appl. No. 14/216,986, mailed Sep. 23, 2016.
Office Action for U.S. Appl. No. 14/017,159, mailed Sep. 23, 2016.
Office Action for U.S. Appl. No. 13/632,743, mailed Sep. 23, 2016.
Final Office Action for U.S. Appl. No. 13/801,234, mailed Oct. 14, 2016.
Final Office Action for U.S. Appl. No. 13/843,087, mailed Oct. 13, 2016.
Final Office Action for U.S. Appl. No. 13/622,702, mailed Oct. 13, 2016.
Office Action for U.S. Appl. No. 14/189,948, mailed Nov. 7, 2016.
Final Office Action for U.S. Appl. No. 14/211,536, mailed Mar. 14, 2014.
Notice of Allowance for U.S. Appl. No. 13/833,116, mailed Oct. 11, 2016.
Notice of Allowance for U.S. Appl. No. 13/801,271, mailed Dec. 2, 2016.
Notice of Allowance for U.S. Appl. No. 12/797,610, mailed Dec. 7, 2016.
Notice of Allowance for U.S. Appl. No. 13/632,828, mailed Dec. 16, 2016.
Final Office Action for U.S. Appl. No. 13/801,171, mailed Dec. 19, 2016.
Notice of Allowance for U.S. Appl. No. 14/211,536, mailed Dec. 28, 2016.
Notice of Allowance for U.S. Appl. No. 13/801,256, mailed Jan. 20, 2017.
Office Action for U.S. Appl. No. 13/800,917, mailed Feb. 3, 2017.
Final Office Action for U.S. Appl. No. 12/797,616, mailed Feb. 10, 2017.
Office Action for U.S. Appl. No. 12/945,888, mailed Feb. 28, 2017.
Final Office Action for U.S. Appl. No. 14/189,948, mailed Mar. 17, 2017.
Office Action for U.S. Appl. No. 15/400,840, mailed Mar. 10, 2017.
Notice of Allowance for U.S. Appl. No. 13/801,121, mailed Mar. 29, 2017.
Office Action for U.S. Appl. No. 15/270,333, mailed Mar. 30, 2017.
Office Action for U.S. Appl. No. 15/402,945, mailed Apr. 5, 2017.
Office Action for U.S. Appl. No. 15/271,488, mailed Apr. 19, 2017.
Final Office Action for U.S. Appl. No. 14/217,066, mailed Apr. 21, 2017.
Office Action for U.S. Appl. No. 14/216,986 mailed Apr. 26, 2017.
Office Action for U.S. Appl. No. 13/801,171, mailed Jun. 14, 2017.
Office Action for U.S. Appl. No. 14/017,159, mailed Jun. 29, 2017.
Notice of Allowance for U.S. Appl. No. 15/270,333, mailed Jul. 5, 2017.
Final Office Action for U.S. Appl. No. 13/800,917, mailed Jul. 13, 2017.
Notice of Allowance for U.S. Appl. No. 13/801,234, mailed Jul. 5, 2017.
Notice of Allowance for U.S. Appl. No. 14/217,066, mailed Jul. 14, 2017.
Final Office Action for U.S. Appl. No. 14/518,909, mailed Jul. 19, 2017.
Final Office Action for U.S. Appl. No. 13/801,121, mailed Sep. 15, 2016.
Advisory Action for U.S. Appl. No. 13/801,121, mailed Jul. 17, 2015.
Advisory Action for U.S. Appl. No. 13/801,121, mailed Jul. 19, 2016.
Notice of Allowance for U.S. Appl. No. 15/293,751, mailed Aug. 4, 2017.
Advisory Action for U.S. Appl. No. 14/189,948, mailed Jul. 28, 2017.
Final OA for U.S. Appl. No. 13/801,256, mailed Aug. 15, 2014.
Final OA for U.S. Appl. No. 13/801,256, mailed Feb. 18, 2015.
Advisory Action for U.S. Appl. No. 13/801,256, mailed Dec. 5, 2014.

(56) References Cited

OTHER PUBLICATIONS

Office Action for U.S. Appl. No. 13/801,256, mailed Jan. 12, 2016.
Final Office Action for U.S. Appl. No. 13/801,256, mailed Aug. 16, 2016.
Office Action for U.S. Appl. No. 13/622,702, mailed Aug. 31, 2017.
Office Action for U.S. Appl. No. 12/945,888, mailed Sep. 1, 2017.
Office Action for U.S. Appl. No. 14/017,150, mailed Sep. 7, 2017.
Notice of Allowance for U.S. Appl. No. 14/189,948, mailed Sep. 13, 2017.
Office Action for U.S. Appl. No. 15/138,086, mailed Oct. 19, 2017.
Notice of Allowance for U.S. Appl. No. 15/402,945 mailed Nov. 21, 2017.
Final Office Action for U.S. Appl. No. 13/801,171, mailed Dec. 13, 2017.
Final Office Action for U.S. Appl. No. 15/271,488, mailed Dec. 21, 2017.
Office Action for U.S. Appl. No. 15/671,133, mailed Dec. 22, 2017.
Final Office Action for U.S. Appl. No. 14/216,986, mailed Dec. 26, 2017.
Restriction Requirement for U.S. Appl. No. 15/427,307, mailed Jan. 17, 2018.
Office Action for U.S. Appl. No. 15/798,363, mailed Jan. 26, 2018.
Office Action for U.S. Appl. No. 15/427,291, mailed Jan. 29, 2018.
Final Office Action for U.S. Appl. No. 14/017,159, mailed Feb. 1, 2018.
Final Office Action for U.S. Appl. No. 13/622,702, mailed Feb. 22, 2018.
Office Action for U.S. Appl. No. 15/811,654, Mailed Feb. 22, 2018.
Final Office Action for U.S. Appl. No. 13/622,702, mailed Feb. 27, 2018.
Final Office Action for U.S. Appl. No. 15/427,308, mailed Mar. 19, 2018.
Office Action for U.S. Appl. No. 15/876,095, mailed Apr. 3, 2018.
Office Action for U.S. Appl. No. 15/835,448, mailed Apr. 4, 2018.
Office Action for U.S. Appl. No. 15/427,307, mailed Apr. 9, 2018.
Office Action for U.S. Appl. No. 14/216,986, mailed Apr. 6, 2018.
Office Action for U.S. Appl. No. 15/426,898 mailed Apr. 16, 2018.
Notice of Allowance for U.S. Appl. No. 15/402,945, mailed May 25, 2018.
Office Action for U.S. Appl. No. 15/495,973, mailed Jun. 4, 2018.
Notice of Allowance for U.S. Appl. No. 15/427,291 mailed Jun. 18, 2018.
Notice of Allowance for U.S. Appl. No. 15/271,488, mailed Jun. 19, 2018.
Notice of Allowance for U.S. Appl. No. 15/480,295, mailed Jun. 20, 2018.
Office Action for U.S. Appl. No. 14/963,106, mailed Jun. 22, 2018.
Office Action for U.S. Appl. No. 14/993,055, mailed Jun. 22, 2018.
Final Office Action for U.S. Appl. No. 15/427,307, mailed Jul. 9, 2018.
Notice of Allowance for U.S. Appl. No. 13/633,118, mailed Aug. 3, 2018.
Office Action for U.S. Appl. No. 15/671,133, mailed Aug. 9, 2018.
Office Action for U.S. Appl. No. 15/427,308, mailed Aug. 15, 2018.
Office Action for U.S. Appl. No. 15/798,363, mailed Aug. 29, 2018.
Office Action for U.S. Appl. No. 15/428,922 mailed Sep. 17, 2018.
Office Action for U.S. Appl. No. 15/495,975, mailed Sep. 21, 2018.
Notice of Allowance for U.S. Appl. No. 15/271,488, mailed Sep. 24, 2018.
Notice of Allowance for U.S. Appl. No. 15/876,095, mailed Sep. 24, 2018.
Office Action for U.S. Appl. No. 13/622,702, mailed Oct. 3, 2018.
Office Action for U.S. Appl. No. 15/293,751, mailed Apr. 6, 2017.
Notice of Allowance for U.S. Appl. No. 13/801,171, mailed Oct. 31, 2018.
Final Office Action for U.S. Appl. No. 15/835,448, mailed Nov. 2, 2018.
Final Office Action for U.S. Appl. No. 15/480,295, mailed Nov. 7, 2018.
Final Office Action for U.S. Appl. No. 14/963,106, mailed Dec. 14, 2018.
Final Office Action for U.S. Appl. No. 14/993,055, mailed Dec. 14, 2018.
Office Action for U.S. Appl. No. 16/162,358, mailed Dec. 31, 2018.
Office Action for U.S. Appl. No. 14/017,159, mailed Jan. 11, 2019.
Office Action for U.S. Appl. No. 15/426,898, mailed Jan. 11, 2019.
Final Office Action for U.S. Appl. No. 15/495,973, mailed Jan. 11, 2019.
Office Action for U.S. Appl. No. 14/216,986, mailed Jan. 14, 2019.
Office Action for U.S. Appl. No. 15/427,307, mailed Jan. 18, 2019.
Final Office Action for U.S. Appl. No. 15/798,363, mailed Feb. 4, 2019.
Office Action for U.S. Appl. No. 16/125,614, mailed Feb. 25, 2019.
Final Office Action for U.S. Appl. No. 15/495,975, mailed Apr. 18, 2019.
Office Action for U.S. Appl. No. 15/671,133, mailed May 1, 2019.
Notice of Allowance for U.S. Appl. No. 14/216,986, mailed May 17, 2019.
Notice of Allowance for U.S. Appl. No. 14/518,909, mailed May 17, 2019.
Office Action for U.S. Appl. No. 12/797,616, mailed Jun. 5, 2019.
Office Action for U.S. Appl. No. 15/427,308, mailed Jun. 14, 2019.
Office Action for U.S. Appl. No. 15/811,654, mailed Jun. 14, 2019.
Office Action for U.S. Appl. No. 15/674,480, mailed Jun. 20, 2019.
Notice of Allowance for U.S. Appl. No. 15/835,448, mailed Jul. 3, 2019.
Final Office Action for U.S. Appl. No. 16/162,358, mailed Jul. 11, 2019.
Office Action for U.S. Appl. No. 16/190,050, mailed Sep. 19, 2019.
Office Action for U.S. Appl. No. 14/017,150, mailed Oct. 9, 2019.
Final Office Action for U.S. Appl. No. 15/671,133, mailed Oct. 18, 2019.
Office Action for U.S. Appl. No. 15/835,448 mailed Oct. 12, 2019.
Notice of Allowance for U.S. Appl. No. 15/495,975, mailed Oct. 23, 2019.
Notice of Allowance for U.S. Appl. No. 14/993,005, mailed Nov. 27, 2019.
Final Office Action for U.S. Appl. No. 15/427,308, mailed Nov. 27, 2019.
Office Action for U.S. Appl. No. 15/798,363, mailed Jan. 8, 2020.
Office Action for U.S. Appl. No. 15/835,448, mailed Mar. 5, 2020.
Office Action for U.S. Appl. No. 15/495,975, mailed Mar. 17, 2020.
Office Action for U.S. Appl. No. 16/248,759, mailed Apr. 1, 2020.
Final Office Action for U.S. Appl. No. 14/017,150, mailed Apr. 17, 2020.
Notice of Allowance for U.S. Appl. No. 15/798,363, mailed May 12, 2020.
Office Action for U.S. Appl. No. 16/357,316, mailed May 21, 2020.
Office Action for U.S. Appl. No. 15/674,480, mailed Jun. 5, 2020.
Notice of Allowance for U.S. Appl. No. 15/480,295, mailed Jun. 15, 2020.
Office Action for U.S. Appl. No. 13/622,702, mailed Jun. 22, 2020.
Office Action for U.S. Appl. No. 15/811,654, mailed Jun. 26, 2020.
Office Action for U.S. Appl. No. 16/579,754, mailed Jul. 22, 2020.
Office Action for U.S. Appl. No. 16/219,940, mailed Jul. 22, 2020.
Office Action for U.S. Appl. No. 16/559,553, mailed Sep. 11, 2020.
Office Action for U.S. Appl. No. 16/794,212, mailed Sep. 11, 2020.
Restriction Requirement for U.S. Appl. No. 16/600,395, mailed Sep. 18, 2020.
Final Office Action for U.S. Appl. No. 16/248,759, mailed Oct. 6, 2020.
Final Office Action for U.S. Appl. No. 15/671,133, mailed Oct. 7, 2020.
Final Office Action for U.S. Appl. No. 16/357,316, mailed Oct. 8, 2020.
Final Office Action for U.S. Appl. No. 16/183,632, mailed Oct. 9, 2020.
Office Action for U.S. Appl. No. 16/590,347, mailed Oct. 13, 2020.
Office Action for U.S. Appl. No. 16/449,717, mailed Nov. 9, 2020.
Final Office Action for U.S. Appl. No. 13/622,702, mailed Nov. 30, 2020.

(56) References Cited

OTHER PUBLICATIONS

Final Office Action for U.S. Appl. No. 15/674,480, mailed Dec. 7, 2020.
Office Action for U.S. Appl. No. 16/168,813, mailed Dec. 8, 2020.
Office Action for U.S. Appl. No. 16/600,395, mailed Dec. 22, 2020.
"Professional Casino Slot Machine", Posted at www.vbtutor.net/VB.Sample/vbslot2.htm on Oct. 20, 2009.
Final Office Action for U.S. Appl. No. 16/559,553, mailed Jan. 21, 2021.
Office Action (Notice of Allowance and Fees Due (PTOL-85)) dated Jul. 31, 2024 for U.S. Appl. No. 18/328,259 (pp. 1-8).
Office Action (Notice of Allowance and Fees Due (PTOL-85)) dated Aug. 14, 2024 for U.S. Appl. No. 18/328,259 (pp. 1-4).

* cited by examiner

FIG. 17
Bet Results
Bet Placed: $5.00
Gaming Establishment: Silver Legacy -- Reno, NV
Gaming Apparatus: Slot Machine #45432
Slot Type: Wheel of Fortune
Progressive Jackpot Amount: $1,230,000
Time of Game: 12:06:05, January 1, 2017
Result: Won $100.00
Winner!
You Won $100.00

ADAPTIVE MOBILE DEVICE GAMING SYSTEM

CROSS-REFERENCE TO RELATED APPLICATIONS

This application is a continuation-in-part of U.S. patent application Ser. No. 16/590,347, filed Oct. 1, 2019, and entitled "ADAPTIVE MOBILE DEVICE GAMING SYSTEM", which is hereby incorporated by reference herein, and which in turn is a continuation of U.S. patent application Ser. No. 16/143,428, filed Sep. 26, 2018, and entitled "ADAPTIVE MOBILE DEVICE GAMING SYSTEM" (now U.S. Pat. No. 10,445,978, which is hereby incorporated by reference herein, and which in turn is a continuation of U.S. patent application Ser. No. 15/427,291, filed Feb. 8, 2017, and entitled "ADAPTIVE MOBILE DEVICE GAMING SYSTEM" (now U.S. Pat. No. 10,115,263), which is hereby incorporated by reference herein, and which in turn is a continuation of U.S. patent application Ser. No. 14/211,536, filed Mar. 14, 2014, and entitled "ADAPTIVE MOBILE DEVICE GAMING SYSTEM" (now U.S. Pat. No. 9,600,976), which is hereby incorporated by reference herein, and which in turn claims priority to (i) U.S. Provisional Patent Application No. 61/873,300, filed Sep. 3, 2013, and entitled "ADAPTIVE MOBILE DEVICE GAMING SYSTEM", which is hereby incorporated by reference herein; and (ii) U.S. Provisional Patent Application No. 61/799,862, filed Mar. 15, 2013, and entitled "ADAPTIVE MOBILE DEVICE GAMING SYSTEM", which is hereby incorporated by reference herein.

This application is a divisional of U.S. patent application Ser. No. 16/248,759, filed Jan. 15, 2019, and entitled "GAME MANAGEMENT FOR MOBILE AND REMOTE GAMING DEVICES", which is hereby incorporated by reference herein, and which in turn claims priority to U.S. Provisional Patent Application No. 62/617,579, filed on Jan. 15, 2018 and entitled "GAME MANAGEMENT FOR MOBILE AND REMOTE GAMING DEVICES," which is hereby incorporated herein by reference.

BACKGROUND

Today, mobile betting is available at designated sports betting areas of casinos. However, this means that mobile betting is not available when one is not at a designated sports betting area. This is a burden to customer and leads to limited opportunities for sports betting. Mobile gaming has been contemplated but gaming regulations hinder its implementation.

Portable electronic devices represent an alternative means to desktop computers to allow users to more conveniently interact with a variety of multimedia services. For example, many portable electronic devices may be configured to allow for the user to interact with multimedia services, messaging services, internet browsing services, telephone services, and the like. Furthermore, the software of portable electronic devices may be configured to be updated so as allow for the presentation of additional multimedia services or applications. Portable electronic devices may also be configured to have wireless transmission and receiving capabilities so as to permit communication with one or more other sources.

Hence, there is a continuing need for improved approaches to enhance mobile betting or gaming opportunities.

SUMMARY

Embodiments disclosed herein concern mobile gaming environments. Portable electronic devices can be supported by the mobile gaming environments. The locations of the portable electronic device can influence how the portable electronic devices operate or what services or features are available to the portable electronic device or their users. According to one embodiment, a mobile gaming system can concern gaming/betting opportunities that can be secured using a portable electronic device even when an individual is located in a location where betting or games of chance are not permitted. According to another embodiment, wagers are advantageously configured, managed or otherwise processed such that they can be deferred, conditional and/or proxy assisted. Electronic gaming kiosks, personal mobile electronic devices, and/or gaming devices can be provided, and used individually or in combination, to facilitate entry, receipt and/or management of wagers.

The invention can be implemented in numerous ways, including as a method, system, device, apparatus (including computer readable medium and graphical user interface). Several embodiments of the invention are discussed below.

As a gaming system for wager-based games, one embodiment can, for example, include at least: a plurality of conditional wager terminals configured to permit players to make conditional wagers for wager-based games; a conditional wager management system configured to electronically receive the conditional wagers from players operating the conditional wager terminals, evaluate conditions of the conditional wagers, and determine when to activate the conditional wagers; and an authorized gaming system for executing wager-based games for the conditional wagers once the conditional wager management system determines that the conditional wagers are to be activated.

As a gaming system for wager-based games, another embodiment can, for example, include at least: a conditional wager management system configured to electronically receive a multi-conditional wager from a player, evaluate conditions of the multi-conditional wager, and determine when to invoke the conditional wager; and a gaming management system configured to interact with an authorized gaming apparatus to cause a conditional wager for a wager-based game to be performed on the authorized gaming apparatus once the conditional wager management system determines that the conditional wager is to be invoked, and to acquire a result of the conditional wager for the wager-based games. The conditional wager management system can receive gaming status information associated with the authorized gaming apparatus, and the conditional wager management system can operate to valuate the conditions of the multi-conditional wager based on the gaming status information.

As a method for managing conditional wagers for wager-based games, one embodiment can, for example, include at least: receiving a conditional wager of a player, the conditional wager being conditional on a plurality of conditions; subsequently evaluating the plurality of conditions; determining whether the plurality of conditions are satisfied; activating the conditional wager if the determining has determined that the plurality of conditions are satisfied; receiving a result of the conditional wager; and facilitating notification of the wager result to the player via electronic message.

As a method for managing conditional wagers for wager-based games, one embodiment can, for example, include at least: receiving a proxy play request from a player, the proxy play request being a request for a proxy to effect a wager on a wager-based game; requiring that the player have a player account; assigning and instructing a proxy to place the wager on the wager-based game for the player; awaiting wager results from the wager on play of the wager-based game by the proxy for the player; and notify the player of the wager results from the proxy play request.

As a computer readable medium including at least computer program code tangibly stored thereon for managing conditional wagers for wager-based games, one embodiment can, for example, include at least: computer program code for receiving a conditional wager of a player, the conditional wager being conditional on a plurality of conditions; computer program code for subsequently evaluating the plurality of conditions; computer program code for determining whether the plurality of conditions are satisfied; computer program code for activating the conditional wager if the computer program code for determining has determined that the plurality of conditions are satisfied; computer program code for receiving a result of the conditional wager; and computer program code for facilitating notification of the wager result to the player via electronic message.

As a computer readable medium including at least computer program code tangibly stored thereon for managing wagers for wager-based games, one embodiment can, for example, include at least: computer program code for receiving a proxy play request from a player, the proxy play request being a request for a proxy to effect a wager on a wager-based game; computer program code for requiring that the player have a player account; computer program code for assigning and instructing a proxy to place the wager on the wager-based game for the player; computer program code for awaiting wager results from the wager on play of the wager-based game by the proxy for the player; and computer program code for notify the player of the wager results from the proxy play request.

BRIEF DESCRIPTION OF THE DRAWINGS

The present invention will be readily understood by the following detailed descriptions in conjunction with the accompanying drawings, wherein like reference numerals designate like structural elements, and in which.

DETAILED DESCRIPTION OF EMBODIMENTS OF THE INVENTION

Embodiments disclosed herein concern mobile gaming environments. Portable electronic devices can be supported by the mobile gaming environments. The locations of the portable electronic device can influence how the portable electronic devices operate or what services or features are available to the portable electronic device or their users. According to one embodiment, a mobile gaming system can concern gaming/betting opportunities that can be secured using a portable electronic device even when an individual is located in a location where betting or games of chance are not permitted. According to another embodiment, wagers are advantageously configured, managed or otherwise processed such that they can be deferred, conditional and/or proxy assisted. Electronic gaming kiosks, personal mobile electronic devices, and/or gaming devices can be provided, and used individually or in combination, to facilitate entry, receipt and/or management of wagers.

Embodiments disclosed herein concern mobile, local and/or remote gaming environments.

Figure 1:
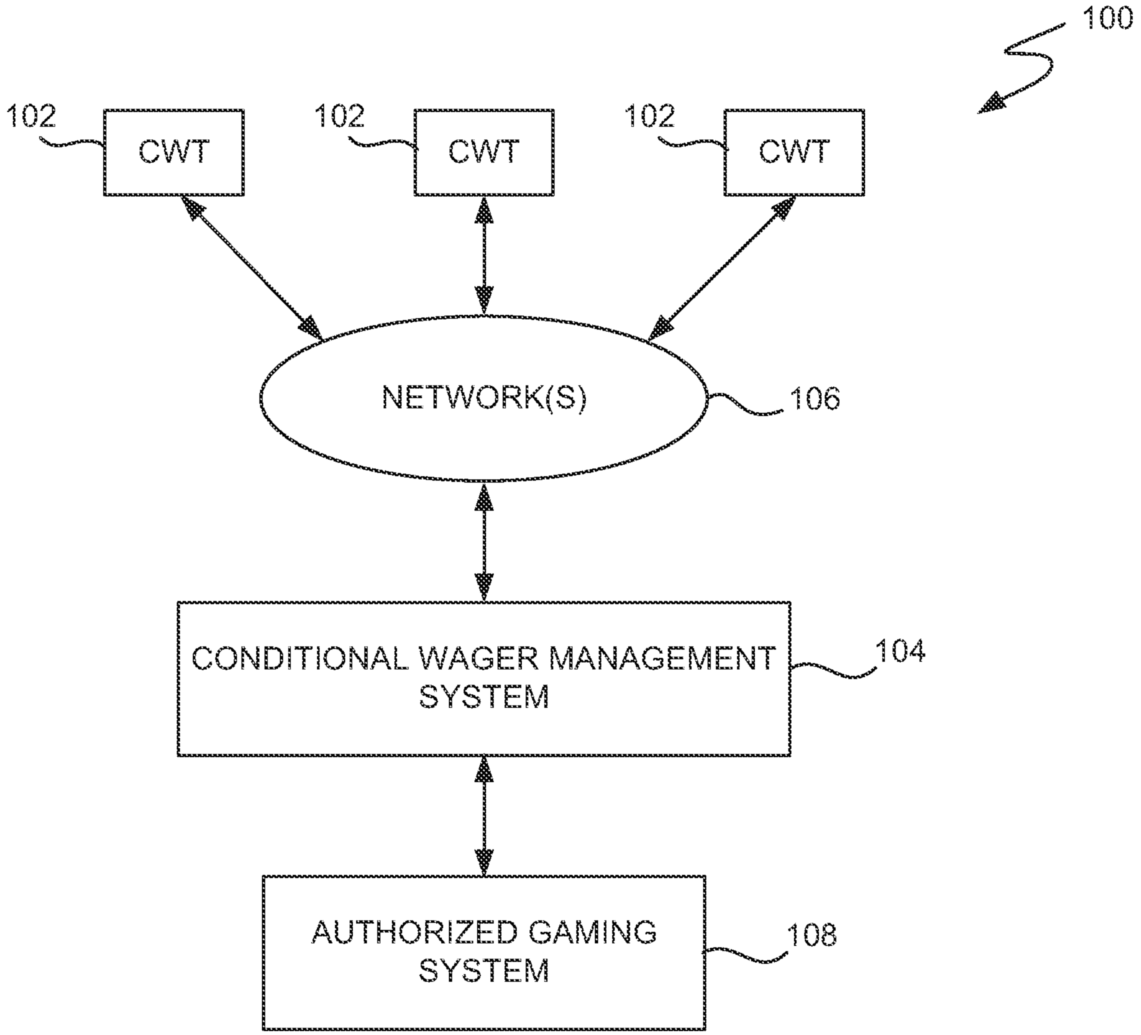
FIG. 1 is a block diagram of a wager management system according to one embodiment.

FIG. 1 is a block diagram of a wager management system 100 according to one embodiment. The wager management system 100 operates to receive and process conditional wagers from players. In this regard, the wager management system 100 includes a plurality of conditional wager terminals 102. The conditional wager terminals 102 are configured to receive conditional wagers from players. In one implementation, the conditional wager terminals 102 can pertain to a kiosk that is configured to interact with players so that conditional wagers can be made. In another implementation, the conditional wager terminals 102 can pertain to a mobile electronic device or a docking station for a mobile electronic device.

In any event, following the receipt of a conditional wager via the conditional wager terminal 102, the conditional wager terminal 102 that has received the conditional waiver can provide the conditional wager to a conditional wager management system 104 by way of one or more networks 106. The conditional wager management system 104 is a computer implemented system that serves to receive the conditional wagers for one or more players and manages activation of such conditional wagers. For example, a conditional wager can be dependent on one or more conditions. As a result, the wager denoted by the conditional wager is not activated until the one or more conditions have been satisfied. It may be that the conditions are never satisfied and thus the conditional wager is never activated. However, when the conditions are properly satisfied, the conditional wager can be activated. The conditional wager management system 104 performs processing to evaluate when and whether conditions of various conditional wagers have been satisfied. Thereafter, for those conditional wagers that have had their condition satisfied, the conditional wager management system 104 can activate the conditional wagers.

In activating the conditional wagers, the conditional wager management system 104 provides the corresponding wagers to an authorized gaming system 108. The authorized gaming system 108 is a gaming system that has been authorized to permit wager-based games. The authorization may be based on compliance to gaming rules governing the country, the state, the city, the casino, etc. The authorized gaming system 108 can restrict gaming by preventing or limiting wagers based on location of the wager transaction, the age of a player, the agency representing a player or a group of players, the agency's jurisdictional license, the source of funds, the size of the wager, the time of the wager, and/or the like. In one implementation, the authorized gaming system 108 can be associated with a gaming establishment, such as a casino. In another implementation, the authorizing gaming system 108 can be associated with a governmental compliance or enforcement agency. Further, the authorizing gaming system 108 can be located at a gaming site, or can be a secured virtual system residing in a computing cloud such as cloud products offered by Amazon, Microsoft, IBM, Equinix, Dell EMC, etc. In general, a cloud-based gaming system is convenient as it provides a robust, centralized control point to connect, monitor, and control multiple gaming jurisdictions. Regardless, the authorized gaming system 108 receives the wagers and then formally places the wagers at gaming apparatus available to the authorized gaming system 108.

Figure 2:
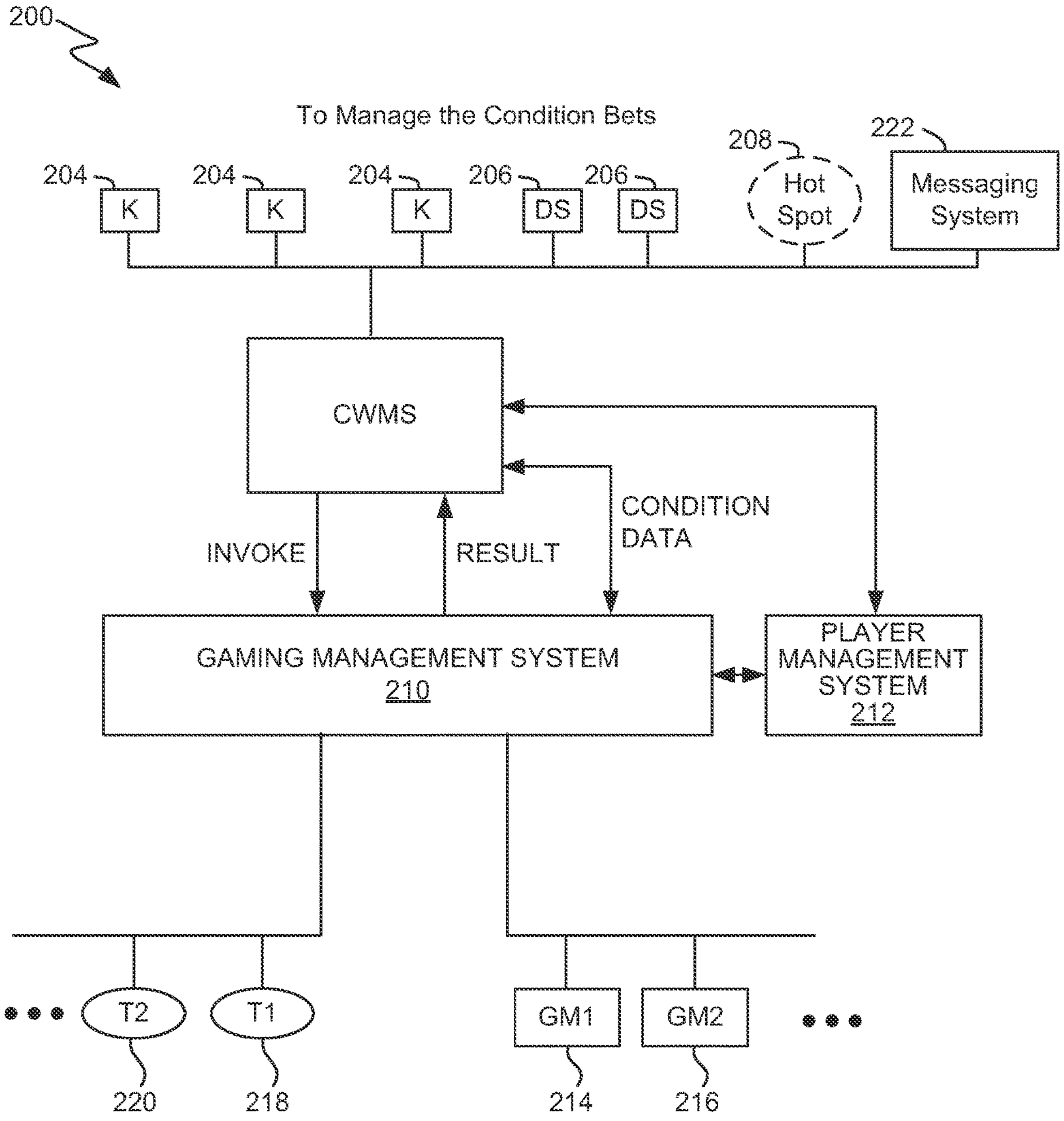
FIG. 2 is a block diagram of a wager management system according to one embodiment.

FIG. 2 is a block diagram of a wager management system 200 according to one embodiment. The wager management system 200 includes a conditional wager management system 202. The conditional wager management system 202 is coupled to one or more kiosks 204, one or more docking stations 206, and/or one or more wireless hotspots 208. Any of the kiosks 204, docking stations 206 or hotspots 208 can be used to receive a conditional wager from a player. The conditional wager, upon being received, can be forwarded over a network connection to the conditional wager management system 202. The conditional wager management system 202 can then monitor the one or more conditional wagers to determine which of such conditional wagers should be invoked (or activated). In doing so, the conditional wager management system 202 can interact with a gaming management system 210.

The gaming management system 210 can be a computer implemented system that serves to manage gaming operations for one or more gaming apparatus. Typically, the gaming apparatus being managed by the gaming management system 210 are associated with a particular gaming establishment. For example, the particular gaming establishment can correspond to a particular location of the gaming establishment, such as a casino. The conditional wager management system 202 can also interact with a player account management system 212 to provide or receive information and funds concerning a particular player or an agent.

For processing a particular conditional wager, the conditional wager management system 202 can receive condition data from the gaming management system 210. Conditional wagers can be dependent upon various conditions. Some of these conditions can be associated with a gaming environment managed by the gaming management system 210. Hence, the condition data provided to the conditional wager management system 202 from the gaming management system 210 can provide condition data that is associated with the gaming environment being managed by the gaming management system 210.

The conditional wager management system 202 can use the condition data to determine whether the one or more conditions for a given conditional wager have been satisfied. When the conditional wager management system 202 determines that a particular conditional wager has had its condition satisfied, the particular conditional wager can be invoked. When being invoked, the conditional wager is directed to the gaming management system 210 for processing. The gaming management system 210 can receive the incoming conditional wager and cause the conditional wager to be formally placed. In doing so, the gaming management system 210 can interact with the player account management system 212 to confirm that the player has the requisite monetary funds stored and available in a player's account. The placement of the conditional wager can cause a wager to be placed with respect to various different gaming apparatus and gaming events (e.g., sports, e-sports, horse races, a lottery drawing, and the like) that are managed by the gaming management system 210.

As shown in FIG. 2, the gaming management system 210 can interact with a plurality of different gaming apparatus and external gaming event data feeds, including as examples a first gaming machine (GM1) 214 and a second gaming machine (GM2) 216, a first table (T1) 218, and a second table (T2) 220. Although not illustrated, gaming event data feeds (e.g., status of live sports events, races, lottery drawing, etc.) can also be received at the gaming management system 210 in real time so that in-game events can be wagered on (e.g., whether the quarterback will complete a pass in a football game). Using any of these gaming apparatus and data feeds, the conditional wager can be processed and the gaming apparatus can notify the gaming management system 210 of the results of the conditional wager. The gaming management system 210 can then advise the conditional wager management system 202 of the results and can also update the player's account dependent upon the results. Subsequently, the conditional wager management system 202 can also inform the associated player of the results of the conditional wager. The conditional wager management system 202 can so inform the player by causing information to be presented to the player by way of any of the kiosks 204, docking stations 206 or mobile devices associated with any of the hotspots 208. Alternatively or additionally, the conditional wager management system 202 can interact with a messaging system 222 to effectuate a message being sent to the player by any of a variety of different electronic means. The message could be a text message, a voicemail message, an email message, a social media message posting, and the like.

Figure 3:
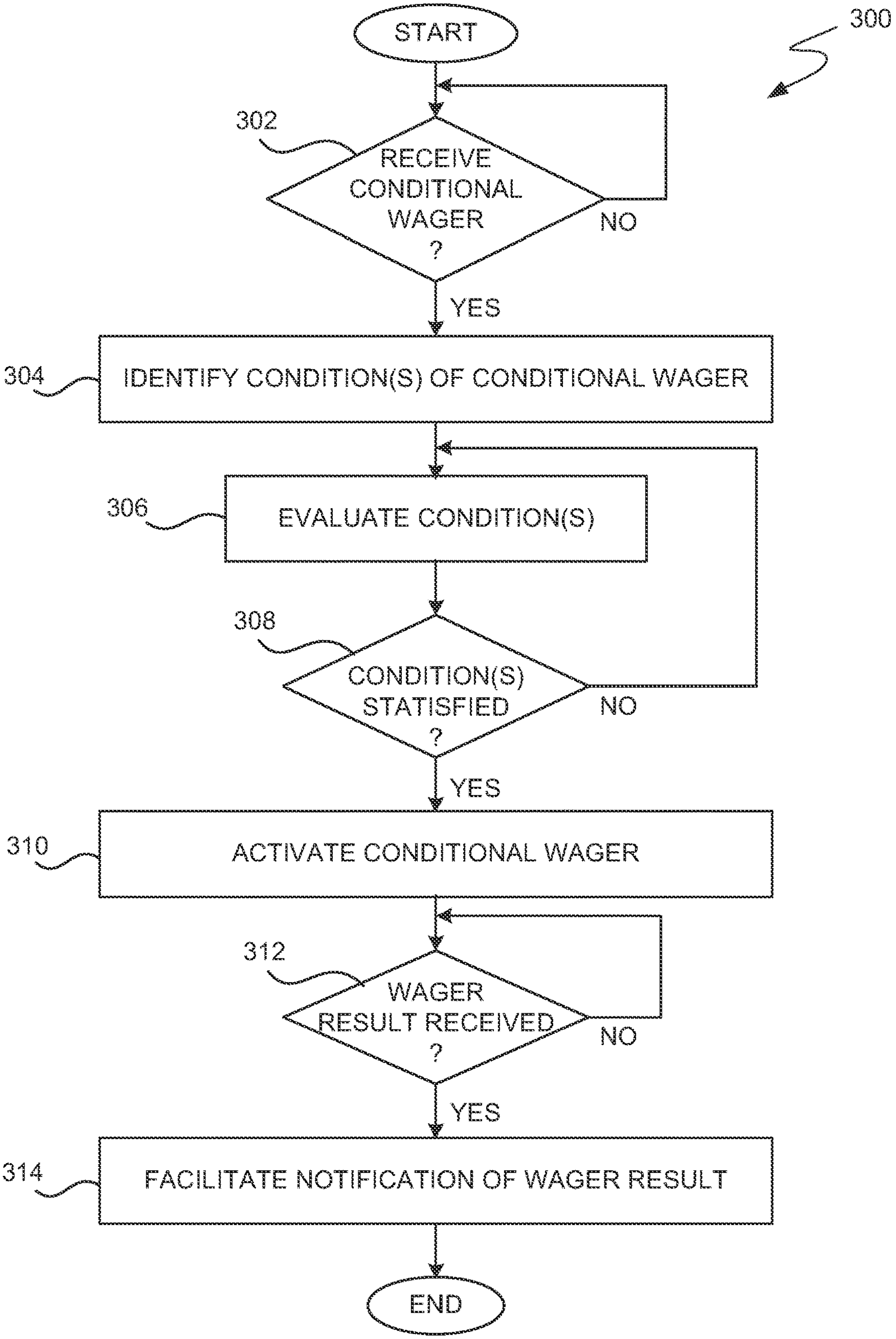
FIG. 3 is a flow diagram of a conditional wager process according to one embodiment.

FIG. 3 is a flow diagram of a conditional wager process 300 according to one embodiment. The conditional wager process 300 can, for example, be performed by a conditional wager management system, such as the conditional wager management system 104 illustrated in FIG. 1 or the conditional wager management system 202 illustrated in FIG. 2.

The conditional wager process 300 can begin with a decision 302 that determines whether a conditional wager has been received. When the decision 302 determines that a conditional wager has not been received, the conditional wager process 300 can await such a wager. Alternatively, when the decision 302 determines that a conditional wager has been received, one or more conditions of the conditional wager can be identified 304. Typically, a conditional wager is a wager that is dependent upon one or more conditions. The identification 304 of the one or more conditions of the conditional wager can involve a parsing of the conditional wager to extract the one or more conditions. Then, the conditional wager process 300 can evaluate 306 the one or more conditions associated with the conditional wager.

Next, a decision 308 can determine whether the one or more conditions associated with the conditional wager have been satisfied. When the decision 308 determines that all of the one or more conditions for the conditional wager have not been satisfied, the conditional wager process 300 can return to repeat the block 306 so that the one more conditions can continue to be evaluated.

On the other hand, when the decision 308 determines that the all the one or more conditions for the conditional wager have been satisfied, the conditional wager can be activated 310. Note that activation of a conditional wager may require that the triggering condition(s) for the conditional wager to be satisfied in addition to the jurisdictional compliance rules associated with the location where the conditional wager is being transacted. Typically, the activation 310 of the conditional wager causes the conditional wager to be made. After the conditional wager has been activated 310, a decision 312 can then determine whether a wager result has been received. When the decision 312 determines that a wager result for the conditional wager has not yet been received, the conditional wager process 300 can await such a wager result. Alternatively, when the decision 312 determines that the wager result for the conditional wager has been received, the conditional wager process 300 can facilitate 314 a notification of the wager result. Typically, the notification of the wager result would be an electronic notification provided to the player that initially placed the conditional wager. Following the block 314, the conditional wager process 300 can end since the conditional wager was activated and the resulting wager result was provided to the corresponding player.

Figure 4:
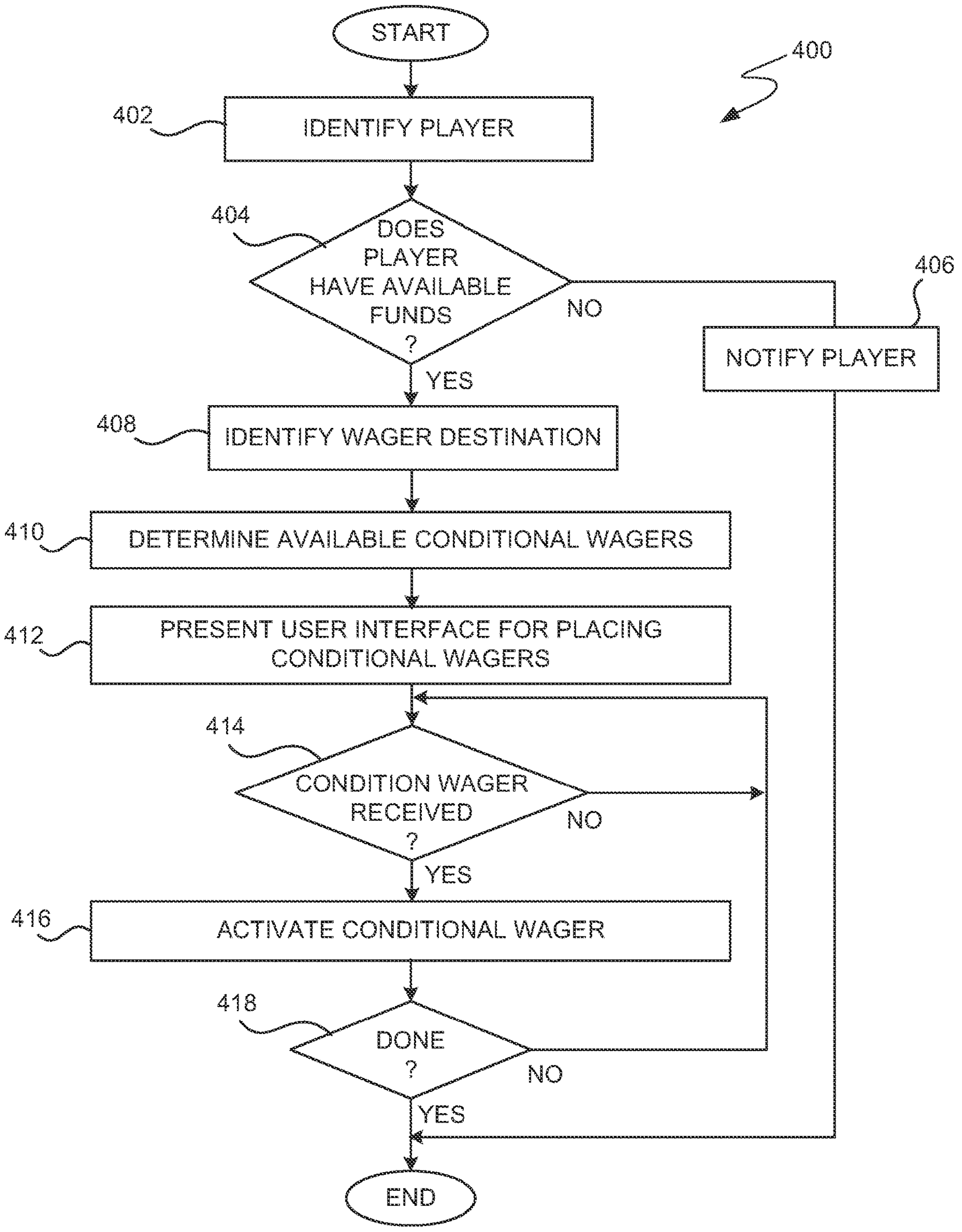
FIG. 4 is a flow diagram of a conditional wager request process according to one embodiment.

FIG. 4 is a flow diagram of a conditional wager request process 400 according to one embodiment. The conditional wager request process 400 can be performed by a conditional wager terminal, such as the conditional wager terminal 102 illustrated in FIG. 1 or any of the conditional wager terminals shown in FIG. 2, including the kiosks 204, docking stations 206 and hotspots 208. The conditional wager request process 400 can also be performed or assisted by a conditional wager management system, such as the conditional wager management system 104 illustrated in FIG. 1 or the conditional wager management system 202 illustrated in FIG. 2.

The conditional wager request process 400 can initially identify 402 a player. The player being identified 402 is a player that is attempting to make a conditional wager with respect to a game of chance, such as a wager-based game performed by or at a gaming apparatus. After the player has been identified 402, a decision 404 can determine whether the player has available funds that can be utilized for the conditional wager being attempted. For example, the player can be required to have an account in which monetary funds for the player have been previously deposited. The decision 404 can then determine whether the player has sufficient funds in its account to place the particular conditional wager being attempted. When the decision 404 determines that the player does not have sufficient available funds, the player can be notified 406 that the attempted conditional wager is not permitted due to lack of funds in the player's account. After the player is been notified 406, the conditional wager request process 400 can end as the particular conditional wager being attempted by the player is declined because the player does not have sufficient available funds.

On the other hand, when the decision 404 determines that the player does have sufficient available funds, a wager destination for the conditional wager can be identified 408. In one embodiment, the wager destination can be identified 408 using a graphical user interface (GUI). For example, a GUI can present a plurality of available wager destinations and permit a player to select one or more destinations for their wager. The wager destination can be a particular casino, gaming location, wager-based table game, wager-based gaming machine (e.g., slot machine), etc. Here, for example, a wager destination can represent a gaming establishment where the conditional wager is to be placed. For example, the wager destination could be Crazy A's casino in Las Vegas, Nevada. As another example, the wager destination could be a live table game in Caesar's casino in Las Vegas, Nevada. As still another example, the wager destination could be any wheel of Fortune slot machine in Nevada.

After the wager destination has been identified 408, available conditional wagers associated with the wager destination can be determined 410. Here, different wager destinations can support different conditional wagers. In one embodiment, the conditional wager request process 400 can include a search assistant to allow a player to search for suitable eager destinations depending on the type of game, gaming device, location, performance, pay-out, odds, etc.

After the available conditional wagers have been determined 410, a user interface can then be presented 412 for placing of conditional wagers. The user interface can be displayed to the player attempting to make the conditional wager using, for example, an electronic device such as an electronic gaming device. For example, an electronic device can include a display screen, and the user interface can be displayed on the display screen. The electronic device can, for example, be a mobile device or a conditional wager terminal.

Next, a decision 414 can determine whether a conditional wager has been received. When the decision 414 determines that a conditional wager has not yet been received, the conditional wager request process 400 can await such a wager. Alternatively, when the decision 414 determines that a conditional wager has been received, the conditional wager request process 400 can submit 416 the conditional waiver. For example, the conditional waiver can be submitted 416 to a conditional wager management system, such as a conditional wager management system 104 illustrated in FIG. 1 or the conditional wager management system 202 illustrated in FIG. 2.

Thereafter, a decision 418 can determine whether the conditional wager request process 400 is done. In other words, the player can signal to the conditional wager request process 400 whether the player is done making conditional wagers or whether an additional conditional waiver (or modification to a prior conditional wager) is still requested. When the decision 418 determines that the conditional waiver request process 400 is not done, the conditional waiver request process 400 can return to repeat the decision 414 and subsequent blocks so that another conditional wager can be requested. Alternatively, when the decision 418 determines that the conditional waiver request process 400 is done, the conditional waiver request process 400 can end.

Figure 5:
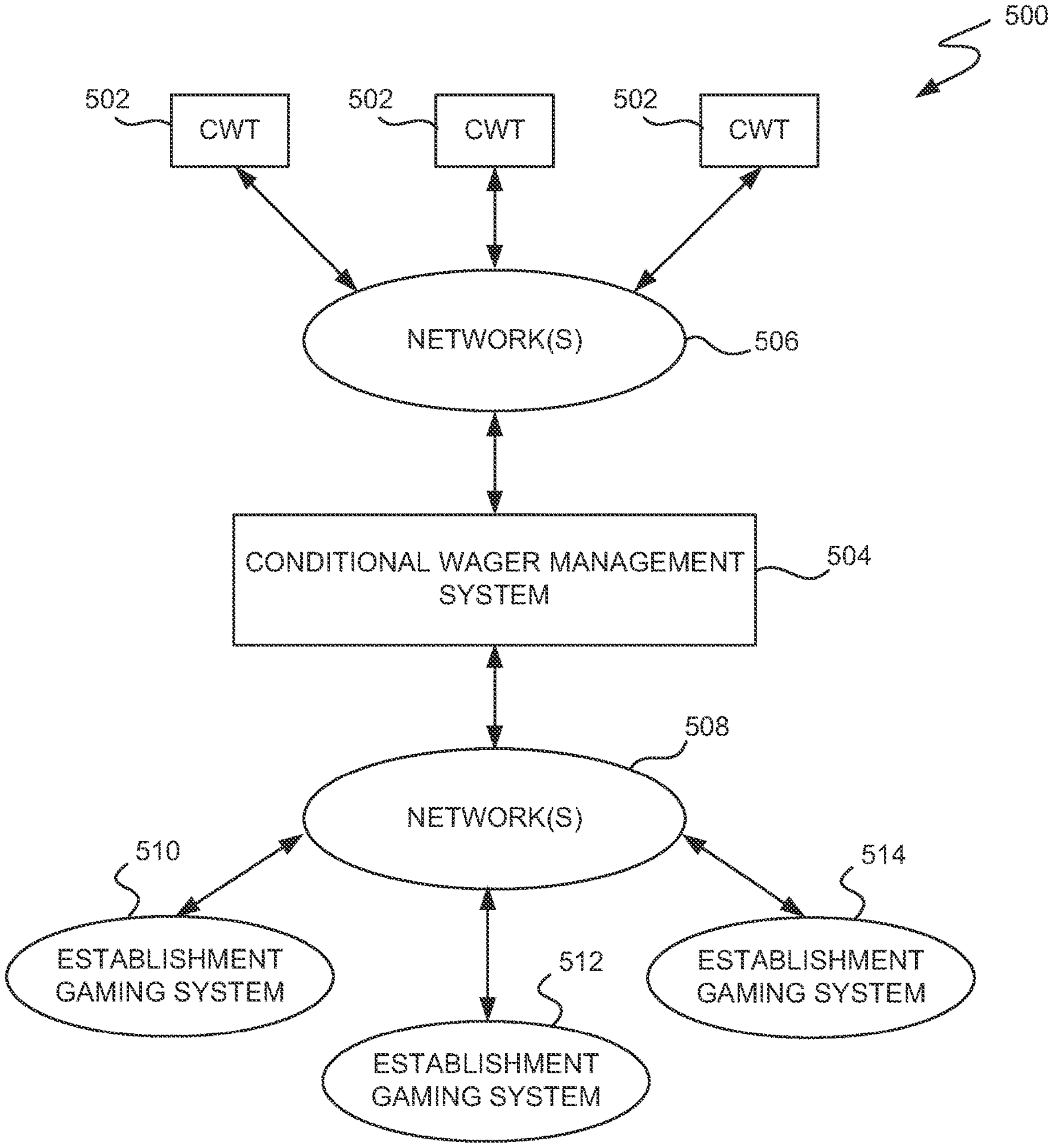
FIG. 5 illustrates a block diagram of a wager management system according to another embodiment.

FIG. 5 illustrates a block diagram of a wager management system 500 according to another embodiment. The wager management system 500 is similar to the wager management system 100 illustrated in FIG. 1. However, the wager management system 500 represents a centralized conditional wager management approach for a plurality of different gaming establishments. In one embodiment, the different gaming establishments can be associated with the game ownership group or different ownership group.

The wager management system 500 includes a plurality of conditional wager terminals 502. The conditional wager terminal 502 can, for example, be a kiosk or other electronic device such as noted in FIG. 2. A player can interact with the conditional wager terminal 502 to place a conditional wager. Upon doing so, the conditional wager terminal 502 provides the conditional wager to a conditional wager management system 504 by way of one or more networks 506. The conditional waiver can then be processed by the conditional wager management system 504 to determine if and when the conditional wager should be placed as a wager on a gaming apparatus. When the conditional wager is to be placed, the conditional wager management system 504 can direct the wager to be activated to a network 508 which couples together a plurality of different gaming systems 510, 512 and 514. Hence, the conditional wager management system 504 can manage and activate conditional wagers with respect to any of the gaming establishment systems 510, 512 and 514 which are respectively associated with different gaming establishments. Hence, in one embodiment, the different gaming establishments provide at their particular establishment gaming system an interface between its gaming systems and the conditional wager management system 504 such that the conditional wager management system 504 can manage the activation of conditional waivers by effectuating placement of wagers into the establishment gaming systems 510, 512 and 514. Results of such placed wagers can be returned via the network 508 to the conditional wager management system 504. The conditional wager management system 504 can then notify the respective player of the results of their conditional wager, and optionally also transact with and/or manage a player account where monetary funds are held for placement of wagers and where monetary funds are delivered for winnings from such wagers. For example, the conditional wager management system 504 can cause a notification (e.g., text, audio or email messages) to be displayed or otherwise presented on the conditional wager terminal 502.

Figure 6:
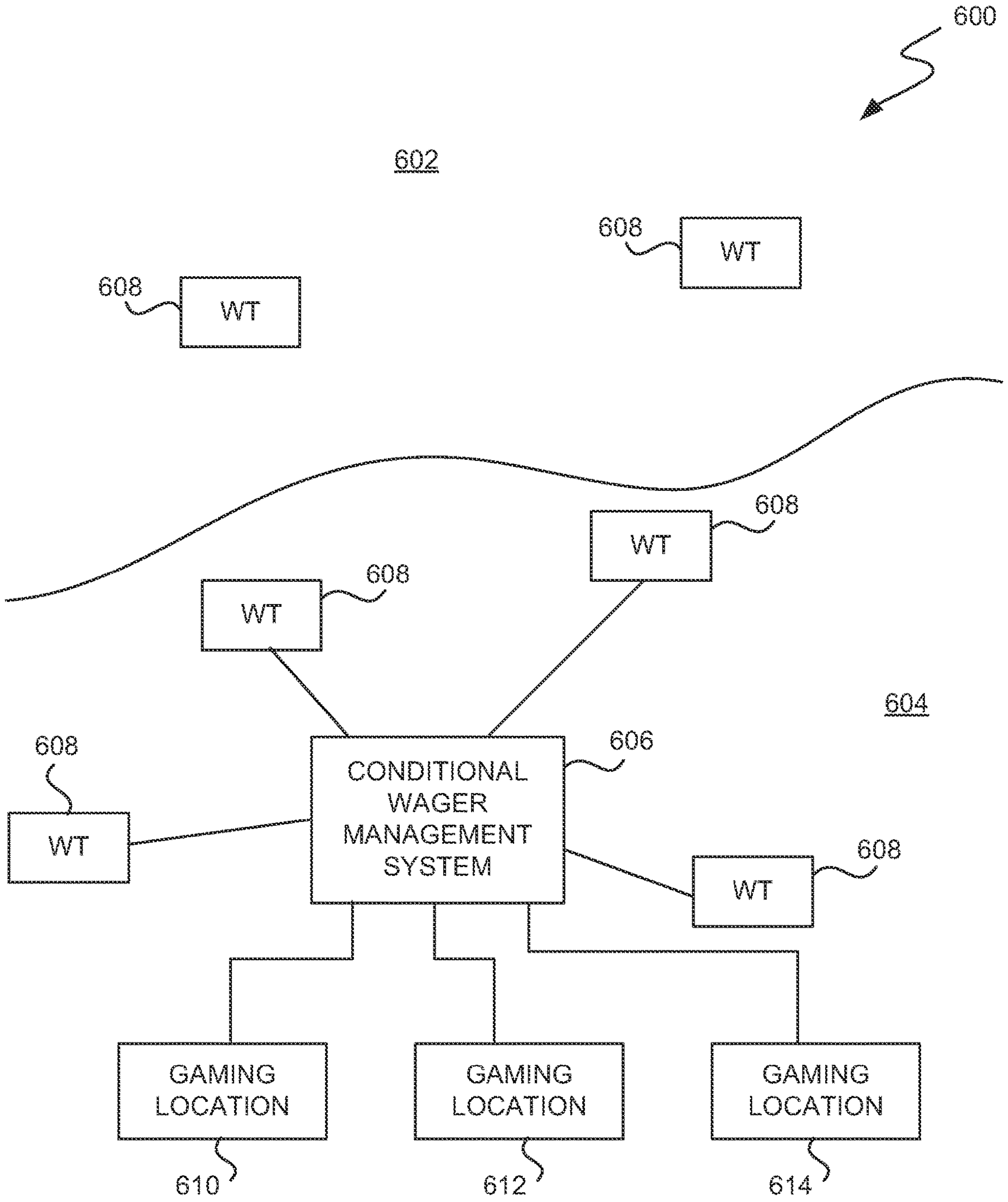
FIG. 6 is a block diagram of a wager management system according to one embodiment.

FIG. 6 is a block diagram of a wager management system 600 according to one embodiment. The wager management system 600 supports a gaming unauthorized region 602 and a gaming authorized region 604. The wager management system 600 includes a conditional wager management system 606. The conditional wager management system 606 is provided in the gaming authorized region 604. Players seeking to enter a conditional wager can interact with a wager terminal 608. The wager management system 600 can support a plurality of wager terminals 608. As shown in FIG. 6, some of the wager terminal 608 can be positioned in the gaming unauthorized region 602, and others of the wager terminals 608 can be positioned in the gaming authorized region 604.

Those of the wager terminal 608 that are positioned in the gaming authorized region 604 can receive and place wagers, namely, conditional wagers, can be receive and actively placed. Once placed, the conditional wager management system 606 can monitor the wagers for satisfaction of any associated conditions on the wager. When the conditional wager management system 606 determines that a conditional wager is ready to be placed (i.e., all conditions are satisfied), the wager is directed to one of the gaming locations 610-614 for invoking or participating in a wager-based game at the gaming location 610-614. Here, in this embodiment, the wager-based games are provided by authorized gaming establishments. The wager-based games can be provided on gaming devices available at the gaming establishments. Alternatively, a gaming server computer can operate a wager-based game on which the wager can be placed.

When the wager terminal 608 is positioned in the gaming unauthorized region 602, the wager terminal 608 is able to receive a wager request, but does not cause any wagers to be placed. Hence, in one embodiment, for wager requests received at the wager terminals 608 that are positioned in the gaming unauthorized region 602, the various wager requests receive at such wager terminal can first be transported to the gaming authorized region 604. For example, a particular wager terminal 608, or a removable data storage device therefrom, can be transported into the gaming authorized region 604 where the various wager requests can then be submitted to the conditional wager management system 606. The transportation of the particular wager terminal 608 (or a removable data storage device therefrom) can, for example, be by a motor vehicle, airplane, train, or carried by a person.

In the embodiment shown in FIG. 6, the wager management system 600 is centralized in that the conditional wager management system 600 can be centrally provided and support a plurality of different gaming establishments.

Figure 7:
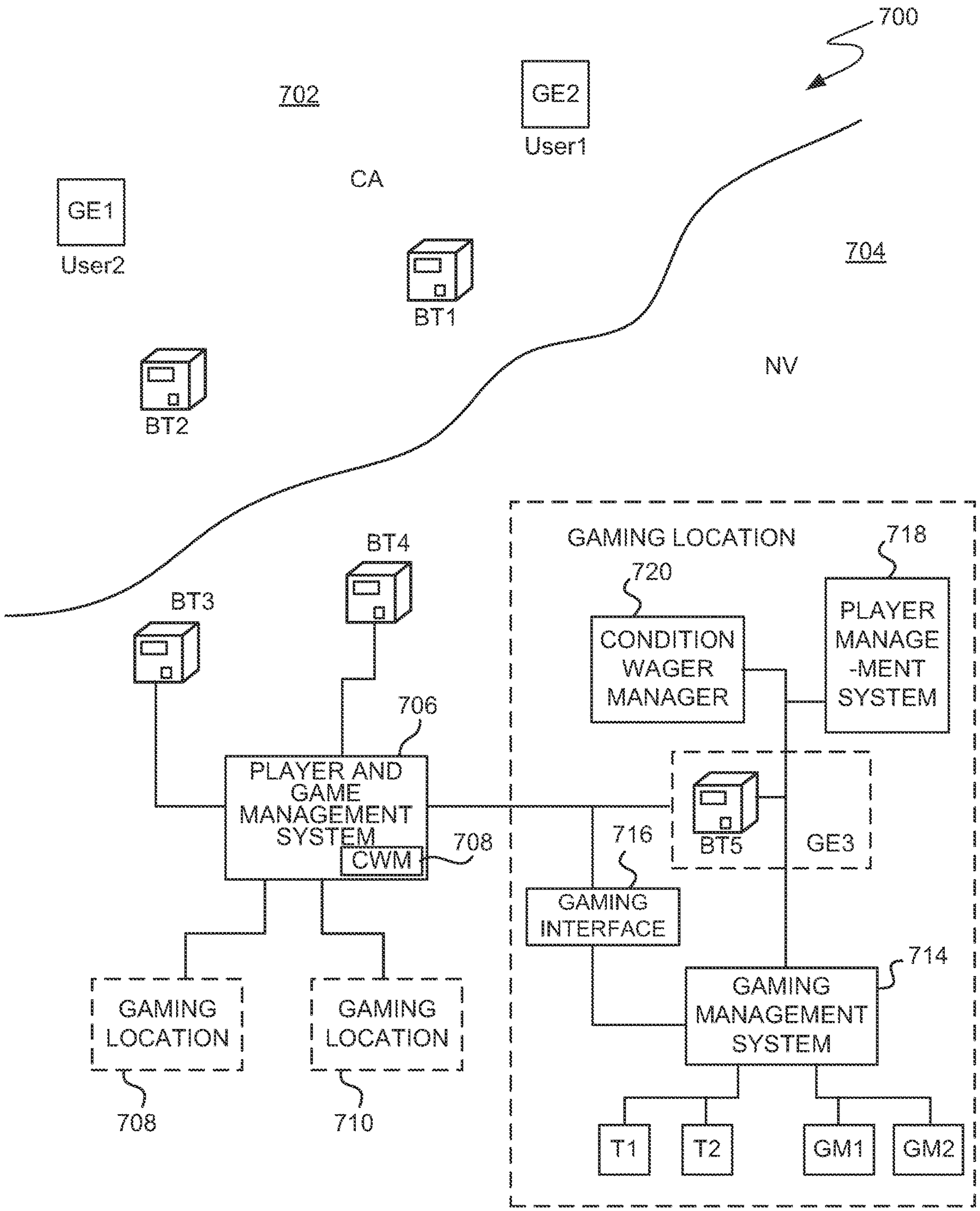
FIG. 7 is a block diagram of a wager management system according to one embodiment.

FIG. 7 is a block diagram of a wager management system 700 according to one embodiment. The wager management system 700 supports a gaming unauthorized region 702 (e.g., CA) and a gaming authorized region 704 (e.g., NV). The wager management system 700 includes a player and game management system 706. The player and game management system 706 is provided in the gaming authorized region 704.

Players seeking to enter a conditional wager can interact with a bet terminal (BT). The wager management system 700 can support a plurality of bet terminals BT1-BT5. As shown in FIG. 7, some of the bet terminals (e.g., BT1 and BT2) can be positioned in the gaming unauthorized region 702, and others of the bet terminals (BT3, BT4 and BT5) can be positioned in the gaming authorized region 704. The bet terminals can be considered wager terminals. Also, some gaming establishments (GE1 & GE2) are located in the gaming unauthorized region 702, and other gaming establishments (GE3) are located in the gaming authorized region 704.

Those of the bet terminals that are positioned in the gaming authorized region 704, can receive and actively place bets, namely, conditional bets. Once place, a player and game management system 706 can manage the invocation of the bets and also processing execution of the bets. The player and game management system 706 can include a conditional wager management system 708 that can monitor the bets for satisfaction of any associated conditions on the bets. When the conditional wager management system 708 determines that a conditional bet is ready to be placed (i.e., all conditions are satisfied), the bet is managed by the player and game management system 706. In one embodiment, the player and game management system 706 couples to various gaming locations 708, 710 and 712 to interact with local gaming management systems. For example, the gaming location 712 can include a local gaming management system 714. The player and game management system 706 can interact with the local gaming management system 714 via a gaming interface 716. The local gaming management system 714 supports and manages a plurality of gaming devices, such as gaming tables T1 and T2 as well as gaming machines GM1 and GM2. Gaming data pertaining to wager-based games operating on any of the gaming devices can be stored at the local gaming management system 714. Hence, the player and game management system 706 can process a conditional bet using any of the gaming devices at the gaming location 712 though interaction with the local gaming management system 714.

The local gaming management system 714 can also optionally couple to a player management system 718. The player management system 718 can maintain player accounts for player. Bets can be funded from a player account, and any winnings can be deposited in a player account. Hence, conditions on a bet that are based on a player's account can be evaluated using data available from the player management system 718.

Optionally, the local gaming management system 714 can also couple to a conditional wager manager 720. Hence, instead of using the conditional wager manager 708 which is centrally located, one or more or all conditions of a conditional bet can be evaluated at the gaming location 712 through use of the conditional wager manager 720.

When the bet terminal is positioned in the gaming unauthorized region 702, the bet terminal is able to receive a bet request, but does not cause any bets to be placed. Hence, in one embodiment, for bet requests received at the bet terminals that are positioned in the gaming unauthorized region 702, the various bet requests received at such bet terminal can first be transported to the gaming authorized region 704. For example, a particular bet terminal BT1, or a removable data storage device therefrom, can be transported into the gaming authorized region 704 where the various bet requests can then be submitted to the player and game management system 706. The transportation of the particular bet terminal (or a removable data storage device therefrom) can be by a motor vehicle, airplane, train, or carried by a person. At the player and game management system 706 the bet requests can become conditional bets. For example, any bet requests acknowledged at bet terminal BT1 can become conditional bets after the bet terminals has been transported into the gaming authorized region 704. The player and game management system 706 can manage processing of the bets in accordance with the bet conditions. The bets can be processed using gaming play data provided from a gaming establishment, such as via the gaming management system 714, or provided by a gaming computer provided centrally, such as at the player and game management system.

Figure 8:
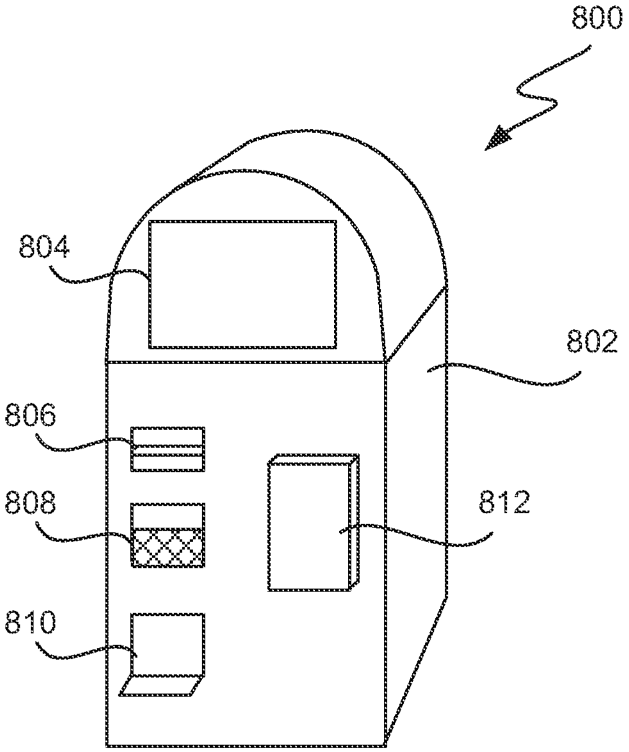
FIG. 8 is a perspective view of a wager terminal according to one embodiment.

FIG. 8 is a perspective view of a wager terminal 800 according to one embodiment. The wager terminal 800 can also be referred to as a kiosk. The wager terminal 800 includes a housing 802. The housing 802 can refer to as a cabinet. The wager terminal 800 includes various electrical components at least partially within the housing 802. These electrical components can include at least one or more of a touch screen display 804, a card reader 806, a bill acceptor 808, a ticket-in ticket-out (TITO) device 810, and a mobile device receptacle 812. The mobile device receptacle 812 can provide an interface to which a user can couple a mobile device. Mobile devices can, for example, include mobile phones, mobile memory devices, or other mobile electronic device. The coupling can be implemented by a near field network, a physical action (e.g., bumping or tapping devices) or an electrical connector (e.g., port). When a mobile device is coupled to the wager terminal, a user can interface with the mobile device to enter, activate, fund and/or manage wagers. In some embodiments, the wager terminal 800 can also include a GPS subsystem for tracking the location of the wager terminal 800.

The wager terminal 800 is suitable for use as a conditional wager terminal 102, 502 illustrated in FIG. 1 or 5, a kiosk 204 illustrated in FIG. 2, a wager terminal illustrated in FIG. 6, or a bet terminal illustrated in FIG. 7. Generally speaking, the wager terminal 800 permits a user to interact therewith to request a wager. The wager terminal 800 can be located in an authorized gaming location, such as in jurisdiction permitting gaming. In one implementation, the wager terminal 800 can be located in authorized gaming establishment, such as a casino. The wager terminal 800 in such an embodiment can couple to an establishment network such that wagers being received at the wager terminal 800 can be processed by the establishment's backend computing resources (or centralized cloud-based computing resources) to invoke the wager and process the results. In another embodiment, the wager terminal 800 can be located in a retail establishment.

In one embodiment, the wager terminal 800 is mobile and can be moved and placed at different locations. For example, the wager terminal 800 can be moved in accordance with a schedule from an unauthorized gaming location to an authorized gaming location. For example, the wager terminal 800 can be placed in a location where bets cannot be made but where bets requests can be received, then later the wager terminal 800 can be moved to a location where wagers can be placed. Thus, when at the authorized wagering location, the wager terminal 800 can facilitate the activation or placement of the requested bets that had been previously received by the wager terminal 800. In such an embodiment, it can be advantageous for the wager terminal 800 to include a location detection subsystem. The location detection subsystem can be used to verify the location of the wager terminal 800, such as to ensure that the wager terminal 800 is indeed at an authorized gaming location. For example, the location detection subsystem can be a GPS subsystem.

In still another embodiment, a personal digital assistant (e.g., smartphone, tablet computer, smart watch, etc.) can be used in place of the wager terminal. In such an embodiment, the personal digital assistance can operate as a wager terminal. By running an application program, the personal digital assistant can provided the functionality and user interface for facilitating a user in entering, configuring, funding, and/or managing wagers.

For security or audit purposes, the wager terminal 800 can record (i) its location when a wager is received or received, (ii) its location when a wager's conditions are satisfied, and/or (iii) its location when a wager is activated. Such data can be recorded in a log file or a database.

The type of wager being permitted by the wager terminal 800 can be controlled or managed. For example, the wager terminal 800 might support wagers that are conditional wagers, primary wagers, back bet wagers, auxiliary wagers, related or parleyed wagers, or any combination thereof.

Figure 9:
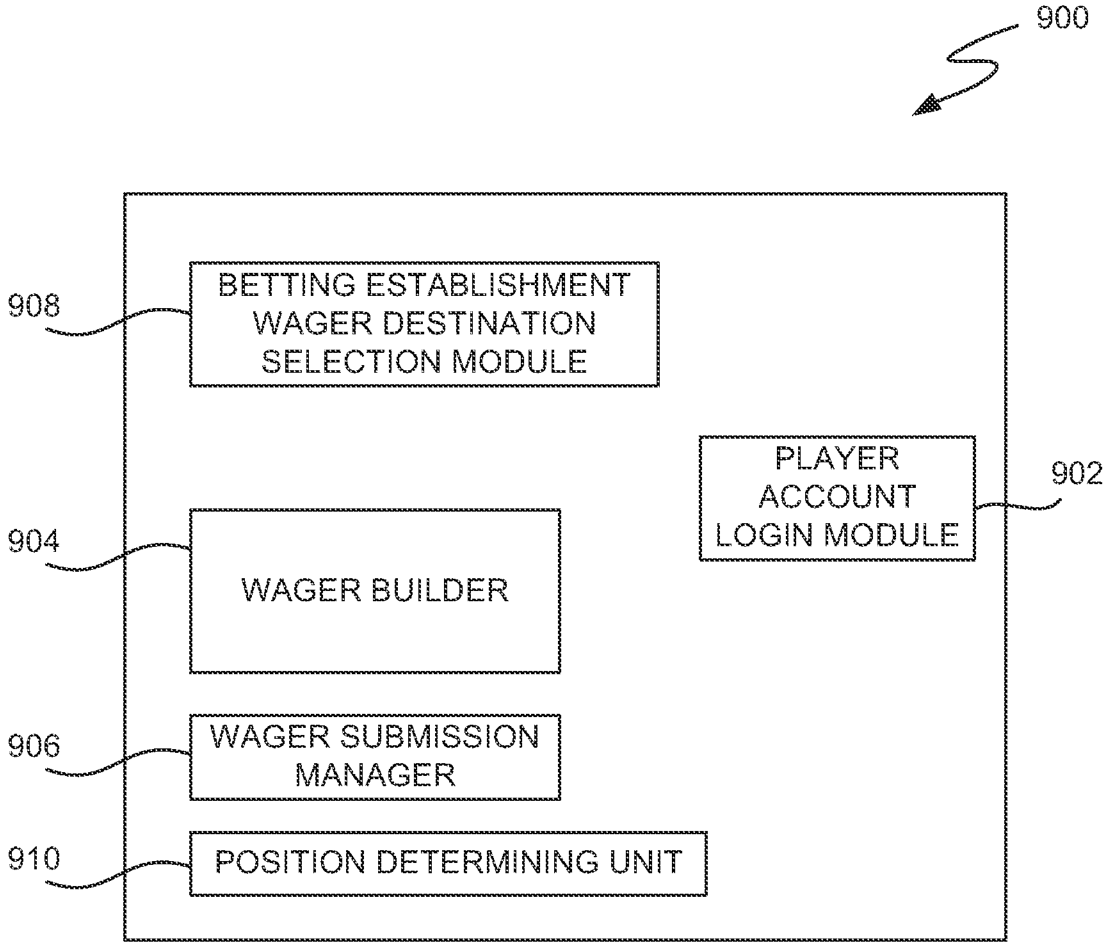
FIG. 9 is a block diagram of a wager terminal control system according to one embodiment.

FIG. 9 is a block diagram of a wager terminal control system 900 according to one embodiment. The wager terminal control system 900 can operate to control various interactions or operations associated with a wager terminal, such as the wager terminal 800 illustrated in FIG. 8. The wager terminal control system 900 includes a player account login module 902. The player account login module 902 operates to authenticate a user of the wager terminal and associate that user with a player account. The user of the wager terminal can interact with the wager terminal to log in to the user's account. The user's interaction with the wager terminal to log in can utilize text entry such as username and password, eye scan, fingerprint scan, or through use of the user's mobile device.

The wager terminal control system 900 also includes a wager builder 904, and a wager submission manager 906. Using the wager builder 904, the wager terminal can present a graphical user interface for the user so that through interaction therewith the user can enter one or more desired wagers. In one implementation, a wager being entered is a conditional wager that is dependent upon one or more conditions. The wager can also be part of a plurality of related wagers, which can pertain to a script. The script can be commands or instructions for carrying out the related wagers. One or more of the related wagers can be conditioned upon various conditions. The related wagers can also implement a parley wager.

In the case of parleyed wagers, the wager builder 904 can facilitate interrelating of conditional wagers for obtaining greater potential winnings. The wager builder 904 can provide visual assistance to a user in selecting or creating a parley wager, such as from a series of conditional wagers. For example, a first conditional bet can be entered, and then a second conditional bet can be entered and funded (or funded differently) if the first conditional bet is successful.

After the one or more wagers have been entered using the wager builder 904, the wager submission manager 906 can manage submission of the requested wagers to an appropriate wager management system to carry out the wagers. The wager submission manager 906 can, in one embodiment, directly submit the wagers to the appropriate wager management system once the wager have been entered or received via the wager builder 904. Alternatively, in another embodiment, the wager submission manager 906 can retain the wagers until certain conditions are met. For example, one condition might be a location of the wager terminal being utilized to receive the wagers, where the wager terminal is a mobile wager terminal. In such case, the wager terminal might retain the wagers until the wager terminal 900 is in a location that permits the requested wagers. In this regard, the wager terminal control system 900 can include a position detecting unit 910. The position detecting unit 910 can use location detection techniques, such as triangulation, GPS, network (Wi-Fi, cellular, and the like), etc. to determine the location of the wager terminal.

In an alternative embodiment, the wager terminal might support a removable electronic wager storage device. The removable electronic wager storage device could be removed from the wager terminal and moved to a different location where the previously received wagers are eligible to be placed. This, advantageously, would permit the wager terminal to remain in an unauthorized gaming location while the previously received wagers are able to be moved to an authorized gaming location by moving the removable electronic wager storage device.

The wager terminal of the wager terminal control system 900 is particularly suitable for conditional wagers which are wagers that are dependent upon one or more conditions. In such case, the wager builder 904 can be referred to as a conditional wager builder, and the wager submission manager 906 can be referred to as a conditional wager submission manager.

Figure 10:
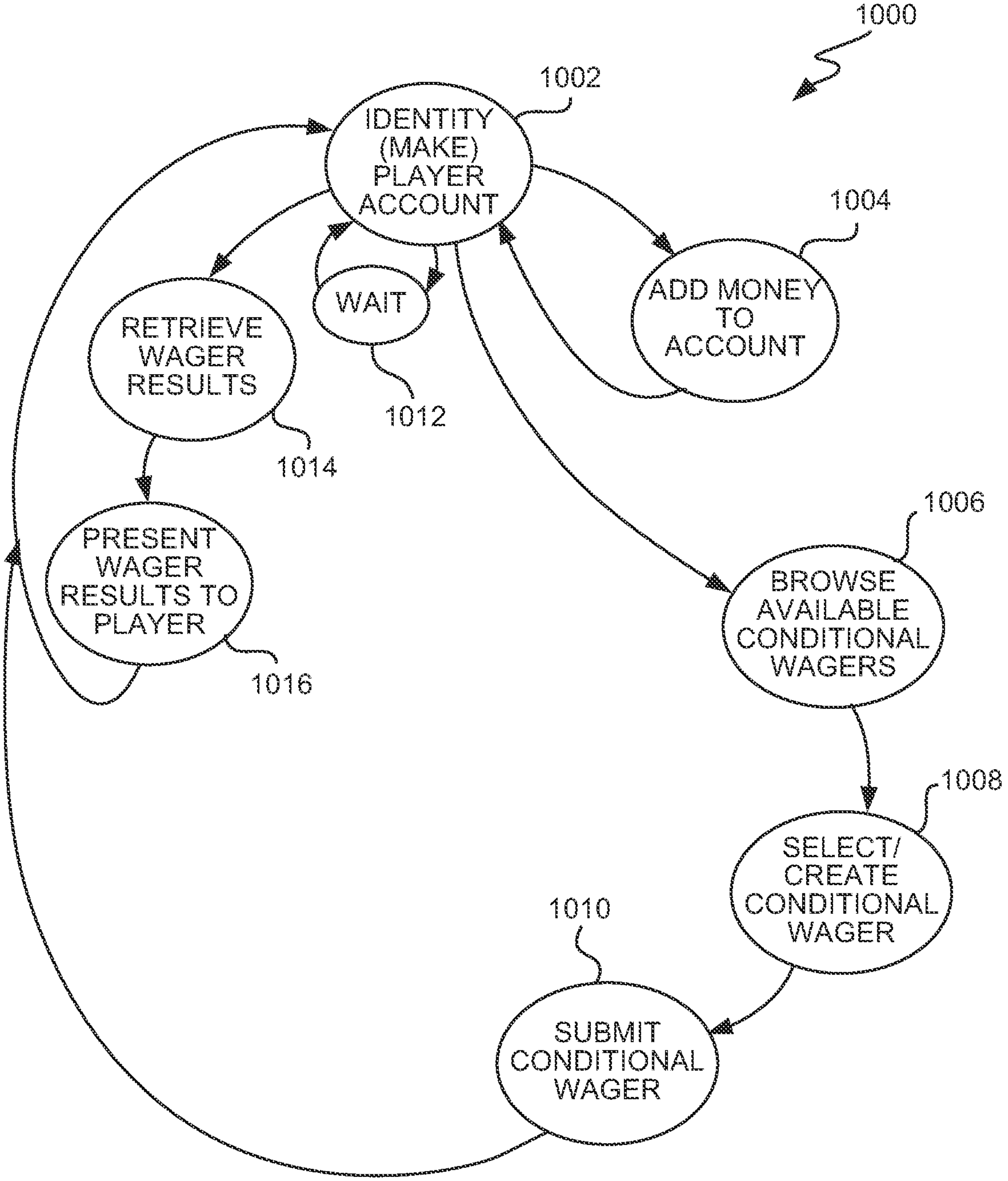
FIG. 10 illustrates a state diagram associated with a user interface that can be presented to a user of a wager terminal.

FIG. 10 illustrates a state diagram 1000 associated with a user interface that can be presented to a user of a wager terminal. For example, the state diagram 1000 can be associated with a user interface that is presented to the user by the wager builder 904 of the wager terminal control system 900 illustrated in FIG. 9. As another example, the state diagram 1000 can be associated with the user interface that is presented on a mobile device associated with the user, where the mobile device can be associated with a wager terminal, a game management system or a conditional wager management system.

In a first state 1002, the user can interact with a user interface to identify a player account. The player account is the account that is used to identify the player seeking to make a wager. In the event that the player account is not already established, the first state 1002 can also assist the user in making a player account.

After the player account has been identified in the first state 1002, the state diagram 1000 proceeds to a second state 1004. At the second state 1004, money can be added to the player account. The second state 1004 is optional because the user may not need or desire to add money to the player account at this time.

Following the second state 1004, the state diagram 1000 can return to the first state 1002. Additionally, following the first state 1002, the state diagram 1000 can also proceed to a third state 1006. At the third state 1006, the user can browse available conditional wagers. Although the available wagers are identified as being conditional, it should be recognized that in other embodiments, the available wagers need not be conditional. In any event, in the third state 1006, the user can interact with the user interface to browse through the available conditional wagers. The available conditional wagers can be searched or browsed or filtered to assist a user in locating the particular type of conditional wager that is desired.

Following the third state 1006, the state diagram 1000 can proceed to a fourth state 1008. At the fourth state 1008, the user can select or create a conditional wager. Here, based on the available conditional wagers, the user can select one or more of the available conditional wagers as the selected conditional wager. Alternatively, the user could create a particular conditional wager from the available conditional wagers or from wagering opportunities that are made available to the user using the user interface.

After the conditional wager has been selected or created, the state diagram 1000 can proceed to a fifth state 1010. At the fifth state 1010, the selected conditional wager can be submitted. For example, the selected conditional wager can be submitted to a conditional wager management system, such as a conditional wager management system 202 illustrated in FIG. 2. After the selected conditional wager has been submitted at the fifth state 1010, the state diagram 1000 can proceed to return to the first state 1002.

The state diagram 1000 also includes a sixth state 1012. The sixth state 1012 is a wait state in which the state diagram 1000 waits for the user to desire to make a conditional wager or desire to receive results of previously made wagers.

Furthermore, the state diagram 1000 includes a seventh state 1014. At the seventh state 1014, wager results can be retrieved. Here, for example, for previously submitted conditional wagers, the state diagram 1000 can provide a user interface that allows the user or player to receive the results of such wagers. Hence, at the seventh state 1014, the wager results are retrieved from a conditional wager management system, such as the condition wager management system 202 illustrated in FIG. 2. Following the retrieval of the wager results at the seventh state 1014, the state diagram 1000 can proceeded to an eighth state 1016. At the eighth state 1016, the wager results can be presented in a user interface for the user (e.g., player). Following the eighth state 1016, the state diagram 1000 can proceeded to the first state 1002.

In one embodiment, a graphical user interface enables a player to direct its conditional bet to a particular gaming establishment. The gaming establishments can make wager opportunities available to players that are authorized for gaming. For example, the available gaming establishments can be dependent on an actual or anticipated location of the player. If the conditional bet is destined for game play in Nevada, then the conditional bet can be made with any authorized gaming establishment in Nevada that is participating with the condition betting system.

The available bet conditions can be controlled or managed by participating gaming establishments. This enables a gaming establishment to motivate game play on certain games at particular times, particular machines, particular locations or establishments, etc.

Another aspect of one or more embodiments is a graphical user interface. The graphical user interface is provided to facilitate the placing of a wager, such as a conditional bet. The conditional bet can be defined by a plurality of betting conditions that are dependent on various parameters. The graphical user interface can be presented to a player via an electronic device, such as a mobile communication device (e.g., smart phone), a gaming apparatus, or some other electronic device. Typically, such devices include or associate with a display device which can present the graphical user interface.

One example of a multi-level GUI is as follows:

- On a first display screen, a type of gaming device for a conditional bet can selected. For example, exemplary types of gaming devices include gaming tables (live or electronic), slot machines, and video gaming machines.
- On a second display screen, a particular game for the conditional bet can be selected. The particular games available is typically dependent on the type of gaming device selected. For example, if the type of gaming device is a slot machine, then the available games are those games that are available on slot machines. For example, one popular slot machine game is Wheel of Fortune. As another example, if the type of gaming device is a video gaming machine, then the available games are those games that are available on video gaming machines. For example, popular games on video gaming machines include poker and keno. As another example, if the type of gaming device is a table game, then the available games are those games that are available on table games. For example, popular games on table games include poker, blackjack, baccarat, craps, pai gow, and roulette.
- On a third display screen, one or more play conditions for the conditional bet can be selected. The play conditions can pertain to (a) timing for the conditional bet, (b) performance of a gaming device (e.g., of the selected type of gaming device), (c) minimum jackpot level (e.g., progressive jackpot), (d) loss limits, and/or (e) number of bets per day.
- On a fourth display screen, a play limiting conditions can be specified. For example, a conditional bet can be expired after 1 week. As another example, a conditional bet can expire or be paused if the player's account level is low or if recent losses are high.
- On a fifth display screen, confirmation of the bet being requested.

As noted herein, wagers (or bets) can be conditional based on one or more conditions. The conditions can vary widely based on implementation. Examples of parameters used in conditions include the following: Gaming Device Type; Game; Jackpot/Bonus Level; Performance; Environmental Conditions; Incentives; Loss Limit; Gaming Location; Gaming Establishment; and Player Confirmation.

Exemplary types of gaming devices include gaming tables (live or electronic), slot machines, and video gaming machines. These gaming devices support wager-based games or, more generally, games of chance.

Exemplary games are wager-based games, of which there can be many, including poker, blackjack, baccarat, craps, pai gow, roulette, and numerous slot machine games (e.g., Wheel of Fortune). Those particular games that are available can be dependent on a type of gaming device. For example, if the type of gaming device is a slot machine, then the available games are those games that are available on slot machines. For example, one popular slot machine game is Wheel of Fortune. As another example, if the type of gaming device is a video gaming machine, then the available games are those games that are available on video gaming machines. For example, popular games on video gaming machines include poker and keno. As another example, if the type of gaming device is a table game, then the available games are those games that are available on table games. For example, popular games on table games include poker, blackjack, baccarat, craps, pai gow, and roulette.

Another condition that can be available is a jackpot/bonus level which can be used to condition a wager on the level of an available jackpot or bonus. For example, a particular wager could be conditioned on the available jackpot being greater than a monetary amount, such as one million dollars.

Exemplary performance conditions can include last payout amount by gaming device, recent near miss, time since last jackpot or bonus, etc. The performance can also be considered relative to other gaming devices generally or restricted to same or like types of gaming devices. For example, a particular gaming device could be ranked relative to other like gaming devices. As another example, by evaluating a gaming device, the gaming device could be classified as hot, cold or neutral and then conditions could rely on the performance classifications hot, cold or neutral.

Exemplary environmental conditions can include day, time, frequency, player streak, player account level (e.g., player account balance), and player account performance.

Incentive conditions can be made available to a user. Establishments or service providers can offer incentives to play at certain times, certain locations (e.g., establishments or areas within an establishment), certain games, certain gaming device, etc. A user can thus use incentive conditions to condition a wager on such incentives. For example, a contingent wager could be placed once an incentive condition is triggered.

Exemplary loss limit conditions can include conditions to cease wagers if recent losses (hourly, daily, weekly, monthly or yearly) exceed a loss limit (monetary or percentage).

An exemplary player confirmation condition can be a user confirmation that is used as a condition to a bet. For example, a user (player) can be contacted, such as via phone, text or email, to inquire whether an available bet should be placed. If the user declines to confirm, then the bet can be delayed. In some embodiments, the confirmation condition may only be available in certain gaming jurisdictions (e.g., Nevada). In other words, the confirmation condition may only be available in jurisdictions that permit a wager to be confirmable. For example, a user could receive a text, that its wager's conditions are met can the wager is ready to be activated, and can indicate where the wager is to be played (e.g., Treasure Island Casino, Las Vegas, Slot Machine #1234), and permits the user to "decline" or "pass" the activation if they desire. Typically, the user would have to rapidly reply to the text message to stop the wager's activation. But in some situation, the wager could be default not be activated, unless the user positively reply's that the wager should be activated.

A wager that is conditional can be a back bet of a player that plays a wager-based game. The wager of the back better that is being offered in such case is dependent on the play of the player. In such case, additional conditionals such as the following might be used: Player Performance, Player Rating, and/or Gaming Device Conditions (of gaming device that player is playing). For example, Player Performance can support conditions such as recent streaks, historical performance (general, gaming session, game type, etc.). Player Rating can be assigned to provide relative rating of players. The Gaming Device Conditions can, for example, support one or more conditions dependent on a payout history, pay tables, streaks, etc. Hence, the conditions applied to a bet, such as a back bet, can be used in selecting a player or machine for use with the bet.

A wager could also be made conditional on a dealer, such as dealer's performance, in the case of a live dealer game.

In another embodiment, a multi-conditional wager can be described using a script. The script can include commands or instructions for carrying out a multi-conditional wager, which can include a plurality of bets, such as related bets, string or streak bets, or parley bets. In one implementation, a wager builder (e.g., wager builder 904) can be used to assist a player in creating a script.

The script can define a bet to be placed dependent on a plurality of conditions. A graphical user interface, such as a touch screen interface, can be used to facilitate creation of scripts. Any of the conditions discussed herein can be utilized in a script. Further, a script can be used to define a parley bet by relating together a plurality of bets. The graphical user interface could also include a visualization (e.g., animation) of a script for enhanced player understanding and excitement.

A script can be represented visually for a user. The script as provided to a conditional wager management system can be in a scripting language. For example, a series of bets can be scripted using a graphical user interface and then subsequently effectuated by the conditional betting system as appropriate. A script submitted to a conditional wager management system can define one or more distinct conditional bets, or one or more conditional bets (e.g., a parley conditional bet).

As one example, suppose a player wants to make a parley conditional bet such that a first bet of $100 is conditional on a first live table game of blackjack and on a "cold" dealer, and then if that first bet is successfully a second bet of $20, repeatable up to 5 times, on a progressive slot machine conditional on a progressive jackpot level being at least $10,000,000 and on the Wheel of Fortune game and at a frequency of not more than one bet per hour.

As another example, suppose a player want to make a parley conditional bet such that a first bet of $100 on "red" on a table game of roulette (of any kind) conditioned on player account balance greater than $1000, and then if the first bet is successful a second bet of one-half of winnings from the first bet are placed on "black" on a subsequent table game of roulette. The parley can also be designated to repeat until a bet is lost.

A server computer can process a betting script. The betting script syntax and command can be recognized by the server computer. An exemplary natural language script is:

If Bet A is "win", then bet ½ Winnings of Bet A on Bet B, where Bet A is played in Las Vegas on a table game on a "Cold" table, and wherein Bet B is conditional on Player Account Balance >$1000, and wherein all bets expire in 30 days.

A player can also use an application operating on a personal computing device, such as a smart phone or tablet or notebook computer, to make a bet request. If the player is in an unauthorized gaming region, then the bet request is held. The bet request can later be delivered to a bet terminal. Then, if (or when) the bet terminal is in an authorized gaming location, the bet requested can become a placed bet.

Alternatively, the bet request can be transported from an unauthorized gaming location to an authorized gaming location by a person. For example, referencing FIG. 7, a user 1 can render a bet request on a gaming application GA1 operating on a personal computing device and later visit a bet terminal BT1. The bet request could be transferred from the gaming application GA1 to the bet terminal BT1. Later, after the bet terminal BT1 (or a removable data storage portion thereof) is delivered to another bet terminal within the authorized gaming location, such as BT3, BT4 or BT5. From the BT3, BT4 or BT5, the requested bet can be provided to the player and game management system 706 for central processing or the local gaming management system 714 for local processing. The bet terminals BT3 and BT4 can be remote terminals in the authorized gaming location 704, and the bet terminal BT5 can be within a gaming establishment.

Proxy Play

In another aspect disclosed herein, wagers (or bets) can be made on behalf of a remote player by a proxy. In this scenario, a proxy is a person that plays a wager-based game for a remote player. Various proxies can make themselves available for proxy play, where bets are placed on wager-based games by a proxy for a player.

A person desiring to serve as a proxy can be qualified to be a proxy. A proxy can specialize in particular games or locations. A proxy posts their availability to serve as a proxy with a Proxy Play Management System (PPMS). The PPMS manages assignment of proxies to play [i.e., place bets] for one or more particular remote players.

A proxy can be compensated for their efforts in assisting remote players in any of one or more of a variety of ways. A remote player can elect to tip their proxy player. A proxy can also be compensated by a percentage of winnings. The PPMS or gaming locations/establishments can also provide some form of compensation to a proxy, such as per player, per bet played, per bet won, etc. Some proxy players can also be paid greater than other proxy players, such as due to more experience, better performance, more desirable gaming locations served, or greater luck. The compensation can also differ for different wager-based games or types of wager-based games. The compensation can be fixed or dynamic based on factors.

A remote player can queue up one or more bets to one or more wager-based games. This can be done anywhere that a remote player has network assess to post his/her bets with the PPMS. The PPMS can automatically assign a proxy. Alternatively, a remote player might select from different available proxies. Proxies can have profiles, rating, reviews, etc. to assist remote players in choosing a proxy. For example, a proxy can have a general performance rating and/or a performance rating for acting as a proxy on your behalf. Also, geographical location of a proxy can impact when assignments are given.

Once a proxy is assigned or selected, the proxy is informed of a gaming assignment, including gaming destination, wager-based game and bet. The PPMS can manage the communication with the selected proxy. The proxy can also be given a time window to complete the gaming assignment.

The proxy then travels to the gaming destination and causes placement of the requested bet on the wager-based game for the associated remote player. Once the proxy causes the proxy bet to be made, the PPMS can record the game play and results. The bet amount can be withdrawn from the remote player's player account, and any winnings can be deposited in the remote player's player account.

The proxy typically carries a portable electronic device, such as a smart phone, notebook computer or tablet computer. An application program (e.g., "App") is typically operating on the portable electronic device so that the proxy can securely interact with the PPMS. In carrying out a proxy assignment, the App can serve to guide the proxy. In one embodiment, an App can present step-by-step instructions to the proxy. For example, the App can direct the proxy to an appropriate wager-based game on which the requested bet is to be played. An identified (e.g., PPID) can be provided to the appropriate wager-based game and then the bet can be automatically played or preconfigured for confirmation and then played once confirmed.

In one embodiment, a proxy can be giving a temporary proxy player ID ("PPID") for remote play for a particular remote player. Through use of the PPID, the proxy informs a gaming apparatus that the proxy is playing for a remote player. The PPID is linked to the remote player's player account so that the gaming apparatus understands who the real player is. The PPID can also be used by the gaming apparatus (or its management system) to retrieve the requested bet from the PPID. The PPID can be provided on a proxy card, QR code, passcode, or an electronic value. Alternatively, the gaming apparatus could communicate with the App of the proxy (or a remote server) to retrieve the requested bet.

In another embodiment, a gaming device can provide instructions to the proxy on bet to be placed. For example, the gaming device can be a slot machine and after a PPID is provided to the gaming device, the gaming device can display instructions to the proxy. For example, the gaming device can have a display that presents the instructions. The display can be part of the gaming device base devices, or can be part of a peripheral device (e.g., Ticket-In-Ticket-Out; Player Tracking Device).

In a more complicated proxy bet request, the proxy bet request might be limited or conditional on one or more conditions. Various suitable conditions are described herein. In one embodiment, a script bet sequence can be provided as a proxy bet request. In one implementation, the script can be "run" on the proxy's App and/or a gaming apparatus to guide the proxy in effectuating the proxy bet request. In another embodiment, the script can be run by the PPMS or other management system to automatically effectuate the proxy bet requests of the script. A script can, for example, be used to make a series of requested bets. The series of requested bets can be contingent on one another or can be a parley bet.

A remote player can be provided with feedback to processing of its requested bet. The feedback can include game play results. The feedback can be captured by screen capture or video of actual game play, or animated or virtualized representation of game play. The real video can be captured by the gaming device or via the proxy's app. The feedback can also include other information besides game play, such as positional feedback of the proxy when in the process of effecting the proxy bet request, electronic notifications (e.g., text notifications or in-app notifications using a player App) of relevant events (e.g., proxy accepts, proxy arrived at destination gaming location, proxy logged into gaming device having wager-based game, game results, etc.

Multi-Player Proxy Play

In one embodiment, the proxy bet request can be associated with a group of players. Each player can represent a percentage of an effectively combined remote player. The PPMS can provide feedback to each of the players in the group of players.

Real-Time Betting with Active Proxy

In one embodiment, potential remote persons can be alerted of impending bet opportunities that they might participate in. In this regard, the potential remote persons can be informed of a wager-based game about to be played and an opportunity for having the proxy also play on your behalf. The information provided to the potential remote persons can include performance information of the particular gaming device involved and/or the proxy.

Figure 11:
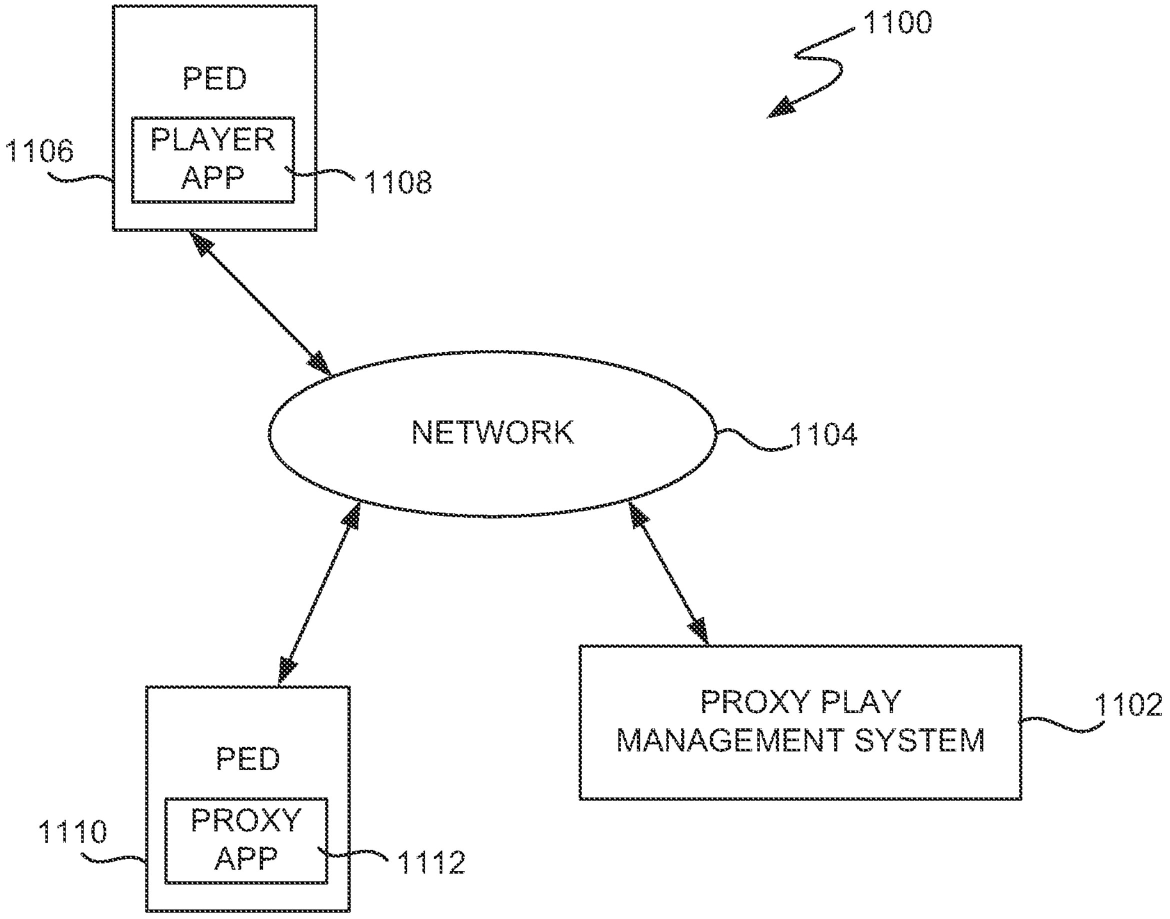
FIG. 11 is a gaming system according to one embodiment.

FIG. 11 is a gaming system 1100 according to one embodiment. The gaming system 1100 includes a proxy play management system 1102. The proxy play management system 1102 can be coupled to a network 1104. The network 1104 can include one or more networks, which can be wired or wireless. The gaming system 1100 can include a player's portable electronic device 1106. The player's portable electronic device 1106 includes a player application 1108. The gaming system 1100 can include a proxy's portable electronic device 1110. The proxy's portable electronic device 1110 includes a proxy application 1112.

Figure 12:
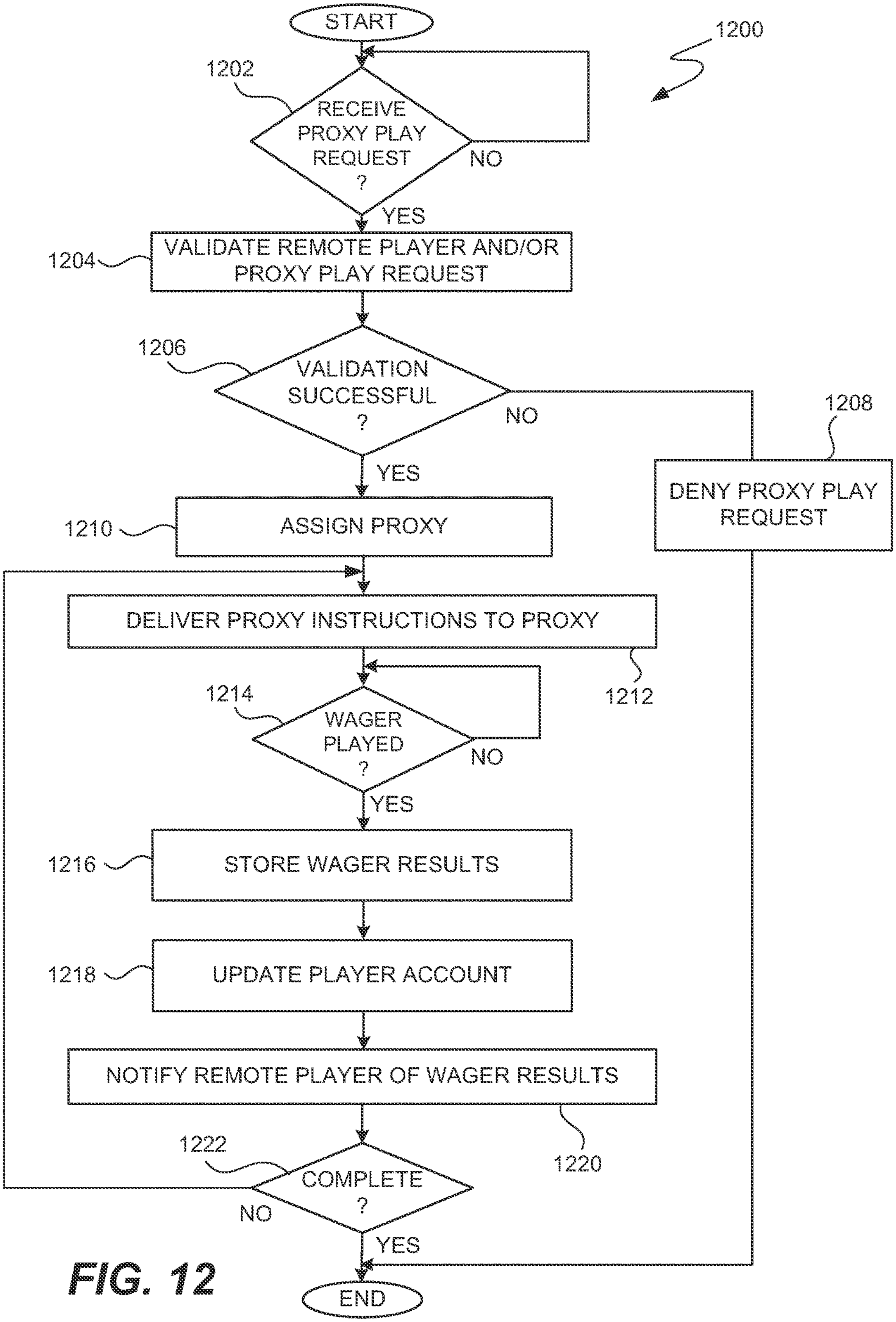
FIG. 12 is a proxy play request process according to one embodiment.

FIG. 12 is a proxy play request process 1200 according to one embodiment. The proxy play request process 1200 can, for example, be performed by a proxy play management system (PPMS).

The proxy play request process 1200 can begin with a decision 1202 that determines whether a proxy play request has been received. Here, the proxy play request is a play request from a player, namely, a remote player, that is being submitted so that a proxy can be assigned to perform the play request on behalf of the player. The play request is typically associated with a wager-based game. Hence, a proxy play request can also be referred to as a proxy bet request or a proxy wager request. When the decision 1202 determines that a proxy play request has not yet been received, the proxy play request process 1200 can await such a request.

Once the decision 1202 determines that a proxy play request has been received, a remote player and/or a proxy play request can be validated 1204. The validation can be provided in various different ways. In one implementation, the remote player can be validated against a player account. The proxy play request can be validated by authentication of the remote player. The proxy play request can be validated using encryption and secure communication over a network. The proxy play request can also be validated that the request proxy play is supported by the PPMS. Next, a decision 1206 determines whether the validation was successful. When the decision 1206 determines that the validation was not successful, then the proxy play request can be denied 1208. Following the denial 1208 of the proxy play request, the proxy play request process 1200 can end.

On the other hand, when the decision 1206 determines that the validation was successful, a proxy can be assigned 1210. Here, the proxy being assigned 1210 can be any of a plurality of proxies that are presently available or are available at the appropriate time for performance of a proxy play request. The available proxies are typically dependent upon location or gaming establishment to which the proxy play request is directed or assigned to be performed. However, proxy assigning can additionally or alternatively be dependent on type of game, proxy performance or rating, etc.

After a proxy has been assigned 1210, proxy instructions can be delivered 1212 to the proxy. The proxy instructions can advise or guide the proxy in performance of the proxy play request that the proxy has been assigned to perform. Next, a decision 1214 can determine whether a wager has been played. Here, the wager that is to be played is a wager associated with the proxy play request. Hence, when the decision 1214 determines that a wager is not yet been played, then the proxy play request process 1200 awaits the play of a wager by the proxy. Once the decision 1214 determines that a wager has been played by the proxy in the context of performing the proxy play request, the proxy play request process 1200 can continue. In this regard, wager results associated with the wager that is been played are stored 1216. In addition, the player account associated with the remote player that has made the proxy play request can be updated 1218. For example, the player account can be debited with any winnings that have resulted from the wager being played. Next, the remote player can be notified 1220 of the wager results.

Thereafter, a decision 1222 can determine whether the proxy play request 1200 is complete. When the decision 1222 determines that the proxy play request 1200 is not complete, the processing returns to repeat the block 1212 so that additional instructions can be provided to the proxy and/or wagers can be played. On the other hand, when the decision 1222 determines that the proxy play request 1200 is complete, the proxy play request 1200 can end.

Figure 13:
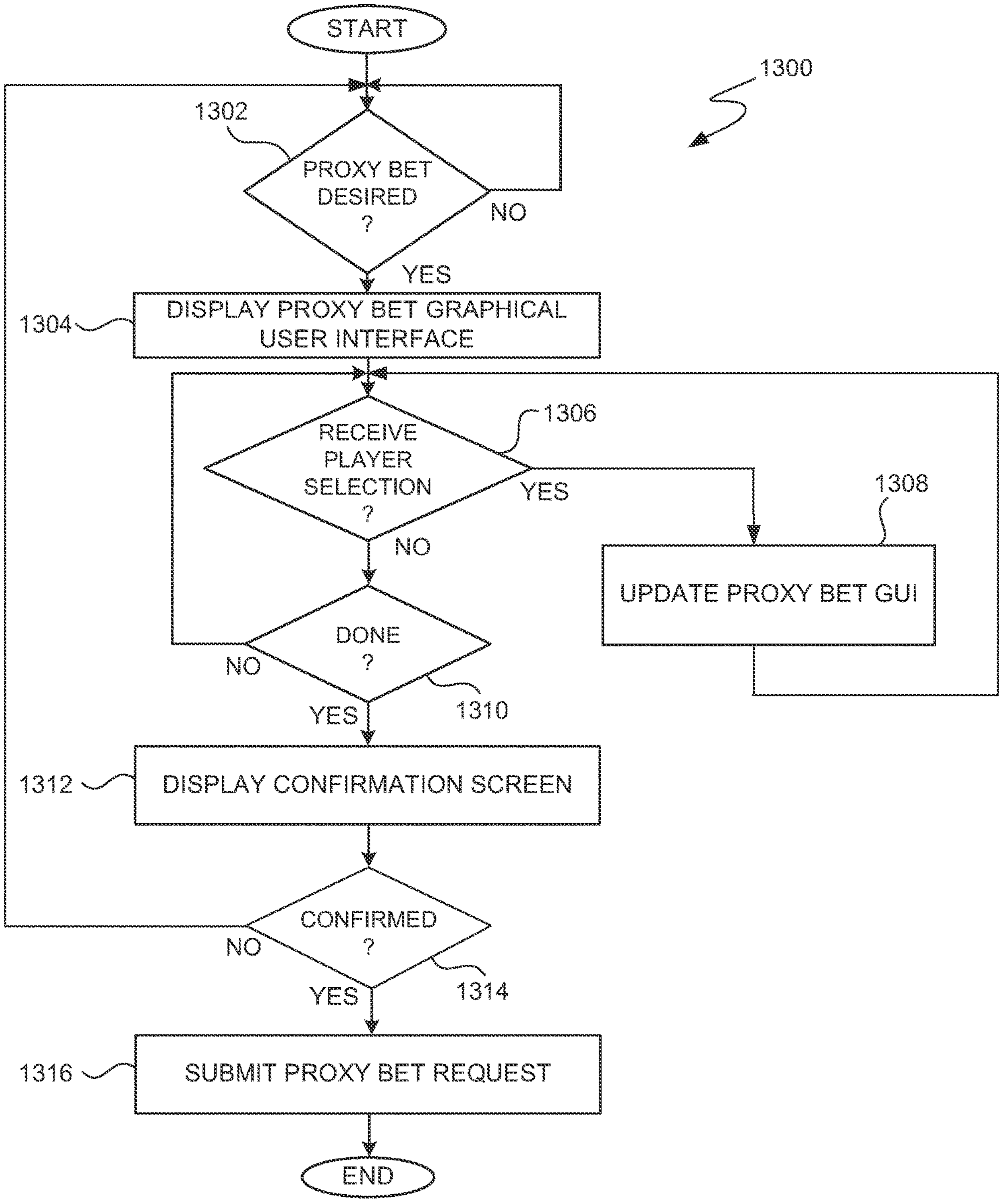
FIG. 13 is a flow diagram of a player application process according to one embodiment.

FIG. 13 is a flow diagram of a player application process 1300 according to one embodiment. The player application process 1300 can be associated with an application program operating on a portable electronic device associated with a remote player.

The player application process 1300 can begin with a decision 1302 that determines whether a proxy bet is desired. When the decision 1302 determines that a proxy bet is not desired, the player application process 1300 can await the player's desire to make a proxy bet.

Once the decision 1302 determines that a proxy bet is desired, a proxy bet graphical user interface can be displayed 1304. The proxy bet graphical user interface is an interface that assists the player is arranging a proxy bet. At this point, a decision 1306 can determine whether a player selection has been made with respect to the graphical user interface. When the decision 1306 determines that a player selection has been received, the proxy bet graphical user interface can be updated 1308. Following the update 1308, the player application process 1300 can return to repeat the decision 1306 so that additional player selections can be received and processed.

On the other hand, when the decision 1306 determines that a player selection is not been received, a decision 1310 can determine whether the player is done interacting with the proxy bet graphical user interface. When the decision 1310 determines that the player is not done interacting with the proxy bet graphical user interface, the player application process 1300 can return to repeat the decision 1306 and subsequent blocks.

Alternatively, when the decision 1310 determines that the player is done interacting with the proxy bet graphical user interface, a confirmation screen can be displayed 1312. Next, a decision 1314 determines whether the proxy bet is confirmed by the player. When the decision 1314 determines that the proxy bet is not confirmed, then the player application process 1300 returns to repeat the decision 1302 and subsequent blocks so that another proxy bet, if desired, can be created. On the other hand, when the decision 1314 determines that the proxy bet is confirmed, a proxy bet request including the confirmed proxy bet can be submitted 1316 to a proxy player management system. Following the submission 1316 of the proxy bet request, the player application process 1300 can end.

Figure 14A:
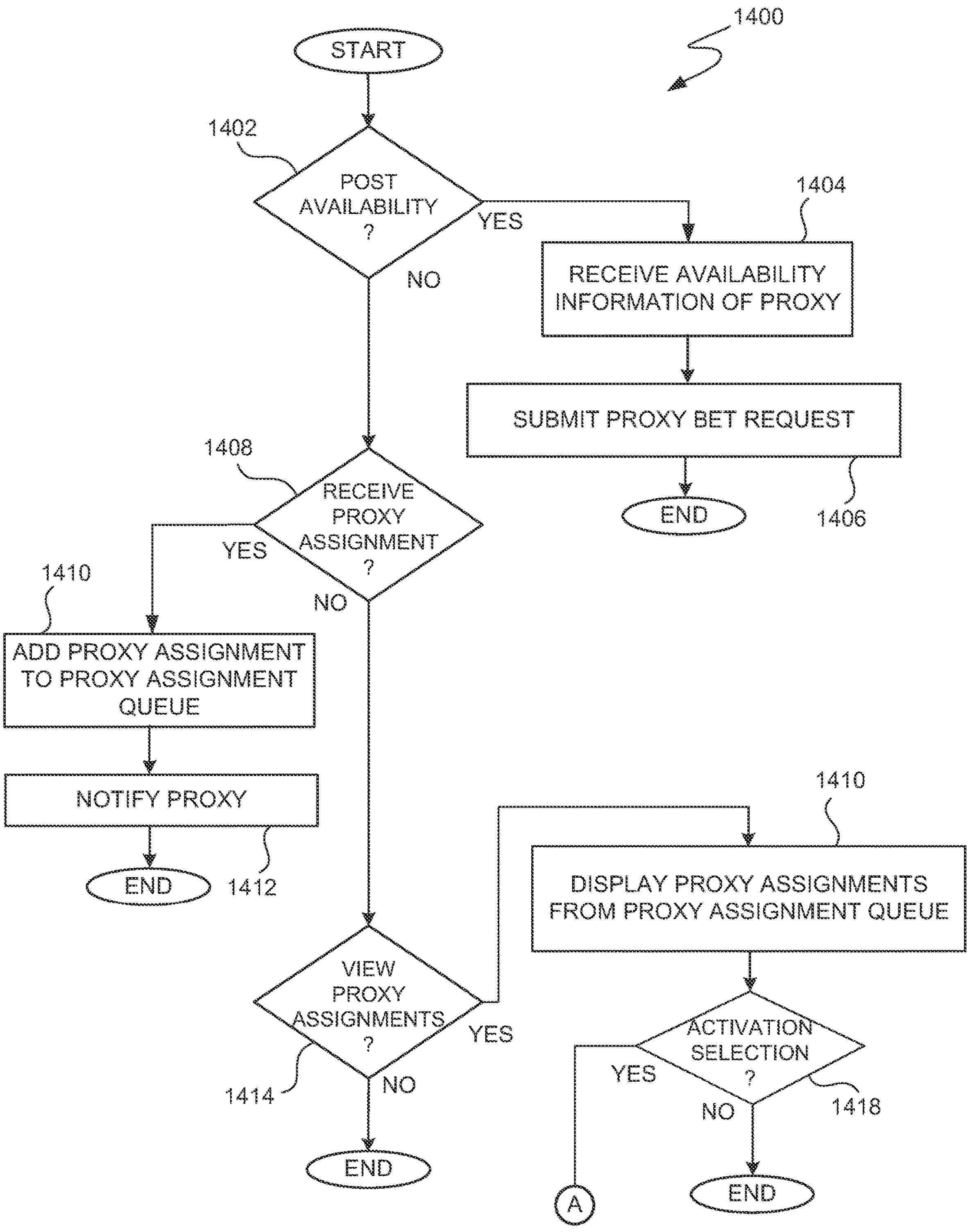
FIGS. 14A and 14B are flow diagrams of a proxy application process according to one embodiment.
Figure 14B:
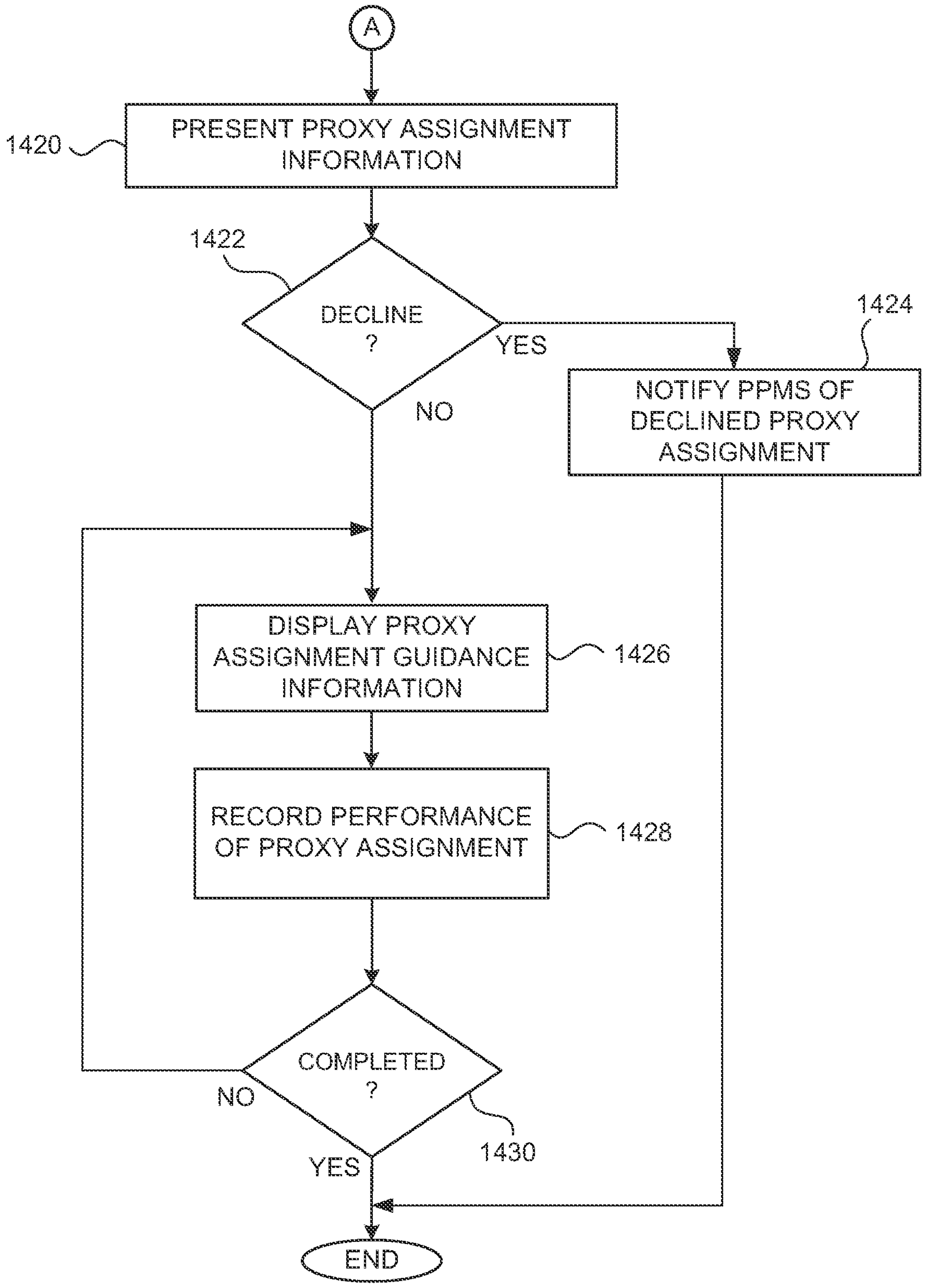

FIGS. 14A and 14B are flow diagrams of a proxy application process 1400 according to one embodiment. The proxy application process 1400 is typically performed by a proxy application. For example, the proxy application can operate on a portable electronic device associated with the proxy.

The proxy application process 1400 can begin with a decision 1402 that determines whether a proxy desires to post their availability. When the decision 1402 determines that a proxy desires to post their availability, availability information of the proxy can be received 1404. Here, the proxy can interact with the proxy application to provide the availability information of the proxy. The availability information can indicate that the proxy is presently available to handle proxy assignments, and/or can indicate that the proxy will be available to handle proxy assignments according to a schedule that they have set up or approved. The available information can also restrict proxy assignments to certain games, geographical area, and/or gaming establishments. Next, the availability information can be transmitted 1406 to the proxy player management system (PPMS). Following the block 1406, the proxy application process 1400 can end.

Alternatively, when the decision 1402 determines that the proxy does not desire to post their availability, a decision 1408 can determine whether a proxy assignment has been received 1408. A proxy assignment that has been received is, for example, a proxy assignment established by the proxy player management system (PPMS) and assigned to the proxy. When the decision 1408 determines that a proxy assignment has been received, the proxy assignment can be added 1410 to a proxy assignment queue for the proxy. In some cases, the proxy can be permitted to accept or decline the proxy assignment before it is formally added to the proxy assignment queue for the proxy. In any event, after the proxy assignment has been added 1410 to the proxy assignment queue, the proxy can be notified 1412. Typically, the proxy application can present a notification that serves to notify 1412 the proxy of the proxy assignment that has been received for the proxy. Following the block 1412, the proxy assignment process 1400 can end.

Additionally, when the decision 1408 determines that a proxy assignment has not been received, a decision 1414 can determine whether the proxy desires to view proxy assignments for the proxy. When the decision 1414 determines that the proxy assignments are to be viewed, the proxy assignments can be retrieved from the proxy assignment queue associated with the proxy and displayed 1416. A decision 1418 can then determine whether the proxy has made an activation selection. An activation selection is a selection by the proxy to activate a particular one of the proxy assignments that are present in the proxy assignment queue. When the decision 1418 determines that an activation selection has not been made, the proxy application process 1400 can end.

On the other hand, when the decision 1418 determines that an activation selection has been made, additional processing can be performed to carry out the proxy assignment that is being activated. The additional processing is, for example, processing illustrated in FIG. 14B.

The additional processing can present 1420 proxy assignment information. The proxy assignment information is information that is provided to the proxy to inform the proxy of the particular proxy. The proxy assignment information can describe the proxy bet to be made, the location of the proxy bet, the game involved in the proxy bet, the time of day for the proxy bet, directions to the location or game, and the like. Next, decision 1422 can determine whether the proxy wishes to decline the proxy assignment. In this embodiment, the proxy is permitted to decline the proxy assignment. When the decision 1422 determines that the proxy desires to decline the proxy assignment, the proxy player management system can be notified 1424 of the declined proxy assignment. Alternatively, if the decision 1422 determines that the proxy is not declining the proxy assignment, then proxy assignment guidance information can be displayed 1426 to the proxy. For example, the portable electronic device associate with the proxy can include a display screen on which the proxy assignment guidance information can be displayed. The proxy assignment guidance information can include instructions on how to carry out the proxy assignment. For example, the proxy assignment guidance information can direct the proxy to the appropriate gaming apparatus, gaming establishment, etc. The proxy assignment guidance information can also inform the proxy of the particular wager to be placed.

The proxy assignment process 1400 can also record 1428 performance of the proxy assignment. The performance of the proxy assignment can include data indicating that various stages of the proxy assignment have or have not been completed. Such data can permit the proxy player management system to monitor completion of different parts or stages of performance of the proxy assignment. The performance of the proxy assignment can also record that the wager was placed and the result of the wager, such as the amount of winnings, if any. The recordation 1428 can store alphanumeric data, audio/video data, or both. Thereafter, a decision 1430 can determine whether the proxy assignment has been completed. When the decision 1430 determines that the proxy assignment has not yet completed, the proxy application process 1400 can return to repeat the block 1426 and subsequent blocks so that the proxy assignment can continue to be processed and the proxy can receive further guidance. Alternatively, when the decision 1430 determines that the proxy assignment has been completed, the proxy application process 1400 can end. Additionally, following the block 1424 where the proxy assignment was declined, the proxy application process 1400 can also directly end.

Figure 15:
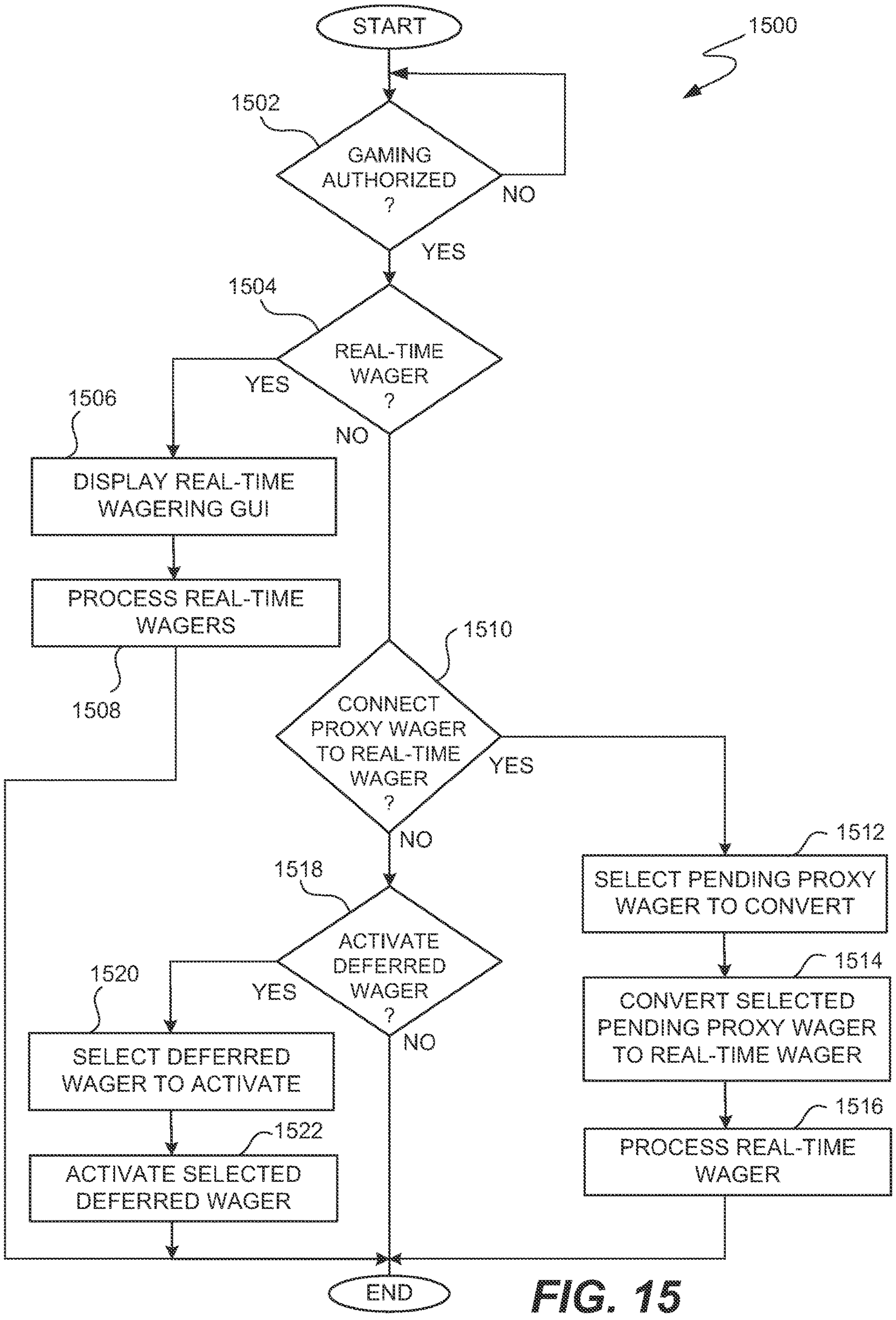
FIG. 15 is a flow diagram of a wager control process according to one embodiment.

FIG. 15 is a flow diagram of a wager control process 1500 according to one embodiment. The wager control process 1500 can, for example, be performed by a player application associated with a player (e.g. remote player).

The wager control process 1500 can begin with a decision 1502 that determines whether gaming is authorized. The decision 1502 can determine whether gaming is authorized for the player application operating on a portable electronic device associated with the player. For example, gaming can be authorized if the portable electronic device and thus the player application and player are in a gaming authorized location. This can be determined based on the location of the portable electronic device. In any event, when the decision 1502 determines that gaming is not authorized, the wager control process 1500 can continue to evaluate whether gaming is authorized such that at some later point in time gaming can be authorized.

On the other hand, when the decision 1502 determines that gaming is authorized, a decision 1504 can determine whether a real-time wager is to be played. Here, if gaming is authorized, the player application can support a real-time wager. Hence, in such case, the decision 1504 can determine whether the player desires to make a real-time wager. When the decision 1504 determines that the player does desire to make a real-time wager, then a real-time wagering graphical user interface (GUI) can be displayed 1506. The real-time wagering GUI can, for example, be a multilevel GUI, similar to the multi-level condition bet GUI discussed above, though bets need not be conditional. Using the real-time wagering GUI, one or more real-time wagers can be requested and processed 1508.

On the other hand, when the decision 1504 determines that the player does not desire to make a real-time wager, then a decision 1510 can determine whether to convert a previously established proxy wager into a real-time wager. In one embodiment, the player application (or other software or systems) can allow the player to make a proxy wager. Hence, the wager control process 1500 can allow the player to convert a previously established proxy wager that has not yet been performed into a real-time wager that can be currently performed given that the player is presently at a gaming authorized location. In this regard, when the decision 1510 determines that a previously established proxy wager is to be converted into a real-time wager, then a pending proxy wager to be converted can be selected 1512. Next, the selected pending proxy wager can be converted 1514 into a real-time wager. Thereafter, the real-time wager can be processed 1516.

Further still, when the decision 1510 determines that a previously established proxy wager is not to be converted into a real-time wager, a decision 1518 can determine whether a previously deferred wager is to be activated. When the decision 1518 determines that a previously deferred wager is to be activated, then a deferred wager to be activated can be selected 1520. Then the selected deferred wager can be activated 1522. The activation of the selected deferred wager causes the previously deferred wager to be invoked and thus performed. Following the blocks 1508, 1516 and 1522, as well as following the decision 1518 when a deferred wager is not to be activated, the wager control process 1500 can end.

Figure 16:
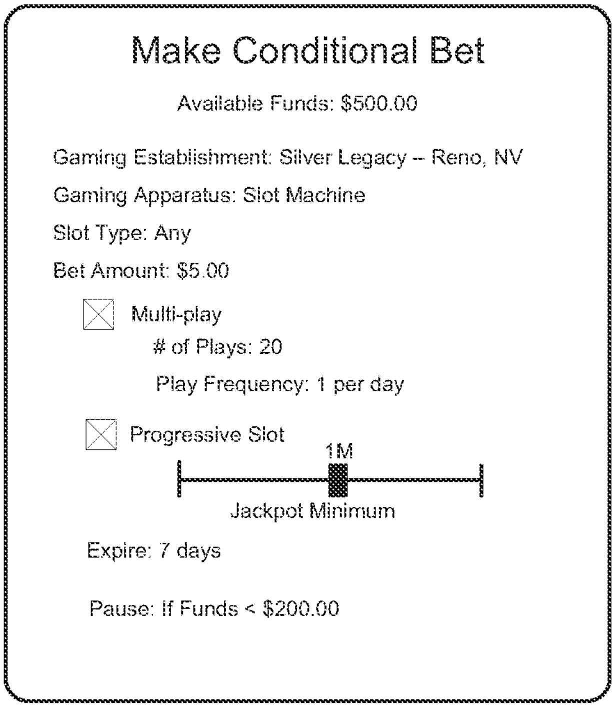
FIG. 16 is an exemplary screen illustrating a conditional bet that has been made.

FIG. 16 is an exemplary screen illustrating a conditional bet that has been made. The conditional bet can be formed by a user's interaction with prior screens to set a conditional bet. In this example, the conditional bet described in the exemplary screen indicates that: (i) the bet is to be performed at the gaming establishment—the Silver Legacy—Reno, NV; (ii) the gaming apparatus is a Slot Machine; (iii) the game type is any game; (iv) the bet amount is $5.00; (v) the bet is a multi-play bet that is configured to be play up to twenty (20) times, once a day; (vi) the bet is limited to a progressive slot having a minimum jackpot of one (1) million; (vii) the conditional be also expires in seven (7) days; and (viii) user presently has $500 in available funds and the conditional bet is to be paused if the user's available funds become lower than $200.

Figure 17:
FIG. 17 is an exemplary screen illustrating a bet result notification.

FIG. 17 is an exemplary screen illustrating a bet result notification. The bet notification can be provided to a user's mobile device. The bet result notification is an electronic notification, such as a text message or an email. The exemplary bet result notification shown in FIG. 17 denotes: (i) the bet amount $5.00 that has been played for the user; (ii) the gaming establishment—the Silver Legacy—Reno, NV where the bet was player; (iii) the gaming apparatus on which the bet was player—Slot Machine #45432; (iv) the slot type (game type) was "Wheel of Fortune"; (v) the progressive jackpot amount at time of play; (vi) result of the bet, here user won $100; and (vii) the time of game play (e.g., 12:06:05, Jan. 1, 2017). Additionally, the bet result notification can include a visual graphic indicating that result of the bet. In this example, the visual graphic can indicates the result (e.g., resultant reel spins) of the slot machine.

In other bet result notifications, the visual graphic can be a video clip, an animation, or a picture. For example, the video clip can pertain to the execution of the bet, either the entire game play or selective parts thereof. The game apparatus can be a gaming table (physical or electronic) and the game type can be poker, in which can the visual graphic pertains to the play of a hand of poker. The game apparatus might be a server computer and the game type can be a sporting event (e.g., particular play, parley bet, etc.), in which case the visual graphic can pertain to relevant play(s) of the sporting event.

Figure 18:
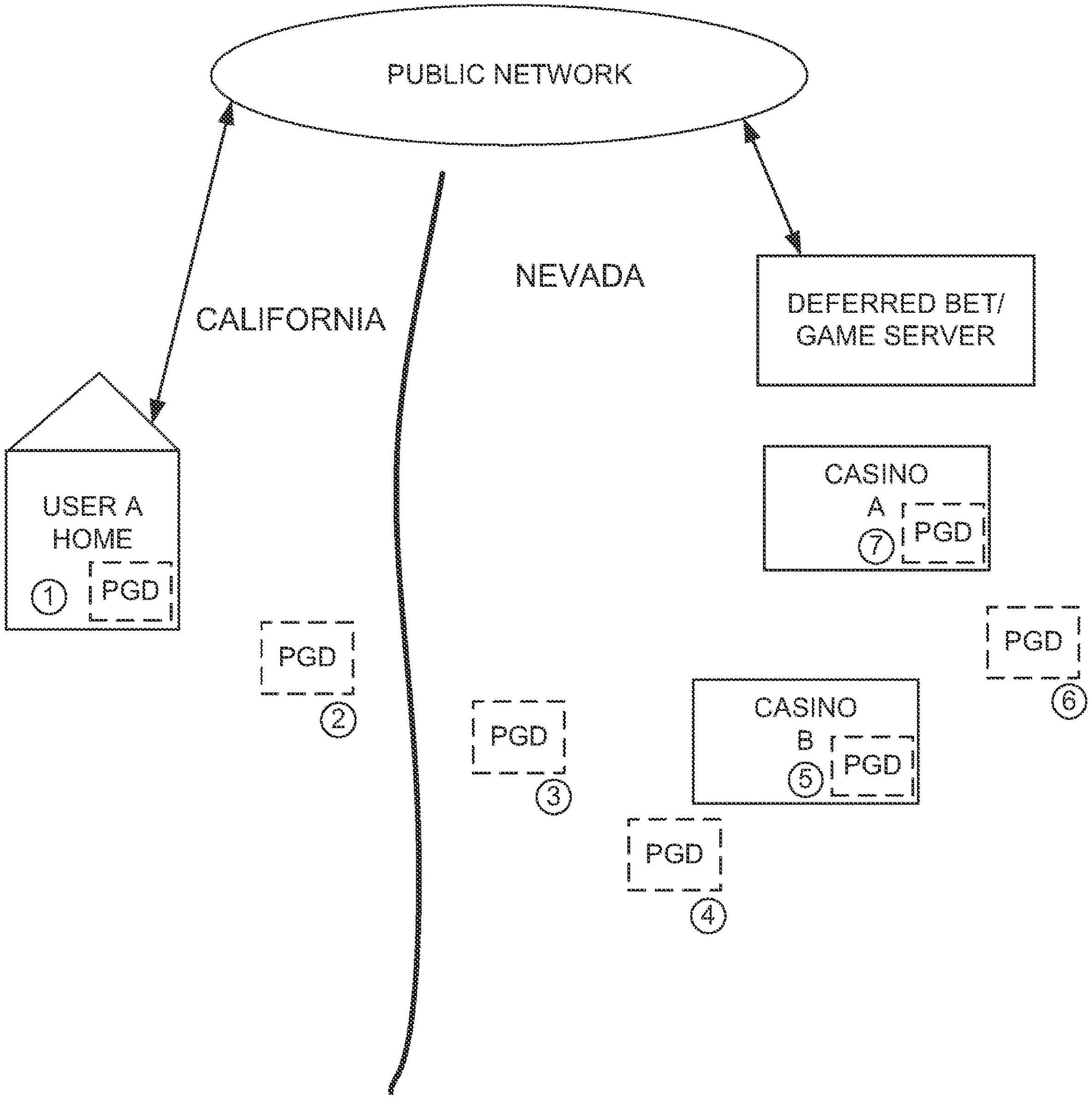
FIG. 18 is a block diagram of a gaming system in which a portable gaming device (PGD) is moved from a user's home in California to a gaming establishment in Nevada.

FIG. 18 is a block diagram of a gaming system in which a portable gaming device (PGD) is moved from a user's home in California to a gaming establishment in Nevada. The user makes the bet in California, such as via the user's PGD, and then travels into Nevada are the bet can be activated and performed, such as with the assistance of a deferred bet/game server. In one implementation, at locations 3 or 4, the user's PGD is within Nevada and a pre-arranged bet while in California at location 1 can now be made. In another implementation, at location 5, when the user's PGD reaches the vicinity of Casino B, then a pre-arranged bet while in California at location 1 can now be made. In another implementation, at location 7, when the user's PGD reaches the vicinity of Casino A, then a pre-arranged bet while in California at location 1 can now be made.

Figure 19:
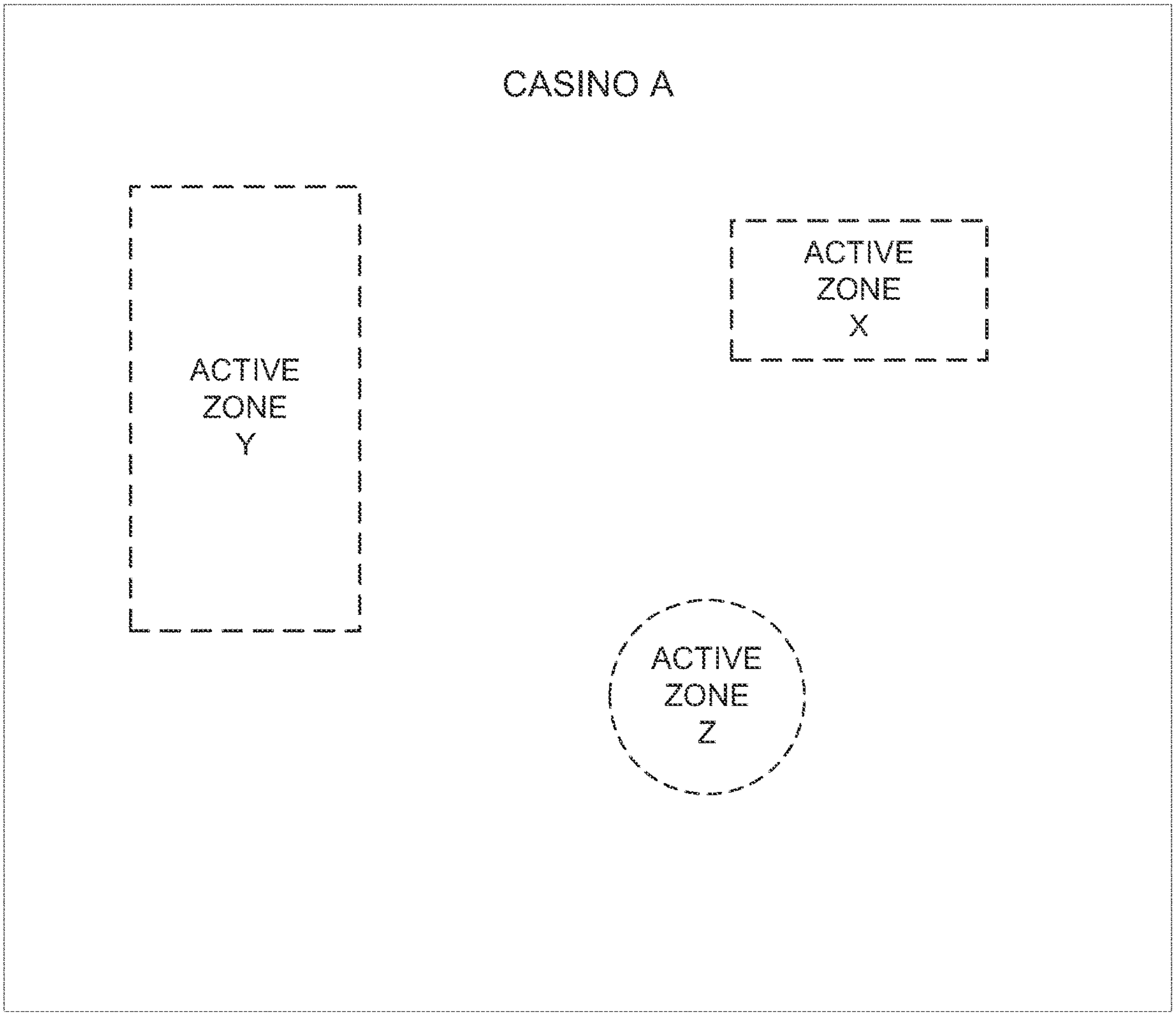
FIG. 19 is a block diagram illustrating active wireless gaming zones in Casino according to one embodiment.

FIG. 19 is a block diagram, illustrating active wireless gaming zones in Casino A. In the example shown in FIG. 19, the Casino A includes an active zone X, an active zone y, and an active zone z. These active zones are localized areas, namely wireless regions or hotspots, within the Casino A establishment were conditional bets can be made. In such an embodiment, a user can move to one of the active zones x, y or z such that their PGD can be recognized in an active zone and thus a bet can be made or activated at those intra-casino active zones x, y and z.

Figure 20:
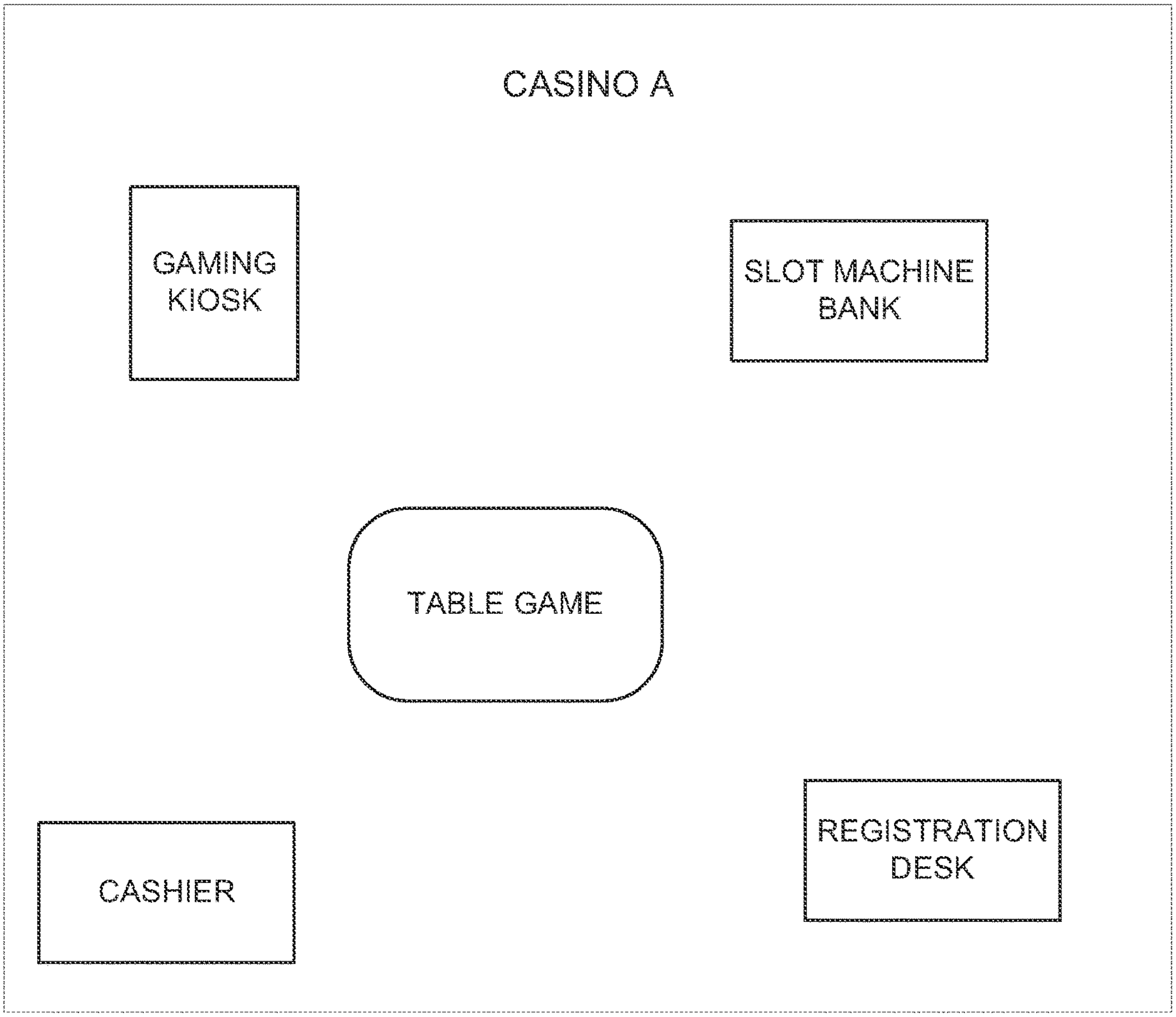
FIG. 20 is a block diagram of functional areas in Casino A, some of which are able to activate a bet.

FIG. 20 is a block diagram of functional areas in Casino A, some of which are able to activate a bet. The Casino A can include one or more gaming kiosks where a user can directly enter a bet even a conditional bet. The bet can be associated with a gaming device in the Casino A, such as a slot machine within a slot machine bank or a table game (via a physical or electronic gaming table).

Figure 21:
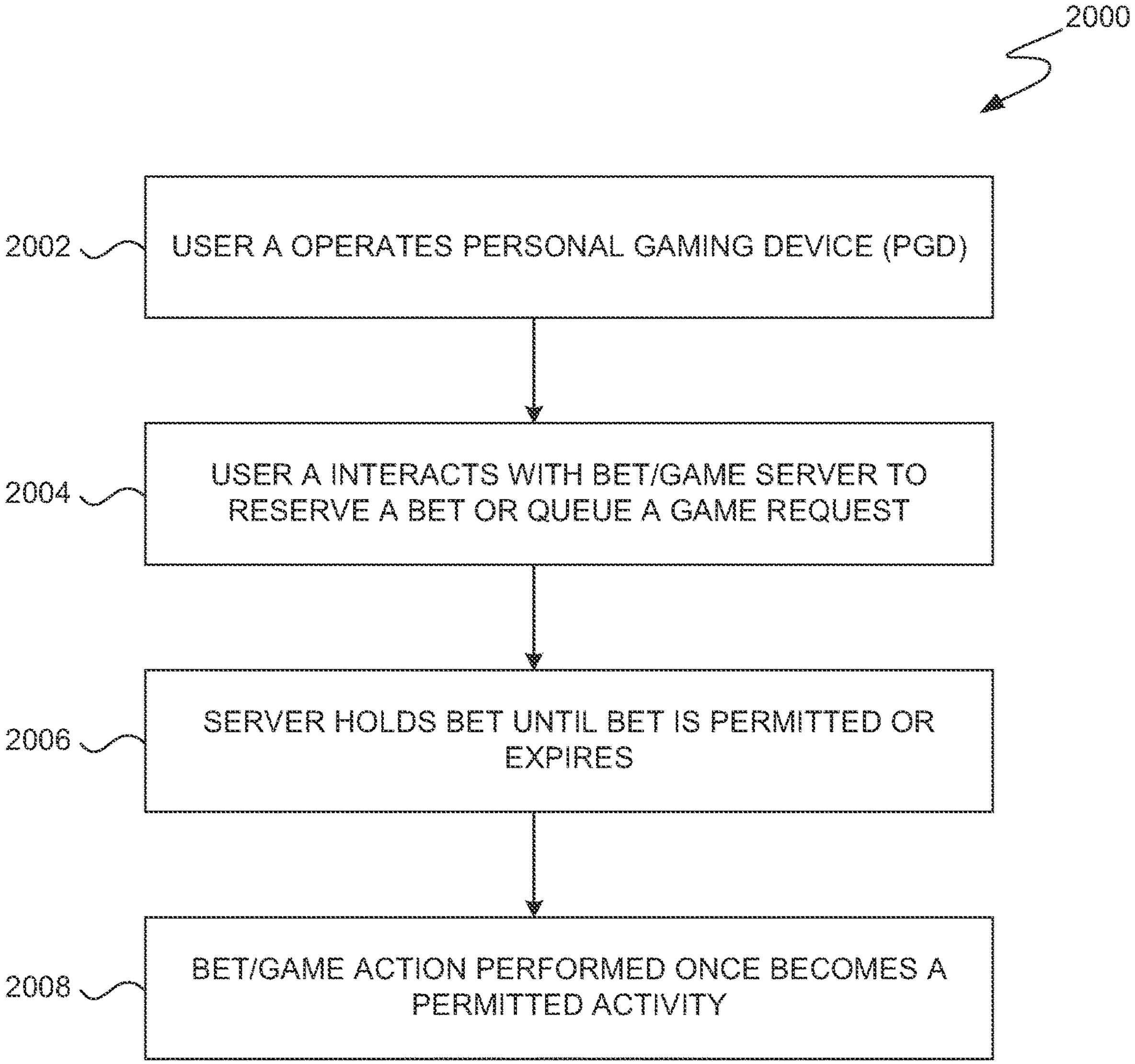
FIG. 21 is a process diagram illustrating steps associated with the gaming system shown in FIG. 18.

FIG. 21 is a process diagram illustrating steps associated with the gaming system shown in FIG. 18, according to one embodiment. More particularly, FIG. 21 illustrates a betting process 2000 according to one embodiment. The betting process 2000 can begin with a User A operating 2002 a personal gaming device (PGD). In doing so, the User A can selected, design or customize a wager. The wager can be a conditional wager, a deferred wager, or both. Next, User A (via the user's PDG) can interact 2004 with a bet/game server to reserve a bet or queue a game request. In this example, the operating 2002 can be done at the User A's home in California and the interacting 2004 can be also done in California, such as shown in FIG. 18. Thereafter, the bet/gaming server holds 2006 the bet (wager) until it is permitted or has expired. Here, the bet/gaming server can continuously evaluate the particular bet's conditions are satisfied. Once the bet is permitted, the betting process 2000 can cause the bet to be performed 2006. The bet can be performed by a gaming server or a gaming device, such as a slot machine or gaming table.

Additionally, it may be that the wager is not provided to the bet/gaming server until the User's A (and/or the User A's PGD) has reached a gaming permitted jurisdiction, such as Nevada. Hence, operation 2004 could be delayed until step (3) which is when the User A's PGD enters Nevada. Alternatively, the operation 2004 could be further delayed until the User's A PGD reaches a gaming establishment, such as Casino A or Casino B, as shown as steps (5) or (7) shown in FIG. 18. For example, the operation 2004 could be triggered when the User A's PGD is within an active zone internal to Casino A's establishment, such as shown in FIG. 19. As another example, the operation 2004 could be triggered when the User A's PGD couples (physical connection, tap, or proximity) with a gaming kiosk, slot machine bank or table game within Casino A, such as shown in FIG. 20. Note that, in one embodiment, a proxy can assist User A in having bets placed, such as be transporting the User A's PGD from California to Nevada, generally or to a casino establishment (or zone or device internal to the casino establishment).

Back Betting

In one embodiment, the conditional bet or proxy bet can also be a back bet. For example, the bet can be configured to be a back bet. The back bet can be implemented by a kiosk, a proxy, or a player. In one implementation, a conditional bet can include at least one condition that is dependent on a primary bet, primary gaming apparatus or primary player, or performance of the primary gaming apparatus or primary player (e.g., winning streak), and thus the conditional bet can be a back bet relative to the primary bet or the primary player.

Robotic Play

In another embodiment, a player, typically a remote player, can select or be assigned a robot present at a gaming location to perform actions to make wagers on behalf of the remote player. The robot can be assigned to perform a bet for a remote player. The robot can serve as a proxy. The bet can, optionally, be a conditional bet. The robot can be automated to perform a bet without player assistance, or the player can be permitted to control some or all actions of the robot. The robot can be a physical robot or a virtual robot.

Drone Play

In still another embodiment, a remote player can make use of a drone that serves as a proxy or as a device assisting a proxy.

This application claim priority of U.S. Pat. No. 9,600,976, filed Mar. 21, 2017, and entitled "ADAPTIVE MOBILE DEVICE GAMING SYSTEM", which is hereby incorporated by reference herein.

The various aspects, features, embodiments or implementations of the invention described above can be used alone or in various combinations.

Embodiments of the invention can, for example, be implemented by software, hardware, or a combination of hardware and software. Embodiments of the invention can also be embodied as computer readable code on a computer readable medium. In one embodiment, the computer readable medium is non-transitory. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computer-implemented method for facilitating assisted wagering on wager-based games, comprising:

receiving, via a wager control terminal system of a player's electronic device, a request by the player to place a wager on a wager-based game, wherein the wager control terminal system is configured to:

present both a real-time wager for the wager-based game and a proxy wager for the wager-based game, communicate with both a gaming management system and a proxy play management system, determine, in real-time based on a location of the player's electronic device, whether to present the real-time wager for the wager-based game or to present a proxy wager for the wager-based game, present only the real-time wager when the location is an authorized gaming location and thereby communicate with only the gaming management system, and present only the proxy wager for the wager-based game when the location is an unauthorized gaming location and thereby communicate with only the proxy play management system;

retrieving, by the wager control terminal system in response to the request, a geographic location of the player's electronic device, wherein the geographic location is one of an authorized gaming location or an unauthorized gaming location, and wherein the geographic location is based on a detection technique comprising triangulation, GPS data, network data, or a combination thereof;

determining, in real-time, whether to present the real-time wager for the wager-based game or to present the proxy wager for the wager-based game, wherein the determining further includes determining, by the wager control terminal system and based on the geographic location of the player's electronic device, whether the geographic location is the authorized gaming location or the unauthorized gaming location, and wherein the geographic location is based on the detection technique comprising triangulation, GPS data, network data, or a combination thereof;

presenting, by the wager control terminal system in response to determining that the geographic location is the authorized gaming location, only the real-time wager for the wager-based game to the player on the player's electronic device;

transmitting, after presenting only the real-time wager for the wager-based game and in response to receiving the real-time wager for the wager-based game from the player on the player's electronic device, the real-time wager to the gaming management system without communicating with the proxy play management system;

transmitting, by the gaming management system, the wager results from the real-time wager to the wager control terminal system;

presenting, by the wager control terminal system, the wager results from the real-time wager on the player's electronic device;

presenting, by the wager control terminal system in response to determining that the geographic location is the unauthorized gaming location, only the proxy wager for the wager-based game to the player on the player's electronic device;

transmitting, after presenting only the proxy wager for the wager-based game and in response to receiving the proxy wager for the wager-based game from the player on the player's electronic device, the proxy wager to the proxy play management system without communicating with the gaming management system;

selecting, by the proxy play management system in response to receiving the proxy wager, a proxy to play the wager-based game;

transmitting, by the proxy play management system, instructions to place the proxy wager as a real-time wager for the wager-based game;

receiving, by the proxy play management system, results from the real-time wager on play of the wager-based game by the proxy for the player;

transmitting, by the proxy play management system, the wager results from the proxy play request to the wager control terminal system; and presenting, by the wager control terminal system, the wager results from the proxy play request on the player's electronic device.

2. A computer-implemented method as recited in claim 1, wherein the proxy is a person that physically places the wager on the wager-based game for the player.

3. A computer-implemented method as recited in claim 1, further comprising:

determining, by the wager control terminal system in response to determining that the geographic location is the authorized gaming location, whether the player has a stored proxy wager;

presenting, by the wager control terminal system in response to determining that the geographic location is the authorized gaming location and that the player has the stored proxy wager, the stored proxy wager for the wager-based game to the player on the player's electronic device;

converting, in response to receiving an indication from the player to convert the stored proxy wager to a second real-time wager, the stored wager into second real-time wager; and transmitting, by the wager control terminal system in response to converting the stored proxy wager to the second real-time wager, the second real-time wager to the gaming management system.

4. A computer-implemented method as recited in claim 1, wherein the method comprises:

requiring that the player have a player account; and updating the player account based on the wager results.

5. A computer-implemented method as recited in claim 4, wherein the player account is established and funded in the gaming authorized location, and wherein the proxy play request is received from the player while the player is in the gaming unauthorized location.

6. A computer-implemented method as recited in claim 1, wherein the selecting of the proxy comprises electronically notifying the proxy via a proxy's portable electronic device.

7. A computer-implemented method as recited in claim 1, wherein the proxy wager is received via the player's electronic device which is a portable electronic device.

8. A computer-implemented method as recited in claim 1, wherein the proxy wager is received via a player graphical user interface presented on a player's portable electronic device.

9. A non-transitory computer-readable medium including at least computer program code tangible stored therein for managing wagers for wager-based games, the non-transitory computer-readable medium comprising:

computer program code for receiving, via a wager control terminal system of a player's electronic device, a request by the player to place a wager on a wager-based game, wherein the wager control terminal system is configured to:

present both a real-time wager for the wager-based game and a proxy wager for the wager-based game, communicate with both a gaming management system and a proxy play management system, determine, in real-time based on a location of the player's electronic device, whether to present the real-time wager for the wager-based game or to present a proxy wager for the wager-based game, present only the real-time wager when the location is an authorized gaming location and thereby communicate with only the gaming management system, and present only the proxy wager for the wager-based game when the location is an unauthorized gaming location and thereby communicate with only the proxy play management system;

computer program code for retrieving, by the wager control terminal system in response to the request, a geographic location of the player's electronic device, wherein the geographic location is one of an authorized gaming location or an unauthorized gaming location, and wherein the geographic location is based on a detection technique comprising triangulation, GPS data, network data, or a combination thereof;

computer program code for determining, in real-time, whether to present the real-time wager for the wager-based game or to present the proxy wager for the wager-based game, wherein the determining further includes determining, by the wager control terminal system and based on the geographic location of the player's electronic device, whether the geographic location is the authorized gaming location or the unauthorized gaming location, and wherein the geographic location is based on the detection technique comprising triangulation, GPS data, network data, or a combination thereof;

computer program code for presenting, by the wager control terminal system in response to determining that the geographic location is the authorized gaming location, only the real-time wager for the wager-based game to the player on the player's electronic device;

computer program code for transmitting, after presenting only the real-time wager for the wager-based game and in response to receiving the real-time wager for the wager-based game from the player on the player's electronic device, the real-time wager to the gaming management system without communicating with the proxy play management system;

computer program code for transmitting, by the gaming management system, the wager results from the real-time wager to the wager control terminal system;

computer program code for presenting, by the wager control terminal system, the wager results from the real-time wager on the player's electronic device;

computer program code for presenting, by the wager control terminal system in response to determining that the geographic location is the unauthorized gaming location, only the proxy wager for the wager-based game to the player on the player's electronic device;

computer program code for transmitting, after presenting only the proxy wager for the wager-based game and in response to receiving the proxy wager for the wager-based game from the player on the player's electronic device, the proxy wager to the proxy play management system without communicating with the gaming management system;

computer program code for selecting, by the proxy play management system in response to receiving the proxy wager, a proxy to play the wager-based game;

computer program code for transmitting, by the proxy play management system, instructions to place the proxy wager as a real-time wager for the wager-based game;

computer program code for receiving, by the proxy play management system, results from the real-time wager on play of the wager-based game by the proxy for the player;

computer program code for transmitting, by the proxy play management system, the wager results from the proxy play request to the wager control terminal system; and computer program code for presenting, by the wager control terminal system, the wager results from the proxy play request on the player's electronic device.

10. The non-transitory computer-readable medium including at least computer program code tangible stored therein for managing wagers for wager-based games as recited in claim 9, wherein the proxy is a person that physically places the wager on the wager-based game for the player.

11. The non-transitory computer-readable medium including at least computer program code tangible stored therein for managing wagers for wager-based games as recited in claim 9, wherein the non-transitory computer-readable medium further comprises:

computer program code for determining, by the wager control terminal system in response to determining that the geographic location is the authorized gaming location, whether the player has a stored proxy wager;

computer program code for presenting, by the wager control terminal system in response to determining that the geographic location is the authorized gaming location and that the player has the stored proxy wager, the stored proxy wager for the wager-based game to the player on the player's electronic device;

computer program code for converting, in response to receiving an indication from the player to convert the stored proxy wager to a second real-time wager, the stored wager into second real-time wager; and computer program code for transmitting, by the wager control terminal system in response to converting the stored proxy wager to the second real-time wager, the second real-time wager to the gaming management system.

12. The non-transitory computer-readable medium including at least computer program code tangible stored therein for managing wagers for wager-based games as recited in claim 9, wherein the non-transitory computer-readable medium further comprises:

computer program code for requiring that the player have a player account; and computer program code for updating the player account based on the wager results.

13. The non-transitory computer-readable medium including at least computer program code tangible stored therein for managing wagers for wager-based games as recited in claim 12, wherein the player account is established and funded in the gaming authorized location, and wherein the proxy play request is received from the player while the player is in the gaming unauthorized location.

14. The non-transitory computer-readable medium including at least computer program code tangible stored therein for managing wagers for wager-based games as recited in claim 9, wherein the selecting of the proxy comprises electronically notifying the proxy via a proxy's portable electronic device.

15. The non-transitory computer-readable medium including at least computer program code tangible stored therein for managing wagers for wager-based games as recited in claim 9, wherein the proxy wager is received via the player's electronic device which is a portable electronic device.

16. The non-transitory computer-readable medium including at least computer program code tangible stored therein for managing wagers for wager-based games as recited in claim 9, wherein the proxy wager is received via a player graphical user interface presented on a player's portable electronic device.

17. An electronic gaming device comprising:

a game controller comprising a processor and memory, the memory storing program code including instructions, the game controller executing the instructions which cause the game controller to, at least:

receive, via a wager control terminal system of a player's electronic device, a request by the player to place a wager on a wager-based game, wherein the wager control terminal system is configured to:

present both a real-time wager for the wager-based game and a proxy wager for the wager-based game, communicate with both a gaming management system and a proxy play management system, determine, in real-time based on a location of the player's electronic device, whether to present the real-time wager for the wager-based game or to present a proxy wager for the wager-based game, present only the real-time wager when the location is an authorized gaming location and thereby communicate with only the gaming management system, and present only the proxy wager for the wager-based game when the location is an unauthorized gaming location and thereby communicate with only the proxy play management system;

retrieve, by the wager control terminal system in response to the request, a geographic location of the electronic gaming device, wherein the geographic location is one of an authorized gaming location or an unauthorized gaming location, and wherein the geographic location is based on a detection technique comprising triangulation, GPS data, network data, or a combination thereof;

determine, in real-time, whether to present the real-time wager for the wager-based game or to present the proxy wager for the wager-based game, wherein the determining further includes determining, by the wager control terminal system and based on the geographic location of the player's electronic device, whether the geographic location is the authorized gaming location or the unauthorized gaming location, and wherein the geographic location is based on the detection technique comprising triangulation, GPS data, network data, or a combination thereof;

present, by the wager control terminal system in response to determining that the geographic location is the authorized gaming location, only the real-time wager for the wager-based game to the player on the player's electronic device;

transmit, after presenting only the real-time wager for the wager-based game and in response to receiving the real-time wager for the wager-based game from the player on the player's electronic device, the real-time wager to the gaming management system without communicating with the proxy play management system;

transmit, by the gaming management system, the wager results from the real-time wager to the wager control terminal system;

present, by the wager control terminal system, the wager results from the real-time wager on the player's electronic device;

present, by the wager control terminal system in response to determining that the geographic location is the unauthorized gaming location, only the proxy wager for the wager-based game to the player on the player's electronic device;

transmit, after presenting only the proxy wager for the wager-based game and in response to receiving the proxy wager for the wager-based game from the player on the player's electronic device, the proxy wager to the proxy play management system without communicating with the gaming management system;

select, by the proxy play management system in response to receiving the proxy wager, a proxy to play the wager-based game;

transmit, by the proxy play management system, instructions to place the proxy wager as a real-time wager for the wager-based game;

receive, by the proxy play management system, results from the real-time wager on play of the wager-based game by the proxy for the player;

transmit, by the proxy play management system, the wager results from the proxy play request to the wager control terminal system; and present, by the wager control terminal system, the wager results from the proxy play request on the player's electronic device.

18. The electronic gaming device as recited in claim 17, wherein the wager results is a non-numerical reward or advantage.

19. The electronic gaming device as recited in claim 17, wherein the wager results is a non-monetary reward or advantage.

20. The electronic gaming device as recited in claim 17, wherein the proxy is a person that transports the proxy play request from the gaming unauthorized location to the gaming authorized location.

* * * * *